(12) United States Patent
Kuo

(10) Patent No.: US 10,698,178 B2
(45) Date of Patent: Jun. 30, 2020

(54) IMAGING OPTICAL LENS ASSEMBLY, IMAGE CAPTURING UNIT AND ELECTRONIC DEVICE

(71) Applicant: LARGAN PRECISION CO.,LTD., Taichung (TW)

(72) Inventor: Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 127 days.

(21) Appl. No.: 16/132,179

(22) Filed: Sep. 14, 2018

(65) Prior Publication Data
US 2020/0049948 A1   Feb. 13, 2020

(30) Foreign Application Priority Data
Aug. 10, 2018   (TW) .............................. 107128036 A

(51) Int. Cl.
| | |
|---|---|
| G02B 9/62 | (2006.01) |
| G02B 13/00 | (2006.01) |
| G02B 13/02 | (2006.01) |
| G02B 13/18 | (2006.01) |
| G02B 27/00 | (2006.01) |

(52) U.S. Cl.
CPC ............... *G02B 9/62* (2013.01); *G02B 13/02* (2013.01); *G02B 13/18* (2013.01); *G02B 27/0025* (2013.01); *G02B 27/0037* (2013.01)

(58) Field of Classification Search
CPC . G02B 9/62; G02B 9/64; G02B 13/02; G02B 9/60; G02B 13/0045; G02B 13/18; G02B 27/0025

USPC ......................................................... 359/713
See application file for complete search history.

(56) References Cited

U.S. PATENT DOCUMENTS

| | | | |
|---|---|---|---|
| 5,418,647 A | 5/1995 | Ishisaka | |
| 5,463,499 A | 10/1995 | Ito et al. | |
| 5,528,429 A | 6/1996 | Hagimori | |
| 6,327,100 B1 | 12/2001 | Yamanashi | |
| 9,726,857 B2 | 8/2017 | Chen | |
| 2009/0161236 A1* | 6/2009 | Kitahara | G02B 13/146 359/761 |
| 2015/0124332 A1 | 5/2015 | Noda et al. | |
| 2015/0124333 A1 | 5/2015 | Noda et al. | |
| 2015/0338613 A1 | 11/2015 | Tang et al. | |
| 2015/0338614 A1 | 11/2015 | Tang et al. | |
| 2015/0350503 A1* | 12/2015 | Chen | H04N 5/2253 348/373 |
| 2015/0362702 A1 | 12/2015 | Tang et al. | |

(Continued)

FOREIGN PATENT DOCUMENTS

| | | |
|---|---|---|
| CN | 203606551 U | 5/2014 |
| CN | 105467562 A | 4/2016 |

(Continued)

*Primary Examiner* — Jordan M Schwartz
(74) *Attorney, Agent, or Firm* — Maschoff Brennan

(57) ABSTRACT

An imaging optical lens assembly includes six lens elements which are, in order from an object side to an image side: a first lens element, a second lens element, a third lens element, a fourth lens element, a fifth lens element and a sixth lens element. Each of the six lens elements has an object-side surface facing toward the object side and an image-side surface facing toward the image side. At least one of the six lens elements has at least one aspheric surface having at least one inflection point.

28 Claims, 31 Drawing Sheets

(56) References Cited

U.S. PATENT DOCUMENTS

| | | | |
|---|---|---|---|
| 2016/0004035 A1 | 1/2016 | Jeong | |
| 2016/0004042 A1 | 1/2016 | Kubota et al. | |
| 2016/0011401 A1 | 1/2016 | Chen et al. | |
| 2016/0131870 A1 | 5/2016 | Tang et al. | |
| 2016/0131871 A1 | 5/2016 | Tang et al. | |
| 2016/0131872 A1 | 5/2016 | Tang et al. | |
| 2016/0131873 A1 | 5/2016 | Tang et al. | |
| 2016/0139368 A1 | 5/2016 | You | |
| 2016/0139372 A1* | 5/2016 | Tanaka | G02B 13/0045 359/708 |
| 2017/0031133 A1 | 2/2017 | Liu et al. | |
| 2017/0031134 A1 | 2/2017 | Liu et al. | |
| 2017/0052345 A1 | 2/2017 | Tang et al. | |
| 2017/0052346 A1 | 2/2017 | Tang et al. | |
| 2017/0052347 A1 | 2/2017 | Tang et al. | |
| 2017/0052348 A1 | 2/2017 | Tang et al. | |
| 2017/0153422 A1 | 6/2017 | Tang et al. | |
| 2017/0153423 A1 | 6/2017 | Tang et al. | |
| 2017/0160520 A1 | 6/2017 | Tang et al. | |
| 2017/0160521 A1 | 6/2017 | Tang et al. | |
| 2017/0212333 A1 | 7/2017 | Huang | |
| 2017/0329103 A1 | 11/2017 | Lai et al. | |
| 2017/0329104 A1 | 11/2017 | Lai et al. | |
| 2018/0011294 A1 | 1/2018 | Lai et al. | |
| 2018/0011295 A1 | 1/2018 | Lai et al. | |
| 2019/0187419 A1* | 6/2019 | Sato | G02B 13/0045 |

FOREIGN PATENT DOCUMENTS

| | | |
|---|---|---|
| JP | H07-306361 A | 11/1995 |
| JP | H09-021952 A | 1/1997 |
| JP | 2011-085733 A | 4/2011 |
| JP | 2014-010399 A | 1/2014 |
| JP | 2014-010400 A | 1/2014 |
| JP | 2014-010401 A | 1/2014 |
| JP | 2015-041012 A | 3/2015 |
| TW | I626488 B | 6/2018 |
| WO | 2019233142 A | 12/2019 |
| WO | 2019233143 A | 12/2019 |

\* cited by examiner

IMAGING OPTICAL LENS ASSEMBLY, IMAGE CAPTURING UNIT AND ELECTRONIC DEVICE

RELATED APPLICATIONS

This application claims priority to Taiwan Application 107128036, filed on Aug. 10, 2018, which is incorporated by reference herein in its entirety.

BACKGROUND

Technical Field

The present disclosure relates to an imaging optical lens assembly, an image capturing unit and an electronic device, more particularly to an imaging optical lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality is one of the indispensable features of an optical system nowadays.

Furthermore, due to the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, a desirable size of the aperture, miniaturization or required field of view. Accordingly, the present disclosure provides an optical system satisfying the aforementioned requirements.

SUMMARY

According to one aspect of the present disclosure, an imaging optical lens assembly includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side. At least one of the six lens elements has at least one aspheric surface having at least one inflection point. When a focal length of the imaging optical lens assembly is f, an axial distance between the object-side surface of the first lens element and an image surface is TL, a curvature radius of the object-side surface of the first lens element is R1, an entrance pupil diameter of the imaging optical lens assembly is EPD, a maximum effective radius of the object-side surface of the first lens element is Y11, a maximum effective radius of the image-side surface of the sixth lens element is Y62, a minimum value among all Abbe numbers of the six lens elements of the imaging optical lens assembly is Vmin, an Abbe number of the fifth lens element is V5, and an Abbe number of the sixth lens element is V6, the following conditions are satisfied:

$2.0<f/(f-TL)$;
$-10.0<TL/R1<1.8$;
$1.0<TL/EPD<5.0$;
$0.55<Y11/Y62\leq1.8$;
$10.0<Vmin<21.3$;
$20.0<V5+V6<105.0$; and
$1.0\ [mm]<TL<17.0\ [mm]$.

According to another aspect of the present disclosure, an imaging optical lens assembly includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side. At least one of the six lens elements has at least one aspheric surface having at least one inflection point. When a focal length of the imaging optical lens assembly is f, an axial distance between the object-side surface of the first lens element and an image surface is TL, a curvature radius of the object-side surface of the first lens element is R1, an entrance pupil diameter of the imaging optical lens assembly is EPD, a maximum effective radius of the object-side surface of the first lens element is Y11, a maximum effective radius of the image-side surface of the sixth lens element is Y62, a sum of axial distances between every adjacent lens element of the six lens elements is ΣAT, a sum of central thicknesses of the six lens elements of the imaging optical lens assembly is ΣCT, an Abbe number of the fifth lens element is V5, a minimum value among all absolute values of focal lengths of each of the six lens elements of the imaging optical lens assembly is |f|min, and half of a maximum field of view of the imaging optical lens assembly is HFOV, the following conditions are satisfied:

$2.0<f/(f-TL)$;
$-10.0<TL/R1<1.8$;
$1.2<TL/EPD<4.0$;
$0.55<Y11/Y62\leq1.8$;
$0<\Sigma AT/\Sigma CT<1.6$;
$10.0<V5<45.0$;
$1.40<f/|f|min$; and
$5.0\ [deg.]<HFOV<32.0\ [deg.]$.

According to still another aspect of the present disclosure, an image capturing unit includes one of the aforementioned imaging optical lens assemblies and an image sensor, wherein the image sensor is disposed on the image surface of said one of the aforementioned imaging optical lens assemblies.

According to yet another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An imaging optical lens assembly includes six lens elements. The six lens elements are, in order from an object side to an image side, a first lens element, a second lens element, a third lens element, a fourth lens element, a fifth lens element and a sixth lens element.

The second lens element can have positive refractive power; therefore, it is favorable for adjusting the field of view and reducing the total track length of the imaging optical lens assembly.

The third lens element can have negative refractive power; therefore, it is favorable for correcting aberrations such as spherical aberration and chromatic aberration generated due to miniaturization of the imaging optical lens assembly.

Figure 25:
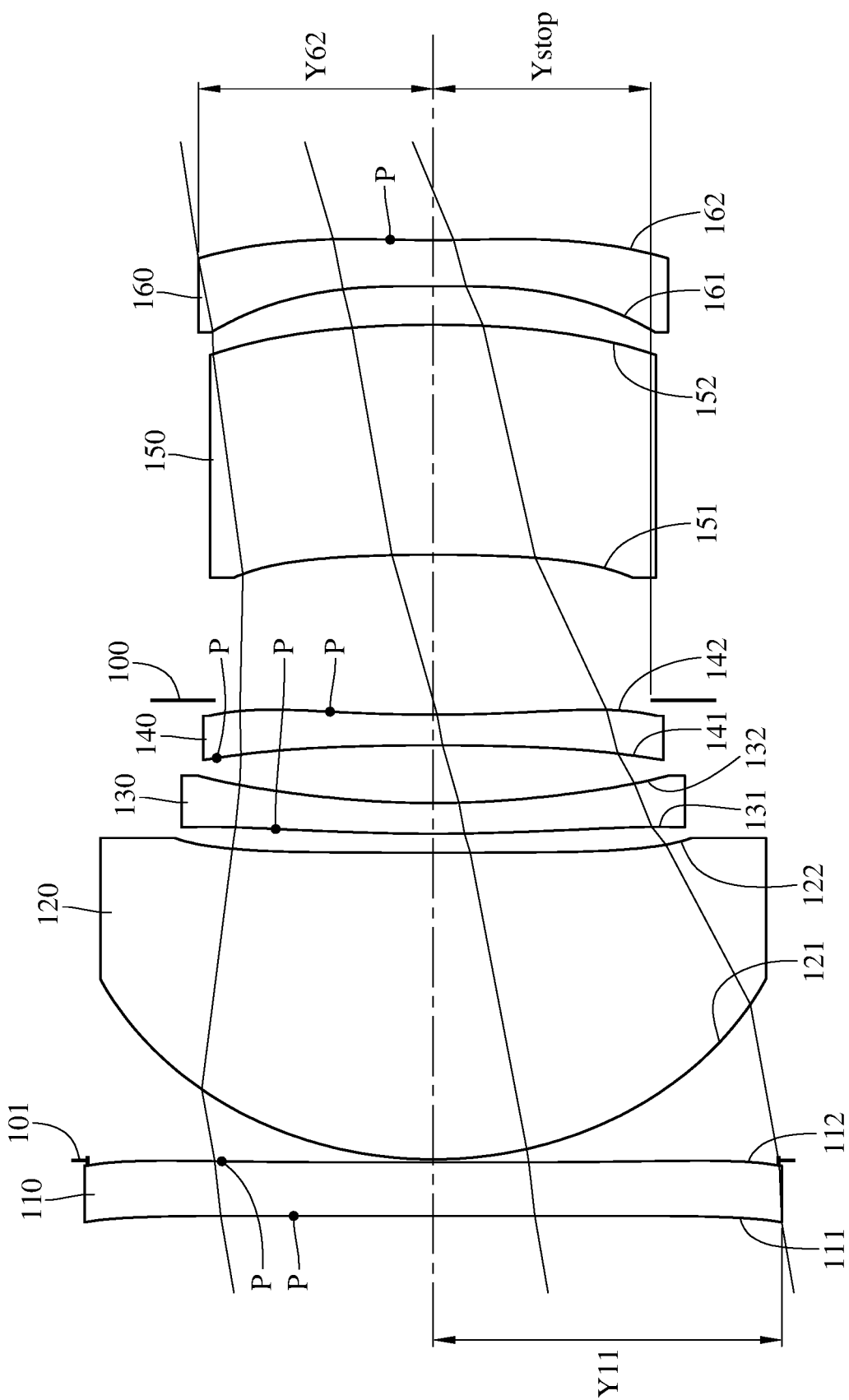
FIG. 25 shows a schematic view of Y11, Y62, Ystop and inflection points of the first lens element, the third lens element, the fourth lens element and the sixth lens element according to the 1st embodiment of the present disclosure.

According to the present disclosure, at least one of the first lens element, the second lens element, the third lens element, the fourth lens element, the fifth lens element and sixth lens element has at least one aspheric surface having at least one inflection point. Therefore, it is favorable for increasing the shape variation of the lens elements so as to correct aberrations and reduce the size of the imaging optical lens assembly. Preferably, each of at least two of the six lens elements has at least one aspheric surface having at least one inflection point. More preferably, each of at least three of the six lens elements has at least one aspheric surface having at least one inflection point. Much more preferably, each of at least four of the six lens elements has at least one aspheric surface having at least one inflection point. Please refer to FIG. 25, which shows a schematic view of inflection points P of the first lens element 110, the third lens element 130, the fourth lens element 140 and the sixth lens element 160 according to the 1st embodiment of the present disclosure.

When a focal length of the imaging optical lens assembly is f, and an axial distance between an object-side surface of the first lens element and an image surface is TL, the following condition is satisfied: $2.0 < f/(f-TL)$. Therefore, adjusting the total track length and the focal length of the imaging optical lens assembly is favorable for balancing between reducing the total track length and adjusting the field of view. Preferably, the following condition can also be satisfied: $2.5 < f/(f-TL) < 100.0$.

When the axial distance between the object-side surface of the first lens element and the image surface is TL, and a curvature radius of the object-side surface of the first lens element is R1, the following condition is satisfied: $-10.0 < TL/R1 < 1.8$. Therefore, adjusting the shape of the first lens element and the total track length is favorable for adjusting the traveling direction of light rays, strengthening the light converging capability of the imaging optical lens assembly and reducing the total track length. Preferably, the following condition can be satisfied: $-5.0 < TL/R1 < 1.4$. More preferably, the following condition can also be satisfied: $-3.0 < TL/R1 < 1.0$.

When the axial distance between the object-side surface of the first lens element and the image surface is TL, and an entrance pupil diameter of the imaging optical lens assembly is EPD, the following condition is satisfied: $1.0 < TL/EPD < 5.0$. Therefore, it is favorable for balancing between a short total track length and a large aperture size. Preferably, the following condition can also be satisfied: 1.2<TL/EPD<4.0.

When a maximum effective radius of the object-side surface of the first lens element is Y11, and a maximum effective radius of an image-side surface of the sixth lens element is Y62, the following condition is satisfied: 0.50<Y11/Y62<2.0. Therefore, adjusting the ratio of outer diameters of the object side and the image side of the imaging optical lens assembly is favorable for obtaining a balance between a small field of view and a short total track length. Preferably, the following condition can be satisfied: 0.55<Y11/Y62≤1.8. More preferably, the following condition can also be satisfied: 0.65<Y11/Y62≤1.54. Please refer to FIG. 25, which shows a schematic view of Y11, Y62 according to the 1st embodiment of the present disclosure.

When a minimum value among all Abbe numbers of the six lens elements of the imaging optical lens assembly is Vmin, the following condition can be satisfied: 10.0<Vmin<21.3. Therefore, since a lens material with low Abbe number generally features a stronger refractive capability, the lens elements made of a low Abbe number material is favorable for correcting aberrations such as chromatic aberration.

When an Abbe number of the fifth lens element is V5, and an Abbe number of the sixth lens element is V6, the following condition can be satisfied: 20.0<V5+V6<105.0. Therefore, selecting proper lens materials is favorable for the fifth lens element and the sixth lens element to work with each other so as to correct chromatic aberration. Preferably, the following condition can also be satisfied: 25.0<V5+V6<90.0.

When the axial distance between the object-side surface of the first lens element and the image surface is TL, the following condition can be satisfied: 1.0 [mm]<TL<17.0 [mm]. Therefore, it is favorable for keeping a short total track length of the imaging optical lens assembly for various applications, and preventing assembling problems due to overly short total track length. Preferably, the following condition can also be satisfied: 2.0 [mm]<TL<15.0 [mm].

When a sum of axial distances between every adjacent lens element of the six lens elements is ΣAT, and a sum of central thicknesses of the six lens elements of the imaging optical lens assembly is ΣCT, the following condition can be satisfied: 0<ΣAT/ΣCT<1.6. Therefore, it is favorable for properly arranging the lens elements of the imaging optical lens assembly so as to increase assembling yield rate and reduce the sensitivity.

When the Abbe number of the fifth lens element is V5, the following condition can be satisfied: 10.0<V5<45.0. Therefore, it is favorable for correcting chromatic aberration and enhancing telephoto effect of the imaging optical lens assembly. Preferably, the following condition can also be satisfied: 12.0<V5<38.0.

When the focal length of the imaging optical lens assembly is f, and a minimum value among all absolute values of focal lengths of each of the six lens elements of the imaging optical lens assembly is |f|min, the following condition can be satisfied: 1.40<f/|f|min. Therefore, it is favorable for the lens elements to have sufficient refractive power to converge light rays so as to reduce the size of the imaging optical lens assembly; furthermore, if is favorable for obtaining a telephoto configuration in the imaging optical lens assembly. Preferably, the following condition can also be satisfied: 1.70<f/|f|min<5.0.

When half of a maximum field of view of the imaging optical lens assembly is HFOV, the following condition can be satisfied: 5.0 [deg.]<HFOV<32.0 [deg.]. Therefore, it is favorable for obtaining a telephoto configuration in the imaging optical lens assembly and keeping the imaging optical lens assembly compact. Preferably, the following condition can be satisfied: 6.0 [deg.]<HFOV<25.0 [deg.]. More preferably, the following condition can also be satisfied: 7.0 [deg.]<HFOV<20.0 [deg.].

When a maximum value among all refractive indices of the six lens elements of the imaging optical lens assembly is Nmax, the following condition can be satisfied: 1.65<Nmax<1.75. Therefore, selecting lens materials having suitable refractive index is favorable for correcting aberrations so as to improve image quality.

Figure 26:
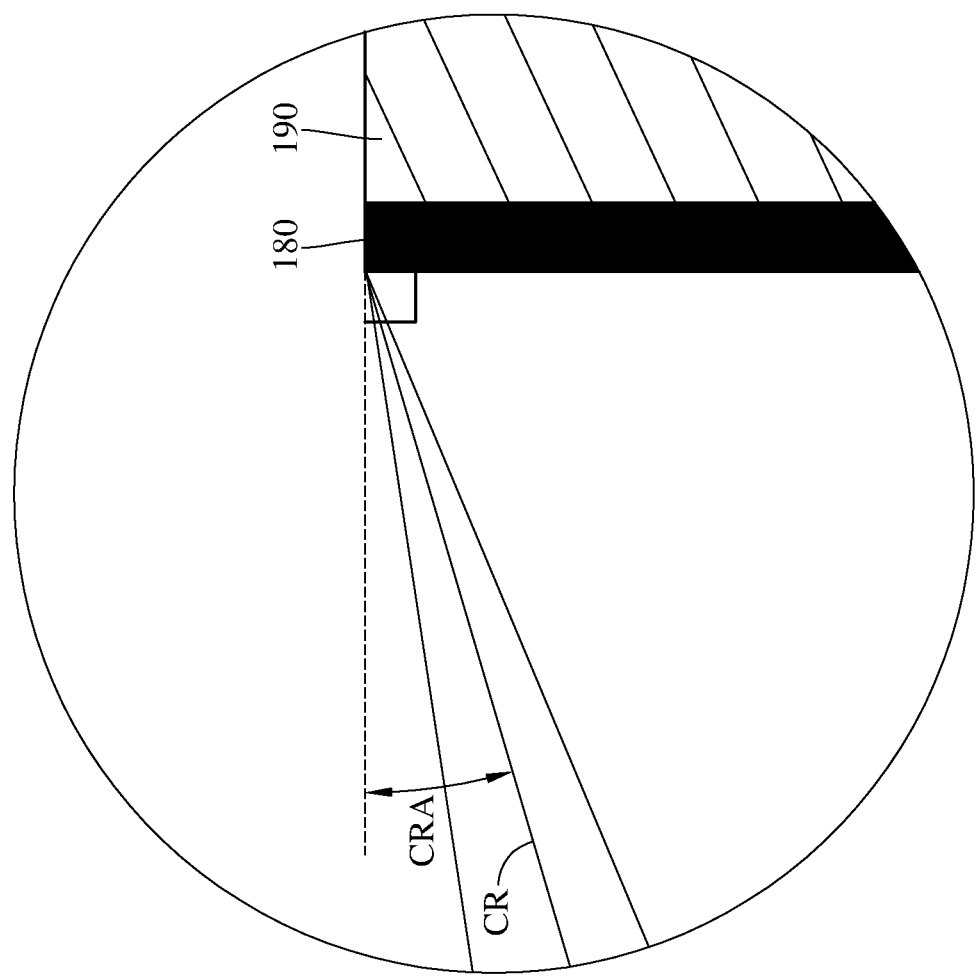
FIG. 26 shows a schematic view of CRA according to the 1st embodiment of the present disclosure.

When a chief ray angle at a maximum image height of the imaging optical lens assembly is CRA, the following condition can be satisfied: CRA<25.0 [deg.]. Therefore, it is favorable for improving the response efficiency of an image sensor. Please refer to FIG. 26, which shows a schematic view of CRA according to the 1st embodiment of the present disclosure, wherein a chief ray CR is projected on the image surface 180 at the maximum image height, and the angle between a normal line of the image surface 180 and the chief ray CR is CRA.

When the axial distance between the object-side surface of the first lens element and the image surface is TL, and the maximum image height of the imaging optical lens assembly (half of a diagonal length of an effective photosensitive area of an image sensor) is ImgH, the following condition can be satisfied: 1.5<TL/ImgH<7.0. Therefore, it is favorable for obtaining a balance between a short total track length and a large image surface.

When a maximum value among maximum effective radii of all lens surfaces of the six lens elements of the imaging optical lens assembly is Ymax, and a minimum value among maximum effective radii of all lens surfaces of the six lens elements of the imaging optical lens assembly is Ymin, the following condition can be satisfied: 1.0<Ymax/Ymin<2.0. Therefore, adjusting the outer diameter of the lens elements is favorable for receiving peripheral light rays so as to improve image quality, and keeping a proper size of the imaging optical lens assembly.

When a maximum value among all axial distances between every adjacent lens element of the six lens elements is ATmax, and an axial distance between the object-side surface of the first lens element and the image-side surface of the sixth lens element is TD, the following condition can be satisfied: 0<ATmax/TD<0.40. Therefore, it is favorable for preventing assembling problems due to an overly large axial distance between every adjacent lens element, and it is also favorable for preventing stray light.

When the focal length of the imaging optical lens assembly is f, a focal length of the first lens element is f1, a focal length of the second lens element is f2, a focal length of the third lens element is f3, a focal length of the fourth lens element is f4, a focal length of the fifth lens element is f5, and a focal length of the sixth lens element is f6, the following conditions can be satisfied: −2.0<f/f1<5.0; −5.0<f/f2<5.0; −5.0<f/f3<5.0; −5.0<f/f4<5.0; −5.0<f/f5<5.0; and −5.0<f/f6<5.0. Therefore, when one of the above conditions is satisfied, it is favorable for preventing a high sensitivity due to overly strong refractive power of the lens elements, thereby improving manufacturing yield rate. Preferably, the following conditions can be satisfied: −0.50<f/f1<1.0; −2.0<f/f2<3.0; −4.5<f/f3<3.0; −3.5<f/f4<3.0; −3.0<f/f5<3.0; and −3.0<f/f6<3.0. More preferably, the following condition can also be satisfied: −0.30<f/f1<0.30.

When an f-number of the imaging optical lens assembly is Fno, the following condition can be satisfied: 1.9<Fno<5.0. Therefore, it is favorable for providing the imaging optical lens assembly with sufficient size of aperture stop and adjusting the field of view.

According to the present disclosure, the imaging optical lens assembly further includes an aperture stop. When the maximum value among maximum effective radii of all lens surfaces of the six lens elements of the imaging optical lens assembly is Ymax, and an aperture radius of the aperture stop is Ystop, the following condition can be satisfied: 0<Ymax/Ystop<2.40. Therefore, it is favorable for adjusting the ratio of the outer diameter of the lens element to the aperture size so as to obtain a balance between the size of the imaging optical lens assembly and the aperture size. Please refer to FIG. 25, which shows a schematic view of Ystop according to the 1st embodiment of the present disclosure According to the present disclosure, at least three of the first lens element, the second lens element, the third lens element, the fourth lens element, the fifth lens element and sixth lens element can be made of plastic material. Therefore, it is favorable for reducing the weight and size of the imaging optical lens assembly and increasing the shape variation of the lens elements so as to correct aberrations. Preferably, at least four of the six lens elements can be made of plastic material.

Figure 27:
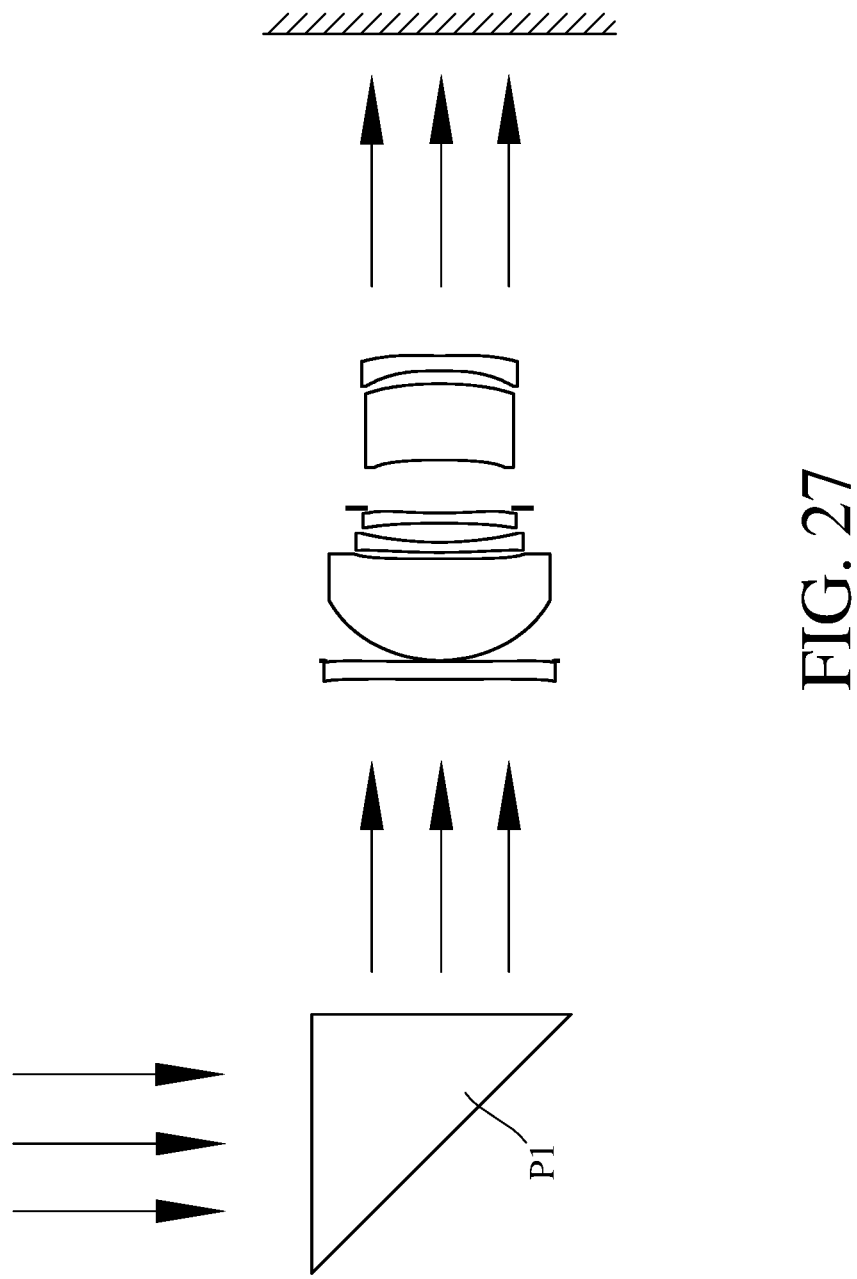
FIG. 27 shows a schematic view of a reflector and an imaging optical lens assembly according to one embodiment of the present disclosure.
Figure 28:
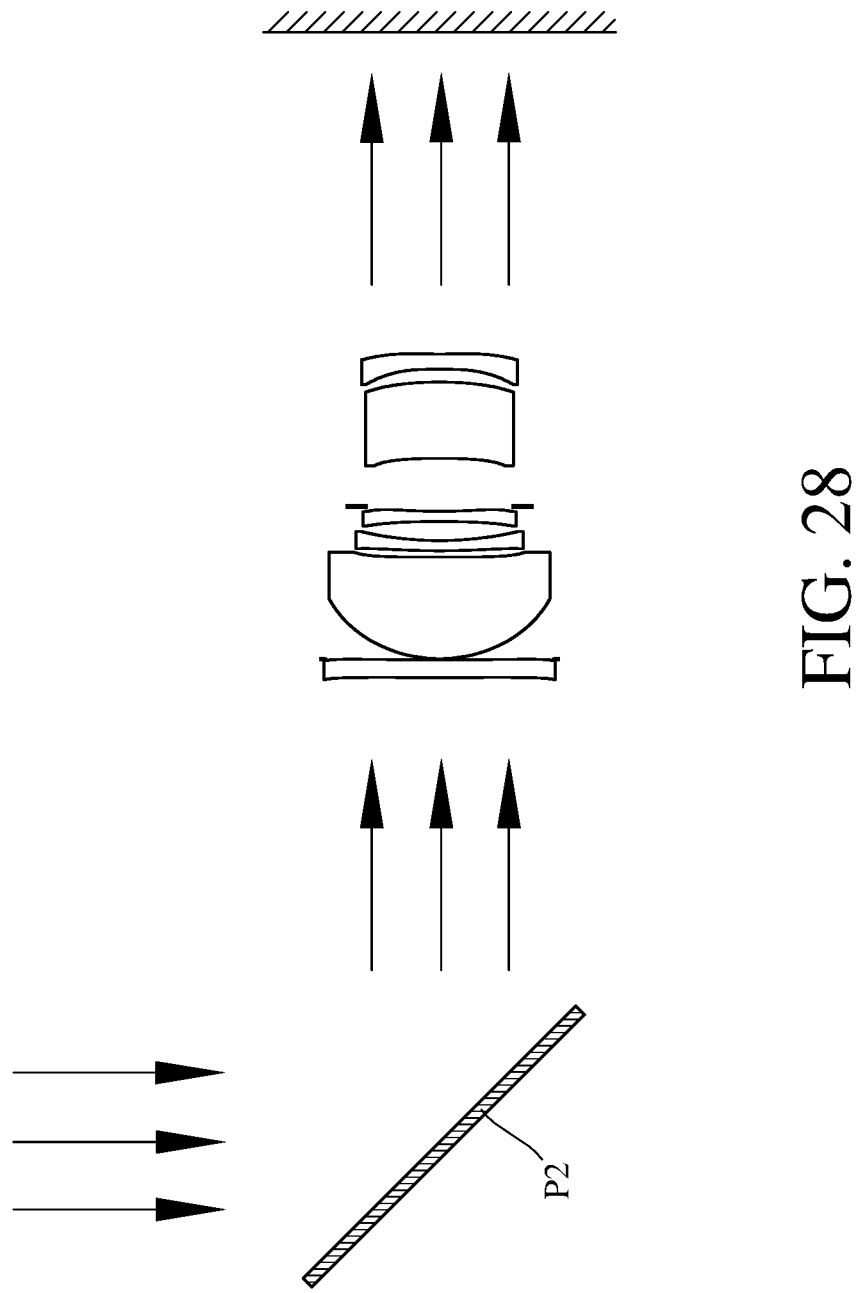
FIG. 28 shows a schematic view of another reflector and the imaging optical lens assembly according to one embodiment of the present disclosure.
Figure 29:
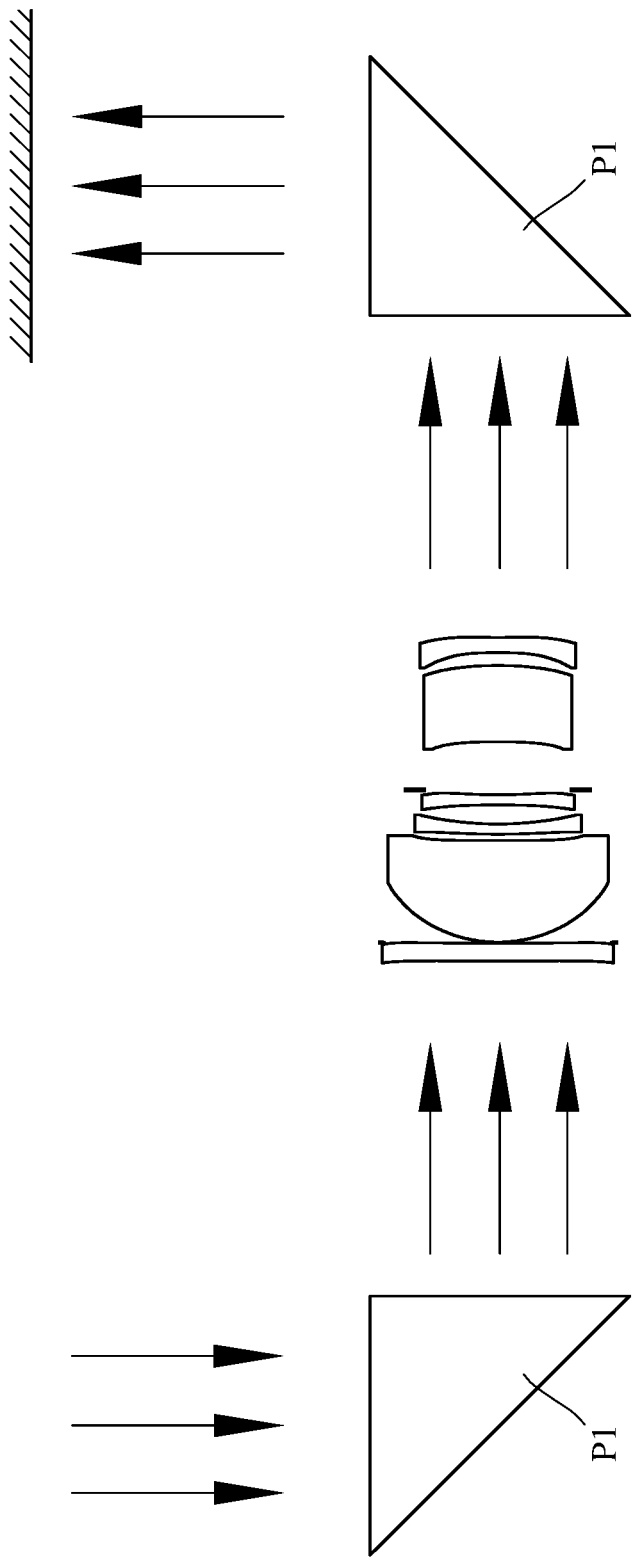
FIG. 29 shows a schematic view of two reflectors and the imaging optical lens assembly according to one embodiment of the present disclosure.
Figure 30:
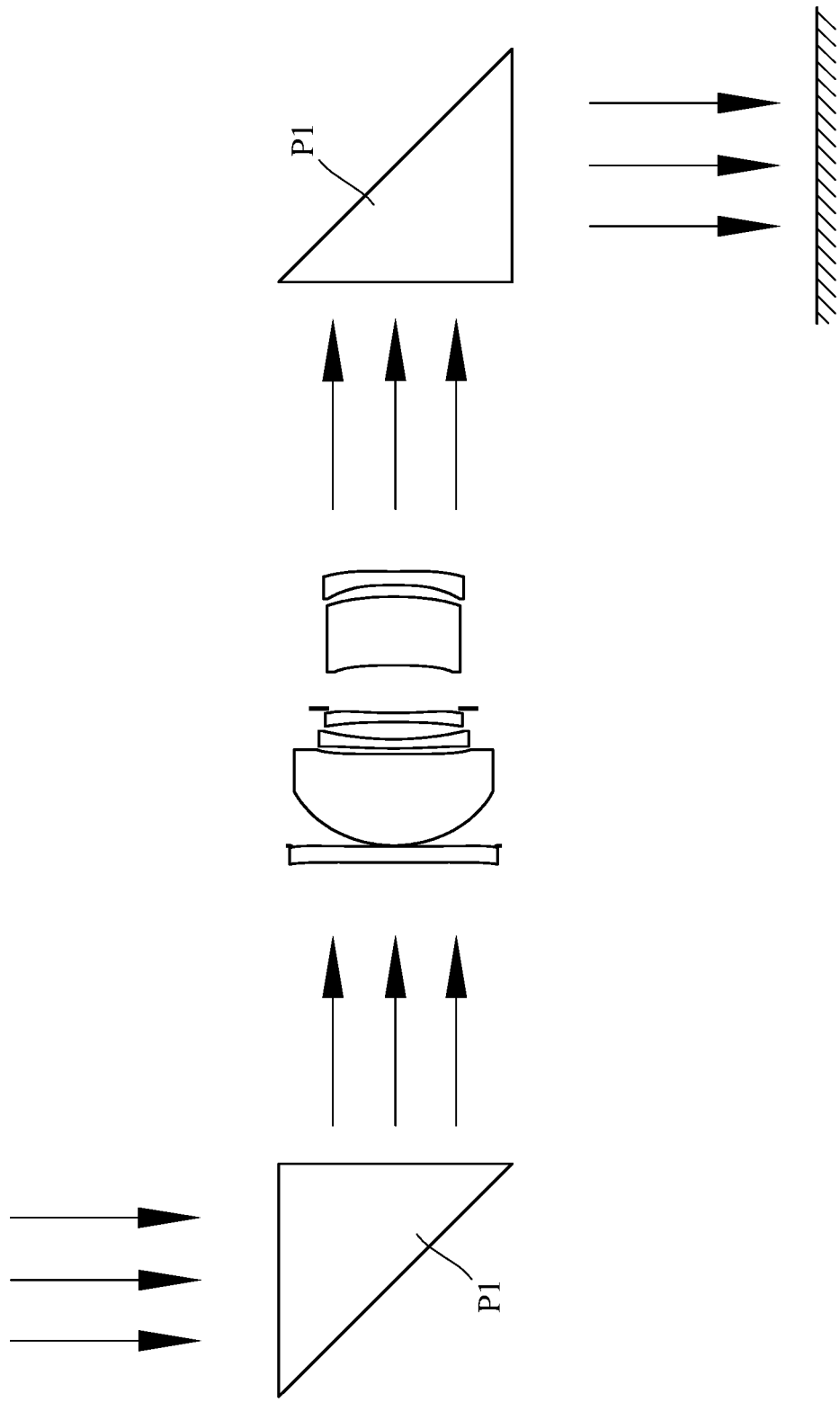
FIG. 30 shows a schematic view of two reflectors and the imaging optical lens assembly according to another embodiment of the present disclosure.
Figure 31:
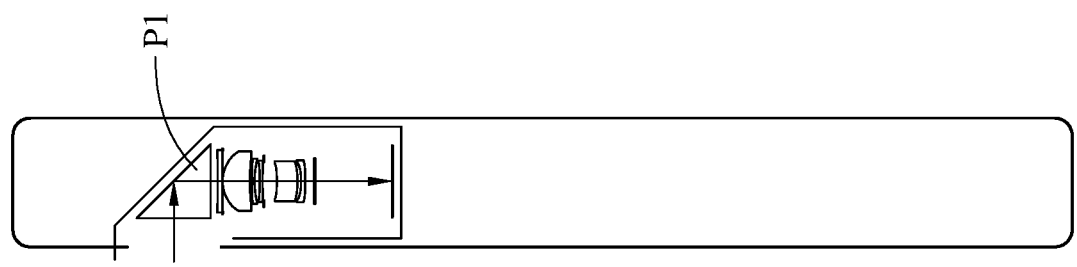
FIG. 31 shows a schematic side view of an electronic device including the reflector and the imaging optical lens assembly according to one embodiment of the present disclosure.

According to the present disclosure, the imaging optical lens assembly can include at least one reflector. The reflector is, for example, a prism or a mirror. Therefore, the traveling direction of light rays can be changed, such that it is favorable for obtaining good space utilization and also more design flexibility in the imaging optical lens assembly. As seen in FIG. 27, which shows a schematic view of a reflector and the imaging optical lens assembly according to the present disclosure, wherein the reflector is a prism P1 disposed between the imaged object (not shown in the drawings) and the lens elements of the imaging optical lens assembly (its reference numerals is omitted). As shown in FIG. 28, which shows a schematic view of another reflector and the imaging optical lens assembly according to the present disclosure, the reflector is a mirror P2. Please refer to FIG. 29 and FIG. 30. FIG. 29 shows a schematic view of two reflectors and the imaging optical lens assembly according to the present disclosure, and FIG. 30 shows a schematic view of another configuration of two reflectors and the imaging optical lens assembly according to the present disclosure, wherein the two prisms P1 are respectively located on the object side and the image side of the lens elements of the imaging optical lens assembly. As shown in FIG. 31, the traveling direction of incident light rays can be changed by the reflector (the prism P1), such that the dimensions of the electronic device is not restricted by the total track length of the imaging optical lens assembly. The type, the amount and the position of the reflector are not limited to the embodiments disclosed in the aforementioned figures.

According to the present disclosure, the aforementioned features and conditions can be utilized in numerous combinations so as to achieve corresponding effects.

According to the present disclosure, the lens elements of the imaging optical lens assembly can be made of either glass or plastic material. When the lens elements are made of glass material, the refractive power distribution of the imaging optical lens assembly may be more flexible. The glass lens element can either be made by grinding or molding. When the lens elements are made of plastic material, the manufacturing cost can be effectively reduced.

Furthermore, surfaces of each lens element can be arranged to be aspheric, which allows more control variables for eliminating aberrations thereof, the required number of the lens elements can be reduced, and the total track length of the imaging optical lens assembly can be effectively shortened. The aspheric surfaces may be formed by plastic injection molding or glass molding.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, an image surface of the imaging optical lens assembly, based on the corresponding image sensor, can be flat or curved, especially a curved surface being concave facing towards the object side of the imaging optical lens assembly.

According to the present disclosure, an image correction unit, such as a field flattener, can be optionally disposed between the lens element closest to the image side of the imaging optical lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the imaging optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens assembly and thereby provides a wider field of view for the same.

According to the present disclosure, the imaging optical lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
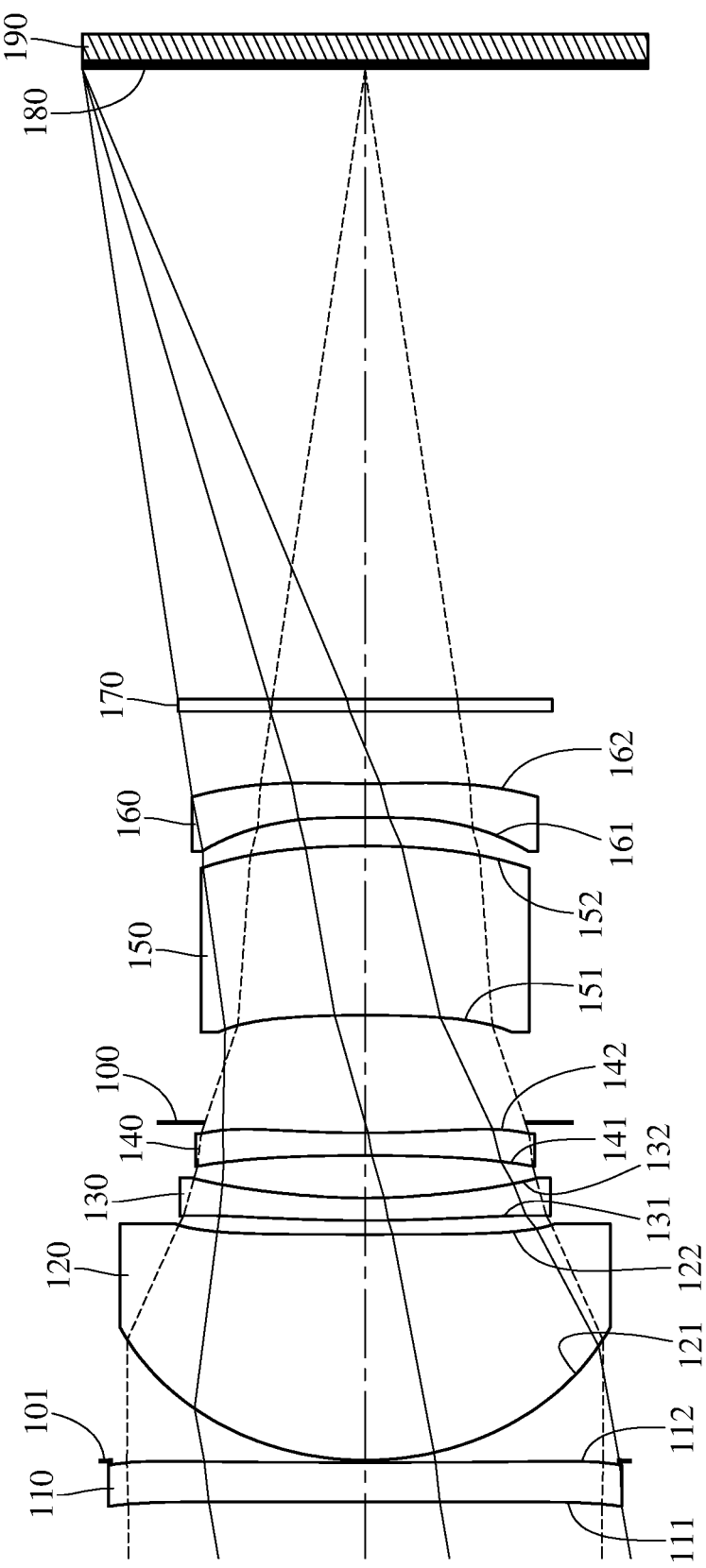
FIG. 1 is a schematic view of an image capturing unit according to the 1st embodiment of the present disclosure.
Figure 2:
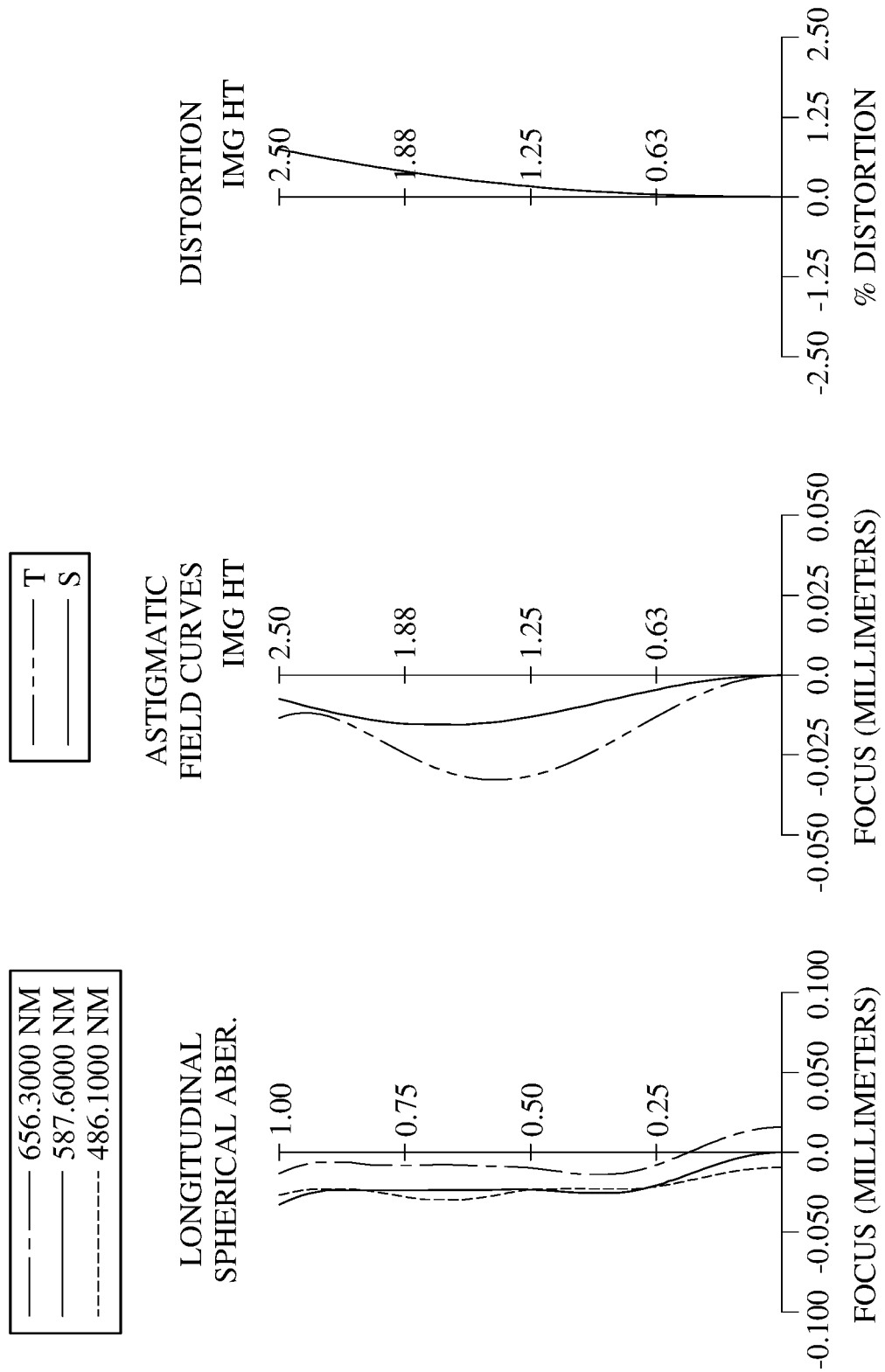
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging optical lens assembly (its reference numeral is omitted) of the present disclosure and an image sensor 190. The imaging optical lens assembly includes, in order from an object side to an image side, a first lens element 110, a stop 101, a second lens element 120, a third lens element 130, a fourth lens element 140, an aperture stop 100, a fifth lens element 150, a sixth lens element 160, a filter 170 and an image surface 180. The imaging optical lens assembly includes six lens elements (110, 120, 130, 140, 150 and 160) with no additional lens element disposed between each of the adjacent six lens elements.

The first lens element 110 has an object-side surface 111 being planar in a paraxial region thereof and an image-side surface 112 being planar in a paraxial region thereof. The first lens element 110 is made of plastic material and has the object-side surface 111 and the image-side surface 112 being both aspheric. The object-side surface 111 of the first lens element 110 has one inflection point. The image-side surface 112 of the first lens element 110 has one inflection point.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has one inflection point.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has one inflection point. The image-side surface 142 of the fourth lens element 140 has one inflection point.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being concave in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has one inflection point.

The filter 170 is made of glass material and located between the sixth lens element 160 and the image surface 180, and will not affect the focal length of the imaging optical lens assembly. The image sensor 190 is disposed on or near the image surface 180 of the imaging optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging optical lens assembly of the image capturing unit according to the 1st embodiment, when a focal length of the imaging optical lens assembly is f, an f-number of the imaging optical lens assembly is Fno, and half of a maximum field of view of the imaging optical lens assembly is HFOV, these parameters have the following values: f=14.46 millimeters (mm), Fno=3.45, HFOV=9.8 degrees (deg.).

When a maximum value among all refractive indices of the six lens elements of the imaging optical lens assembly is Nmax, the following condition is satisfied: Nmax=1.68. In this embodiment, Nmax is equal to the refractive index of the fifth lens element 150.

When an Abbe number of the fifth lens element 150 is V5, the following condition is satisfied: V5=18.4.

When the Abbe number of the fifth lens element 150 is V5, and an Abbe number of the sixth lens element 160 is V6, the following condition is satisfied: V5+V6=74.4.

When a minimum value among all Abbe numbers of the six lens elements of the imaging optical lens assembly is Vmin, the following condition is satisfied: Vmin=18.4. In this embodiment, Vmin is equal to the Abbe number of the fifth lens element 150.

When a maximum value among all axial distances between every adjacent lens element of the six lens elements is ATmax, and an axial distance between the object-side surface 111 of the first lens element 110 and the image-side surface 162 of the sixth lens element 160 is TD, the following condition is satisfied: ATmax/TD=0.16. In this embodiment, ATmax=1.04, which is equal to the axial distance between the fourth lens element 140 and the fifth lens element 150. In this embodiment, an axial distance between two adjacent lens elements is an air gap in a paraxial region between the two adjacent lens elements.

When a sum of axial distances between every adjacent lens element of the six lens elements is $\Sigma AT$, and a sum of central thicknesses of the six lens elements of the imaging optical lens assembly is $\Sigma CT$, the following condition is satisfied: $\Sigma AT/\Sigma CT$=0.40.

When an axial distance between the object-side surface 111 of the first lens element 110 and the image surface 180 is TL, the following condition is satisfied: TL=12.70 [mm].

When the axial distance between the object-side surface 111 of the first lens element 110 and the image surface 180 is TL, and an entrance pupil diameter of the imaging optical lens assembly is EPD, the following condition is satisfied: TL/EPD=3.03.

When the axial distance between the object-side surface 111 of the first lens element 110 and the image surface 180 is TL, and a maximum image height of the imaging optical lens assembly is ImgH, the following condition is satisfied: TL/ImgH=5.08.

When the axial distance between the object-side surface 111 of the first lens element 110 and the image surface 180 is TL, and a curvature radius of the object-side surface 111 of the first lens element 110 is R1, the following condition is satisfied: TL/R1=0.00.

When the focal length of the imaging optical lens assembly is f, and the axial distance between the object-side surface 111 of the first lens element 110 and the image surface 180 is TL, the following condition is satisfied: f/(f−TL)=8.22.

When the focal length of the imaging optical lens assembly is f, and a focal length of the first lens element 110 is f1, the following condition is satisfied: f/f1=0.00.

When the focal length of the imaging optical lens assembly is f, and a focal length of the second lens element 120 is f2, the following condition is satisfied: f/f2=2.66.

When the focal length of the imaging optical lens assembly is f, and a focal length of the third lens element 130 is f3, the following condition is satisfied: f/f3=−0.75.

When the focal length of the imaging optical lens assembly is f, and a focal length of the fourth lens element 140 is f4, the following condition is satisfied: f/f4=−1.33.

When the focal length of the imaging optical lens assembly is f, and a focal length of the fifth lens element 150 is f5, the following condition is satisfied: f/f5=0.41.

When the focal length of the imaging optical lens assembly is f, and a focal length of the sixth lens element 160 is f6, the following condition is satisfied: f/f6=−0.99.

When the focal length of the imaging optical lens assembly is f, and a minimum value among all absolute values of focal lengths of each of the six lens elements of the imaging optical lens assembly is |f|min, the following condition is satisfied: f/|f|min=2.66. In this embodiment, |f|min=5.44, which is equal to the absolute value of the focal length of the second lens element 120.

When a chief ray angle at the maximum image height of the imaging optical lens assembly is CRA, the following condition is satisfied: CRA=16.4 [deg.].

When a maximum effective radius of the object-side surface 111 of the first lens element 110 is Y11, and a maximum effective radius of the image-side surface 162 of the sixth lens element 160 is Y62, the following condition is satisfied: Y11/Y62=1.48.

When a maximum value among maximum effective radii of all lens surfaces of the six lens elements of the imaging optical lens assembly is Ymax, and a minimum value among maximum effective radii of all lens surfaces of the six lens elements of the imaging optical lens assembly is Ymin, the following condition is satisfied: Ymax/Ymin=1.75. In this embodiment, Ymax=2.27, which is equal to the maximum effective radius of the object-side surface 111 of the first lens element 110; Ymin=1.30, which is equal to the maximum effective radius of the object-side surface 151 of the fifth lens element 150.

When the maximum value among maximum effective radii of all lens surfaces of the six lens elements of the imaging optical lens assembly is Ymax, and an aperture radius of the aperture stop 100 is Ystop, the following condition is satisfied: Ymax/Ystop=1.60.

The detailed optical data of the 1st embodiment are shown in Table 1 and the aspheric surface data are shown in Table 2 below.

TABLE 1

1st Embodiment
f = 14.46 mm, Fno = 3.45, HFOV = 9.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | ∞ | (ASP) | 0.350 | Plastic | 1.582 | 30.2 | ∞ |
| 2 | | ∞ | (ASP) | 0.013 | | | | |
| 3 | Stop | Plano | | 0.007 | | | | |
| 4 | Lens 2 | 2.792 | (ASP) | 2.000 | Plastic | 1.534 | 55.9 | 5.44 |
| 5 | | 54.980 | (ASP) | 0.124 | | | | |
| 6 | Lens 3 | 11.785 | (ASP) | 0.200 | Plastic | 1.660 | 20.4 | −19.32 |
| 7 | | 6.083 | (ASP) | 0.377 | | | | |
| 8 | Lens 4 | −14.758 | (ASP) | 0.200 | Plastic | 1.614 | 26.0 | −10.85 |
| 9 | | 12.189 | (ASP) | 0.093 | | | | |
| 10 | Ape. Stop | Plano | | 0.950 | | | | |

TABLE 1-continued

1st Embodiment
f = 14.46 mm, Fno = 3.45, HFOV = 9.8 deg.

| Surface # | | Curvature Radius | | Thickness | Material | Index | Abbe # | Focal Length |
|---|---|---|---|---|---|---|---|---|
| 11 | Lens 5 | −12.748 | (ASP) | 1.500 | Plastic | 1.680 | 18.4 | 35.22 |
| 12 | | −8.716 | (ASP) | 0.252 | | | | |
| 13 | Lens 6 | −83.560 | (ASP) | 0.300 | Plastic | 1.544 | 56.0 | −14.65 |
| 14 | | 8.825 | (ASP) | 0.640 | | | | |
| 15 | Filter | Plano | | 0.110 | Glass | 1.517 | 64.2 | — |
| 16 | | Plano | | 5.586 | | | | |
| 17 | Image | Plano | | — | | | | |

Note:
Reference wavelength is 587.6 nm (d-line).
An effective radius of the stop 101 (Surface 3) is 2.250 mm.
An effective radius of the image-side surface 162 (Surface 14) is 1.530 mm.

TABLE 2

Aspheric Coefficients

| | Surface # | | | | | |
|---|---|---|---|---|---|---|
| | 1 | 2 | 4 | 5 | 6 | 7 |
| k = | 0.0000E+00 | 0.0000E+00 | 3.5200E−01 | −9.0000E+01 | 3.1121E+01 | 5.6550E+00 |
| A4 = | 1.5522E−03 | 4.6390E−03 | 8.5328E−04 | −1.5862E−02 | −2.7780E−02 | −9.1168E−03 |
| A6 = | −1.0631E−03 | −2.3462E−03 | −1.1497E−03 | 2.3329E−02 | 1.6394E−02 | −8.3142E−03 |
| A8 = | 2.4428E−04 | 7.0486E−04 | 4.6409E−04 | −1.0413E−02 | −7.6832E−03 | 9.7412E−03 |
| A10 = | −3.2620E−05 | −1.2252E−04 | −8.0966E−05 | 2.2164E−03 | −5.5651E−03 | −3.8494E−03 |
| A12 = | 5.3387E−07 | 6.4823E−06 | 5.2453E−06 | −1.2816E−04 | 2.4847E−03 | 5.7799E−04 |
| A14 = | — | — | — | — | −3.2964E−04 | — |

| | Surface # | | | | | |
|---|---|---|---|---|---|---|
| | 8 | 9 | 11 | 12 | 13 | 14 |
| k = | −9.0000E+01 | 0.0000E+00 | 5.9788E+01 | −1.0000E+00 | 9.0000E+01 | −7.5884E+01 |
| A4 = | 2.8954E−02 | 2.4312E−02 | −1.0266E−02 | −5.2067E−02 | −2.0092E−01 | −1.2836E−01 |
| A6 = | −6.9822E−02 | −6.7696E−02 | −7.4470E−03 | 5.3634E−02 | 1.6506E−01 | 1.1255E−01 |
| A8 = | 5.6803E−02 | 5.6468E−02 | 6.8951E−03 | −3.1555E−02 | −6.2518E−02 | −6.3725E−02 |
| A10 = | −2.2100E−02 | −2.8991E−02 | −1.1494E−02 | 8.7652E−03 | −1.5036E−02 | 1.7340E−02 |
| A12 = | 3.4327E−03 | 7.4811E−03 | 6.7307E−03 | −2.3943E−03 | 2.1579E−02 | −2.4803E−05 |
| A14 = | −3.3937E−05 | −7.1257E−04 | −1.9844E−03 | 1.0738E−03 | −6.8571E−03 | −1.0384E−03 |
| A16 = | — | — | 3.1702E−04 | −1.9956E−04 | 7.4698E−04 | 1.6164E−04 |

In Table 1, the curvature radius, the thickness and the focal length are shown in millimeters (mm). Surface numbers 0-17 represent the surfaces sequentially arranged from the object side to the image side along the optical axis. In Table 2, k represents the conic coefficient of the equation of the aspheric surface profiles. A4-16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
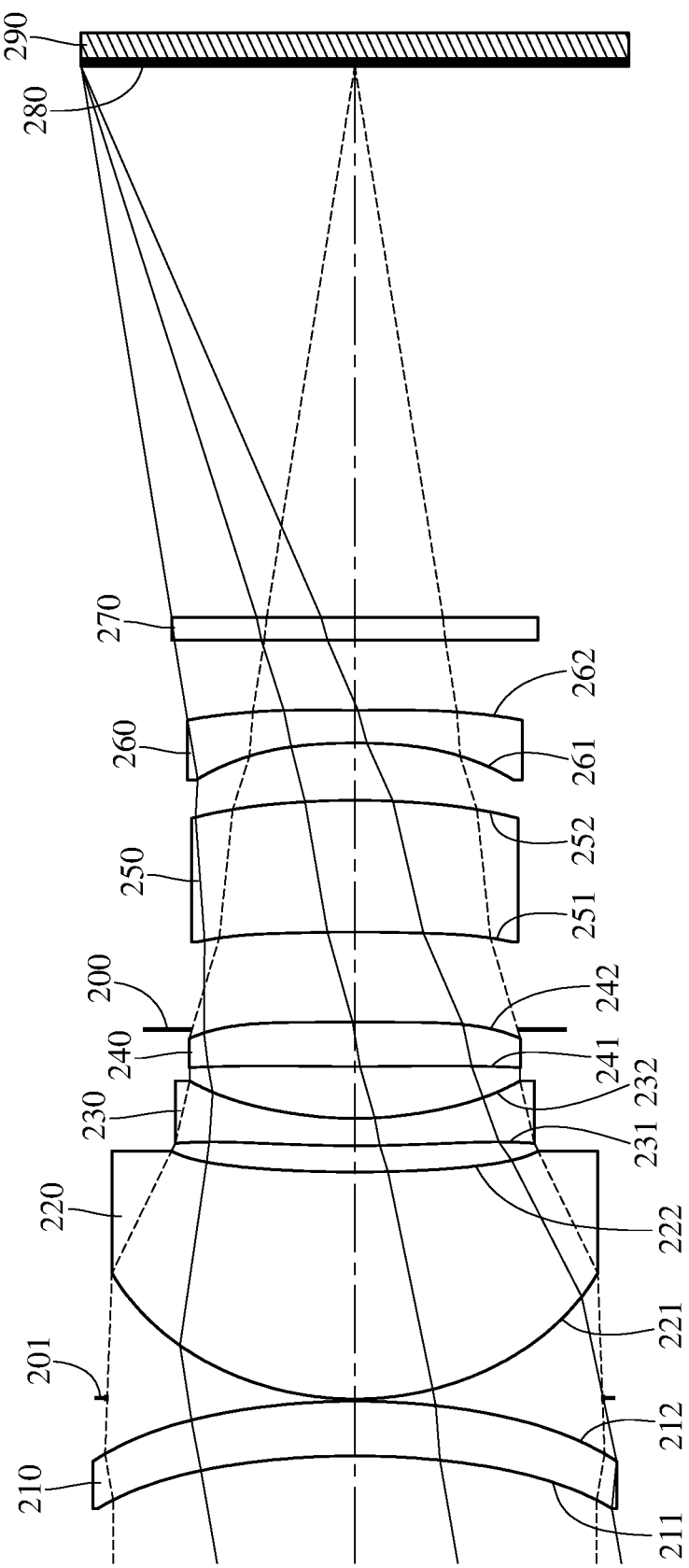
FIG. 3 is a schematic view of an image capturing unit according to the 2nd embodiment of the present disclosure.
Figure 4:
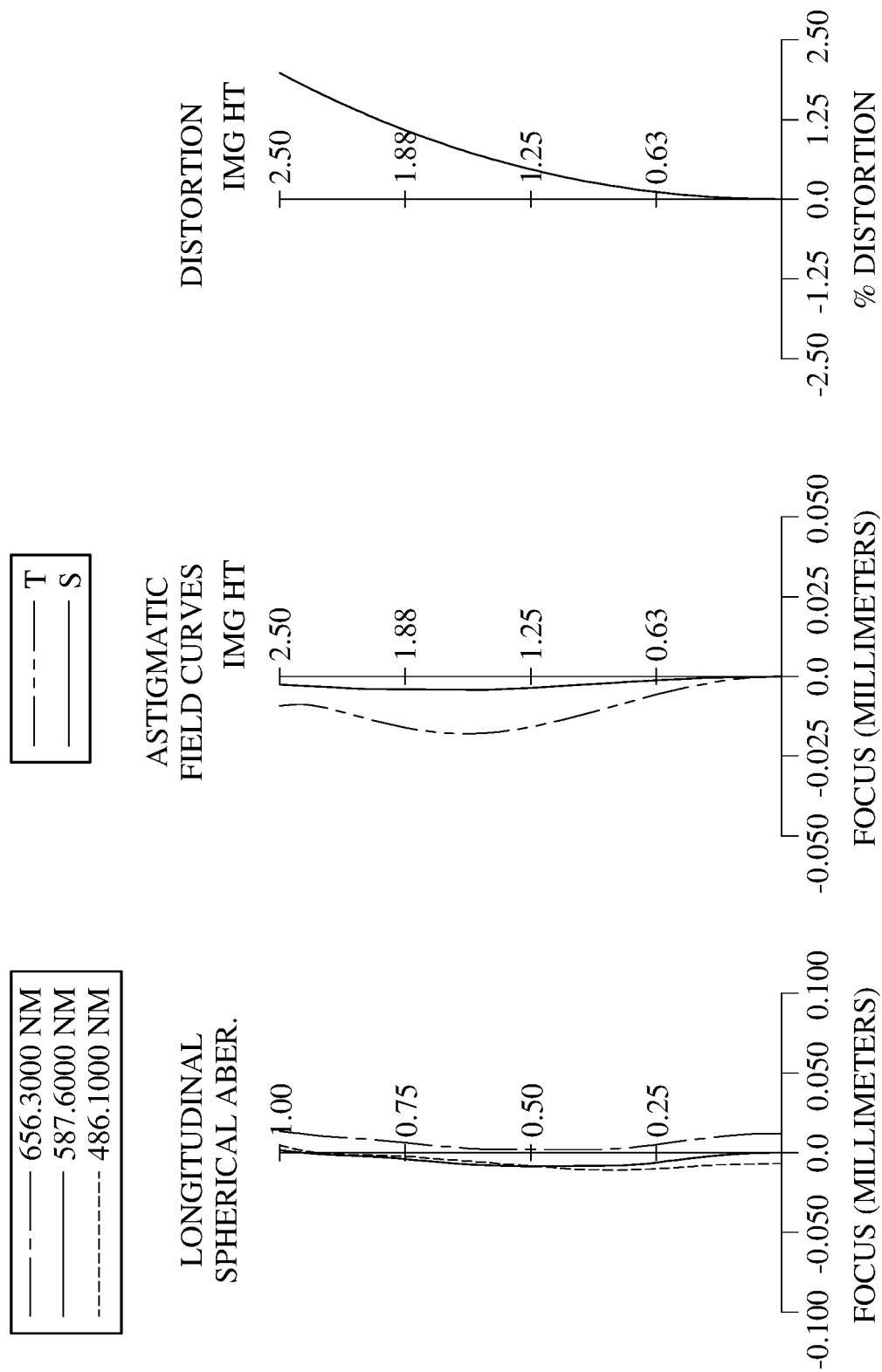
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging optical lens assembly (its reference numeral is omitted) of the present disclosure and an image sensor 290. The imaging optical lens assembly includes, in order from an object side to an image side, a first lens element 210, a stop 201, a second lens element 220, a third lens element 230, a fourth lens element 240, an aperture stop 200, a fifth lens element 250, a sixth lens element 260, a filter 270 and an image surface 280. The imaging optical lens assembly includes six lens elements (210, 220, 230, 240, 250 and 260) with no additional lens element disposed between each of the adjacent six lens elements.

The first lens element 210 with positive refractive power has an object-side surface 211 being concave in a paraxial region thereof and an image-side surface 212 being convex in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has one inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has one inflection point.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has one inflection point.

The filter 270 is made of glass material and located between the sixth lens element 260 and the image surface 280, and will not affect the focal length of the imaging optical lens assembly. The image sensor 290 is disposed on or near the image surface 280 of the imaging optical lens assembly.

The detailed optical data of the 2nd embodiment are shown in Table 3 and the aspheric surface data are shown in Table 4 below.

TABLE 3

2nd Embodiment
f = 14.01 mm, Fno = 3.17, HFOV = 9.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −7.553 | (ASP) | 0.500 | Plastic | 1.534 | 55.9 | 100.43 |
| 2 | | −6.773 | (ASP) | 0.030 | | | | |
| 3 | Stop | Plano | | −0.010 | | | | |
| 4 | Lens 2 | 2.868 | (ASP) | 2.077 | Plastic | 1.534 | 55.9 | 6.45 |
| 5 | | 12.869 | (ASP) | 0.240 | | | | |
| 6 | Lens 3 | 11.999 | (ASP) | 0.250 | Plastic | 1.688 | 18.7 | −6.94 |
| 7 | | 3.388 | (ASP) | 0.475 | | | | |
| 8 | Lens 4 | 35.559 | (ASP) | 0.407 | Plastic | 1.642 | 22.5 | 24.27 |
| 9 | | −27.586 | (ASP) | −0.069 | | | | |
| 10 | Ape. Stop | Plano | | 0.892 | | | | |
| 11 | Lens 5 | −13.739 | (ASP) | 1.205 | Plastic | 1.688 | 18.7 | 18.08 |
| 12 | | −6.763 | (ASP) | 0.524 | | | | |
| 13 | Lens 6 | −5.264 | (ASP) | 0.300 | Plastic | 1.544 | 56.0 | −8.61 |
| 14 | | 43.491 | (ASP) | 0.640 | | | | |
| 15 | Filter | Plano | | 0.210 | Glass | 1.517 | 64.2 | — |
| 16 | | Plano | | 5.038 | | | | |
| 17 | Image | Plano | | — | | | | |

Note:
Reference wavelength is 587.6 nm (d-line).
An effective radius of the stop 201 (Surface 3) is 2.270 mm.
An effective radius of the image-side surface 262 (Surface 14) is 1.530 mm.

TABLE 4

Aspheric Coefficients

| Surface # | | | | | |
|---|---|---|---|---|---|
| 1 | 2 | 4 | 5 | 6 | 7 |
| k = 6.0368E+00 | 3.2777E+00 | 3.2124E−01 | −9.6788E+00 | −2.6053E+01 | 2.4890E+00 |
| A4 = 4.1762E−03 | 1.9853E−03 | −3.7058E−03 | 7.1581E−03 | −1.8415E−02 | −4.3033E−02 |
| A6 = −1.9336E−03 | −7.4822E−04 | 9.1399E−04 | −6.1212E−03 | 1.3186E−02 | 2.7295E−02 |
| A8 = 3.0233E−04 | −1.3495E−05 | −8.0919E−05 | 5.0335E−03 | −8.7828E−03 | −1.0806E−02 |
| A10 = −2.2856E−05 | 1.3122E−05 | −8.6395E−06 | −1.4694E−03 | 2.6964E−03 | 2.5548E−03 |
| A12 = 6.7990E−07 | −1.0958E−06 | 1.6596E−06 | 2.1858E−04 | −3.6691E−04 | −3.9365E−04 |
| A14 = — | — | — | — | 1.6260E−05 | — |

| Surface # | | | | | |
|---|---|---|---|---|---|
| 8 | 9 | 11 | 12 | 13 | 14 |
| k = 9.0000E+01 | 0.0000E+00 | 2.5442E+01 | −1.1270E+01 | −4.3612E+00 | −4.8341E+01 |
| A4 = 1.0059E−02 | 4.1299E−02 | 4.8591E−02 | 3.4657E−02 | −2.0648E−02 | −3.5019E−02 |
| A6 = −4.9791E−02 | −8.4824E−02 | −6.4021E−02 | −5.1109E−02 | −5.8730E−02 | −1.4882E−02 |

TABLE 4-continued

| Aspheric Coefficients | | | | | |
|---|---|---|---|---|---|
| A8 = | 4.6678E−02 | 5.4835E−02 | 3.9066E−02 | 2.8446E−02 | 6.3775E−02 | 3.1407E−02 |
| A10 = | −2.1155E−02 | −2.1076E−02 | −2.0664E−02 | −8.8455E−03 | −3.0633E−02 | −1.8284E−02 |
| A12 = | 5.0425E−03 | 4.5902E−03 | 9.7452E−03 | 2.2251E−03 | 8.1045E−03 | 5.1145E−03 |
| A14 = | −5.3827E−04 | −4.5523E−04 | −2.8942E−03 | −6.1678E−04 | −1.4118E−03 | −6.8587E−04 |
| A16 = | — | — | 3.6741E−04 | 9.2782E−05 | 1.4740E−04 | 3.3317E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 14.01 | f/(f − TL) | 10.76 |
| Fno | 3.17 | f/f1 | 0.14 |
| HFOV [deg.] | 9.9 | f/f2 | 2.17 |
| Nmax | 1.69 | f/f3 | −2.02 |
| V5 | 18.7 | f/f4 | 0.58 |
| V5 + V6 | 74.7 | f/f5 | 0.77 |
| Vmin | 18.7 | f/f6 | −1.63 |
| ATmax/TD | 0.12 | f/|f|min | 2.17 |
| ΣAT/ΣCT | 0.44 | CRA [deg.] | 17.7 |
| TL [mm] | 12.71 | Y11/Y62 | 1.54 |
| TL/EPD | 2.88 | Ymax/Ymin | 1.66 |
| TL/ImgH | 5.08 | Ymax/Ystop | 1.61 |
| TL/R1 | −1.68 | — | — |

3rd Embodiment

Figure 5:
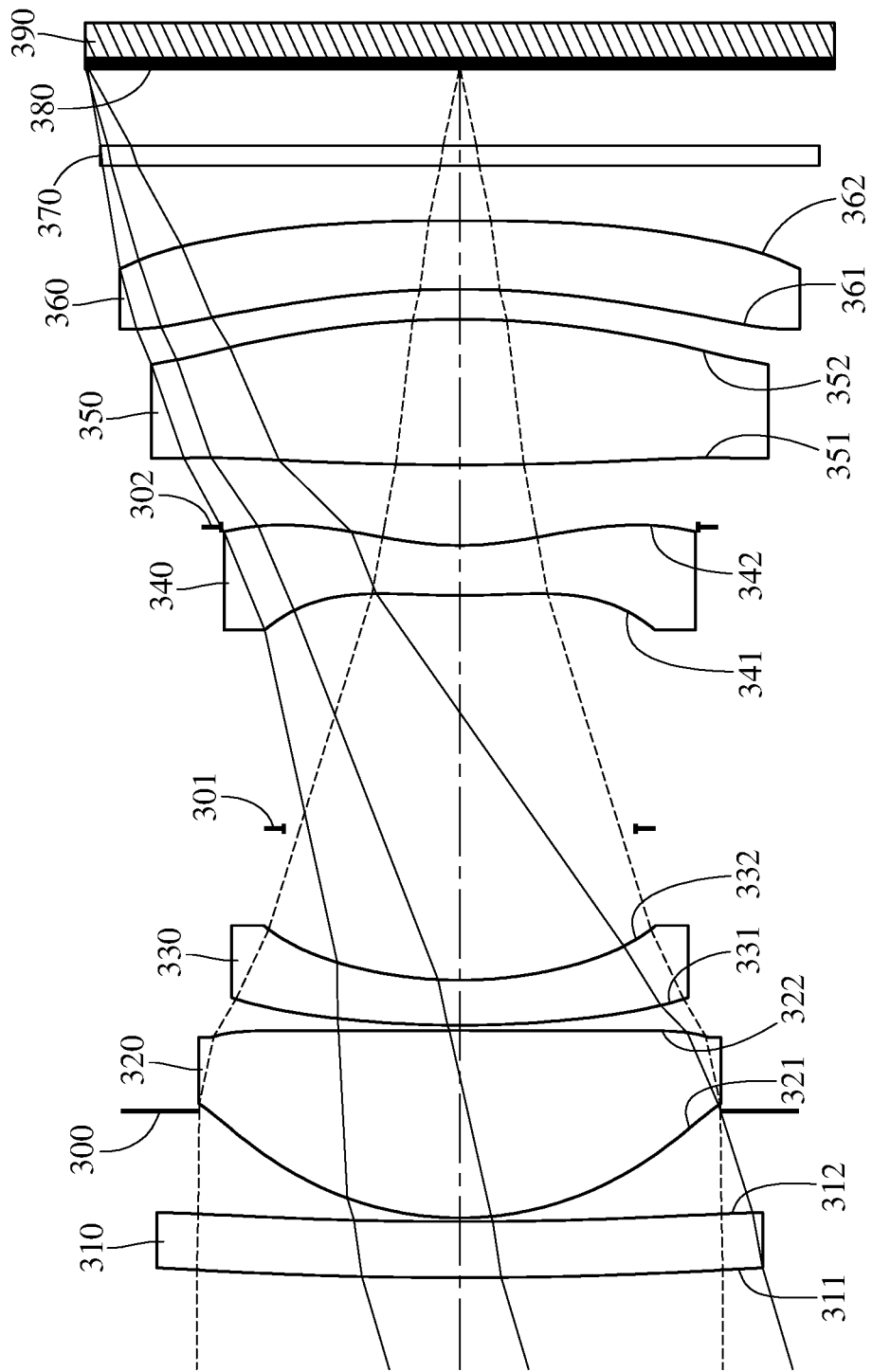
FIG. 5 is a schematic view of an image capturing unit according to the 3rd embodiment of the present disclosure.
Figure 6:
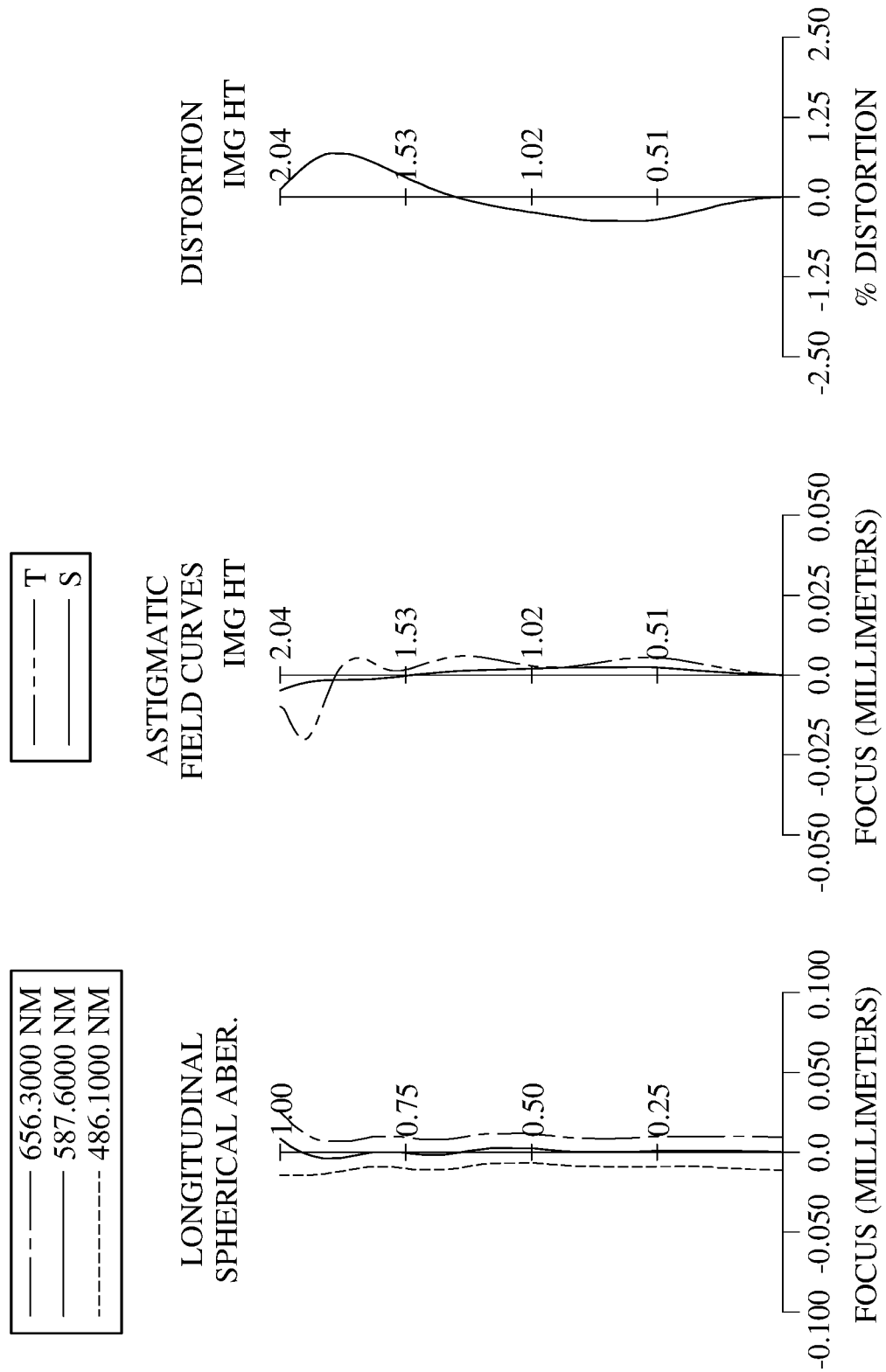
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging optical lens assembly (its reference numeral is omitted) of the present disclosure and an image sensor 390. The imaging optical lens assembly includes, in order from an object side to an image side, a first lens element 310, an aperture stop 300, a second lens element 320, a third lens element 330, a stop 301, a fourth lens element 340, a stop 302, a fifth lens element 350, a sixth lens element 360, a filter 370 and an image surface 380. The imaging optical lens assembly includes six lens elements (310, 320, 330, 340, 350 and 360) with no additional lens element disposed between each of the adjacent six lens elements.

The first lens element 310 with negative refractive power has an object-side surface 311 being convex in a paraxial region thereof and an image-side surface 312 being concave in a paraxial region thereof. The first lens element 310 is made of glass material and has the object-side surface 311 and the image-side surface 312 being both aspheric. The image-side surface 312 of the first lens element 310 has two inflection points.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric. The object-side surface 321 of the second lens element 320 has one inflection point. The image-side surface 322 of the second lens element 320 has two inflection points.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has one inflection point. The image-side surface 342 of the fourth lens element 340 has one inflection point.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has one inflection point. The image-side surface 352 of the fifth lens element 350 has two inflection points.

The sixth lens element 360 with negative refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has one inflection point. The image-side surface 362 of the sixth lens element 360 has one inflection point.

The filter 370 is made of glass material and located between the sixth lens element 360 and the image surface 380, and will not affect the focal length of the imaging optical lens assembly. The image sensor 390 is disposed on or near the image surface 380 of the imaging optical lens assembly.

The detailed optical data of the 3rd embodiment are shown in Table 5 and the aspheric surface data are shown in Table 6 below.

TABLE 5

3rd Embodiment
f = 6.88 mm, Fno = 2.40, HFOV = 16.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 26.175 | (ASP) | 0.306 | Glass | 1.907 | 21.2 | −266.01 |
| 2 | | 23.482 | (ASP) | 0.604 | | | | |
| 3 | Ape. Stop | Plano | | −0.584 | | | | |
| 4 | Lens 2 | 1.785 | (ASP) | 1.023 | Plastic | 1.534 | 55.9 | 3.30 |
| 5 | | −100.000 | (ASP) | 0.029 | | | | |
| 6 | Lens 3 | 5.428 | (ASP) | 0.246 | Plastic | 1.642 | 22.5 | −6.48 |
| 7 | | 2.313 | (ASP) | 0.828 | | | | |
| 8 | Stop | Plano | | 1.273 | | | | |
| 9 | Lens 4 | 4.478 | (ASP) | 0.273 | Plastic | 1.582 | 30.2 | −4.54 |
| 10 | | 1.625 | (ASP) | 0.101 | | | | |
| 11 | Stop | Plano | | 0.339 | | | | |
| 12 | Lens 5 | 16.421 | (ASP) | 0.795 | Plastic | 1.669 | 19.4 | 5.72 |
| 13 | | −4.894 | (ASP) | 0.164 | | | | |
| 14 | Lens 6 | −5.639 | (ASP) | 0.374 | Plastic | 1.614 | 26.0 | −10.40 |
| 15 | | −49.436 | (ASP) | 0.300 | | | | |
| 16 | Filter | Plano | | 0.110 | Glass | 1.517 | 64.2 | — |
| 17 | | Plano | | 0.419 | | | | |
| 18 | Image | Plano | | — | | | | |

Note:
Reference wavelength is 587.6 nm (d-line).
An effective radius of the stop 301 (Surface 8) is 0.960 mm.
An effective radius of the stop 302 (Surface 11) is 1.300 mm.

TABLE 6

Aspheric Coefficients

| | Surface # | | | | | |
|---|---|---|---|---|---|---|
| | 1 | 2 | 4 | 5 | 6 | 7 |
| k = | 6.1705E+01 | −4.8604E+01 | −3.8784E−01 | −9.0000E+01 | −4.0974E+01 | −1.9491E+01 |
| A4 = | 1.6073E−03 | 2.4272E−03 | 3.3892E−03 | −1.2654E−02 | −2.2032E−02 | 1.5479E−01 |
| A6 = | −2.1071E−04 | −5.0036E−04 | 1.6840E−02 | 7.8608E−02 | 1.1399E−01 | −1.4494E−01 |
| A8 = | −5.0904E−04 | −7.5088E−04 | −4.0202E−02 | −1.3457E−01 | −1.8282E−01 | 1.4725E−01 |
| A10 = | 1.2466E−04 | 1.9926E−04 | 5.2953E−02 | 1.2432E−01 | 1.7349E−01 | −5.9847E−02 |
| A12 = | — | — | −3.8937E−02 | −6.7439E−02 | −8.3432E−02 | 1.1532E−02 |
| A14 = | — | — | 1.4808E−02 | 1.8671E−02 | 1.5623E−02 | — |
| A16 = | — | — | −2.3912E−03 | −2.0566E−03 | — | — |

| | Surface # | | | | | |
|---|---|---|---|---|---|---|
| | 9 | 10 | 12 | 13 | 14 | 15 |
| k = | −1.5264E+01 | −3.1441E+00 | 8.6079E+01 | −8.5611E+00 | −5.7736E+01 | −9.0000E+01 |
| A4 = | −3.2462E−01 | −2.7822E−01 | −5.8994E−03 | 6.2772E−03 | −9.2992E−02 | −1.2387E−01 |
| A6 = | 2.1066E−01 | 2.5702E−01 | −4.0840E−02 | −5.5317E−02 | 1.8878E−01 | 2.3055E−01 |
| A8 = | −2.9997E−01 | −2.3091E−01 | 1.3394E−01 | 7.8932E−02 | −2.4559E−01 | −2.6405E−01 |
| A10 = | 3.5397E−01 | 1.4911E−01 | −1.7121E−01 | −2.7978E−02 | 2.0222E−01 | 1.7492E−01 |
| A12 = | −2.4815E−01 | −5.7096E−02 | 1.0635E−01 | −2.3375E−02 | −1.0472E−01 | −6.8053E−02 |
| A14 = | 7.1927E−02 | 9.5217E−03 | −3.2532E−02 | 2.4411E−02 | 3.3523E−02 | 1.5450E−02 |
| A16 = | — | — | 3.7101E−03 | −8.6298E−03 | −6.3454E−03 | −1.9540E−03 |
| A18 = | — | — | 2.3104E−04 | 1.3666E−03 | 6.4364E−04 | 1.2121E−04 |
| A20 = | — | — | −5.9783E−05 | −8.1144E−05 | −2.6781E−05 | −2.5583E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.88 | f/(f − TL) | 24.28 |
| Fno | 2.40 | f/f1 | −0.03 |
| HFOV [deg.] | 16.5 | f/f2 | 2.09 |
| Nmax | 1.91 | f/f3 | −1.06 |
| V5 | 19.4 | f/f4 | −1.52 |
| V5 + V6 | 45.4 | f/f5 | 1.20 |
| Vmin | 19.4 | f/f6 | −0.66 |
| ATmax/TD | 0.36 | f/|f|min | 2.09 |

-continued

| 3rd Embodiment | | | |
|---|---|---|---|
| ΣAT/ΣCT | 0.91 | CRA [deg.] | 16.1 |
| TL [mm] | 6.60 | Y11/Y62 | 0.89 |
| TL/EPD | 2.30 | Ymax/Ymin | 1.74 |
| TL/ImgH | 3.24 | Ymax/Ystop | 1.30 |
| TL/R1 | 0.25 | — | — |

4th Embodiment

Figure 7:
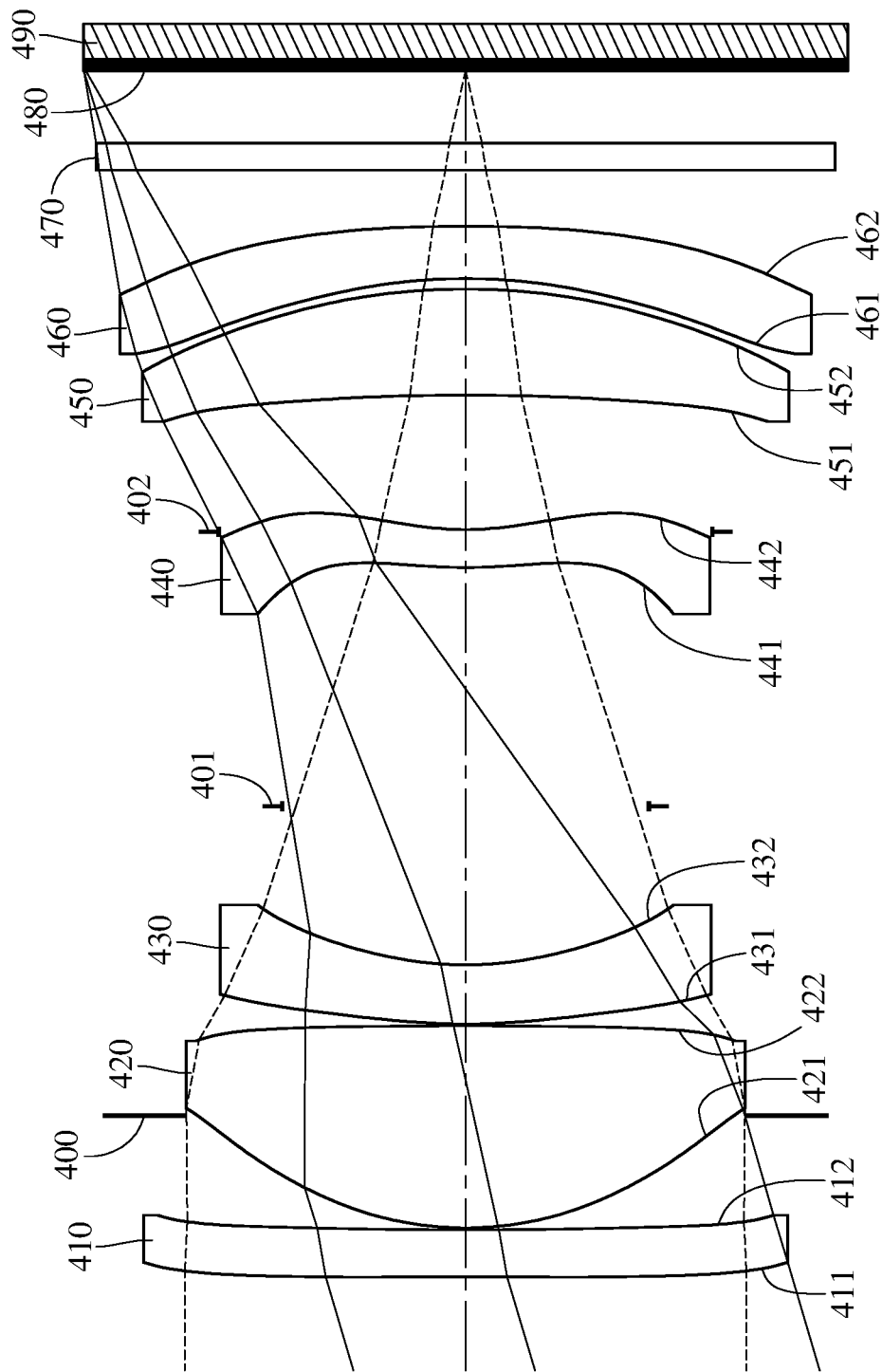
FIG. 7 is a schematic view of an image capturing unit according to the 4th embodiment of the present disclosure.
Figure 8:
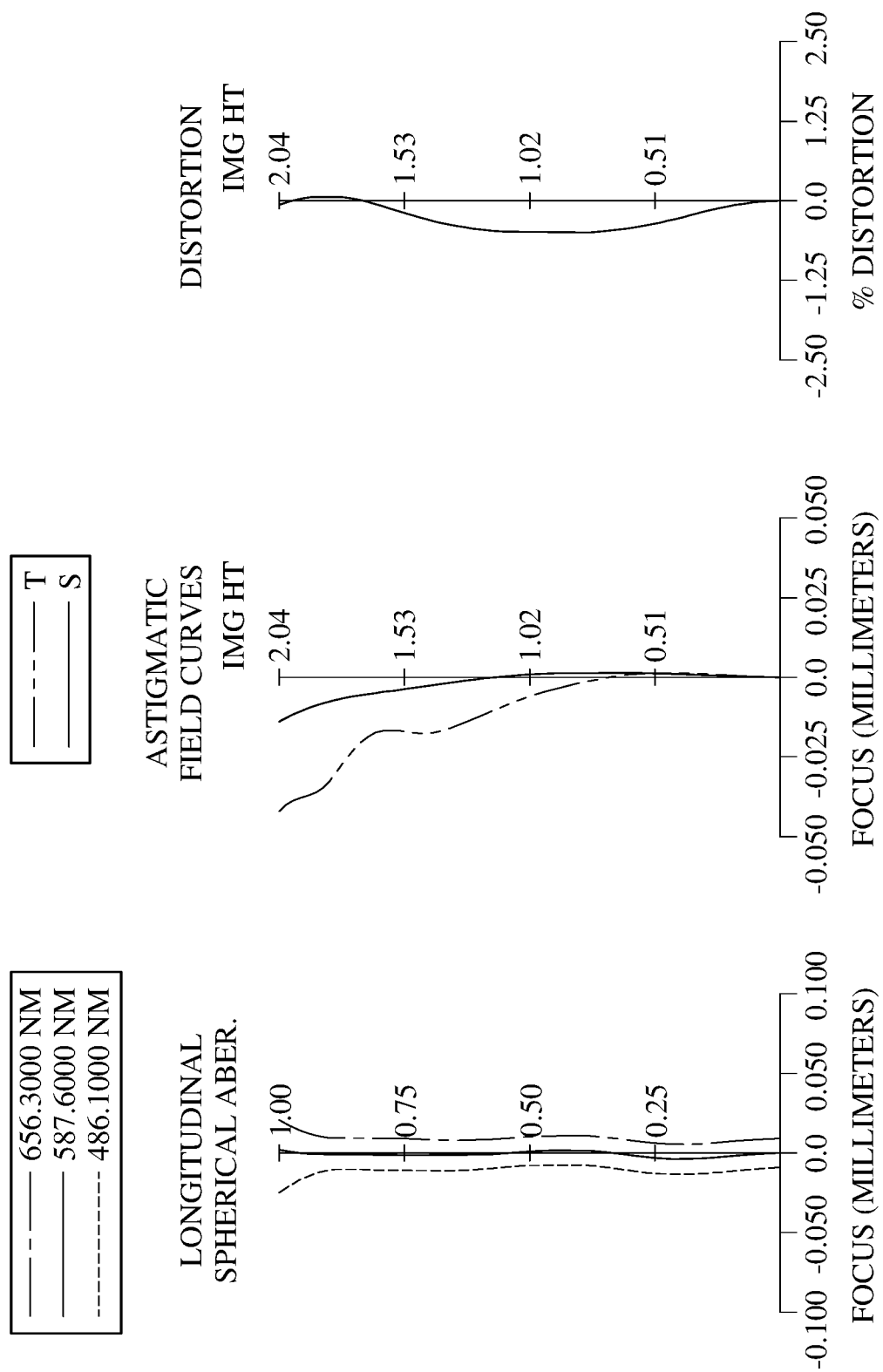
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging optical lens assembly (its reference numeral is omitted) of the present disclosure and an image sensor 490. The imaging optical lens assembly includes, in order from an object side to an image side, a first lens element 410, an aperture stop 400, a second lens element 420, a third lens element 430, a stop 401, a fourth lens element 440, a stop 402, a fifth lens element 450, a sixth lens element 460, a filter 470 and an image surface 480. The imaging optical lens assembly includes six lens elements (410, 420, 430, 440, 450 and 460) with no additional lens element disposed between each of the adjacent six lens elements.

The first lens element 410 with negative refractive power has an object-side surface 411 being concave in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has one inflection point. The image-side surface 412 of the first lens element 410 has two inflection points.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric. The object-side surface 421 of the second lens element 420 has one inflection point.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has one inflection point. The image-side surface 442 of the fourth lens element 440 has two inflection points.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The object-side surface 451 of the fifth lens element 450 has one inflection point. The image-side surface 452 of the fifth lens element 450 has one inflection point.

The sixth lens element 460 with negative refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has one inflection point. The image-side surface 462 of the sixth lens element 460 has one inflection point.

The filter 470 is made of glass material and located between the sixth lens element 460 and the image surface 480, and will not affect the focal length of the imaging optical lens assembly. The image sensor 490 is disposed on or near the image surface 480 of the imaging optical lens assembly.

The detailed optical data of the 4th embodiment are shown in Table 7 and the aspheric surface data are shown in Table 8 below.

TABLE 7

4th Embodiment
f = 6.90 mm, Fno = 2.30, HFOV = 16.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −100.000 | (ASP) | 0.252 | Plastic | 1.614 | 26.0 | −50.18 |
| 2 | | 44.547 | (ASP) | 0.610 | | | | |
| 3 | Ape. Stop | Plano | | −0.600 | | | | |
| 4 | Lens 2 | 1.807 | (ASP) | 1.081 | Plastic | 1.534 | 55.9 | 3.20 |
| 5 | | −25.449 | (ASP) | 0.010 | | | | |
| 6 | Lens 3 | 3.569 | (ASP) | 0.316 | Plastic | 1.642 | 22.5 | −6.15 |
| 7 | | 1.809 | (ASP) | 0.849 | | | | |
| 8 | Stop | Plano | | 1.277 | | | | |
| 9 | Lens 4 | 2.727 | (ASP) | 0.203 | Plastic | 1.566 | 37.4 | −7.53 |
| 10 | | 1.618 | (ASP) | −0.012 | | | | |
| 11 | Stop | Plano | | 0.731 | | | | |
| 12 | Lens 5 | −14.262 | (ASP) | 0.567 | Plastic | 1.669 | 19.4 | 7.86 |
| 13 | | −3.905 | (ASP) | 0.056 | | | | |
| 14 | Lens 6 | −3.384 | (ASP) | 0.280 | Plastic | 1.544 | 56.0 | −8.45 |
| 15 | | −13.190 | (ASP) | 0.300 | | | | |
| 16 | Filter | Plano | | 0.145 | Glass | 1.517 | 64.2 | — |

TABLE 7-continued

4th Embodiment
f = 6.90 mm, Fno = 2.30, HFOV = 16.5 deg.

| Surface # | | Curvature Radius | Thickness | Material | Index | Abbe # | Focal Length |
|---|---|---|---|---|---|---|---|
| 17 | | Plano | 0.386 | | | | |
| 18 | Image | Plano | — | | | | |

Note:
Reference wavelength is 587.6 nm (d-line).
An effective radius of the stop 401 (Surface 8) is 0.980 mm.
An effective radius of the stop 402 (Surface 11) is 1.320 mm.

TABLE 8

Aspheric Coefficients

| Surface # | | | | | |
|---|---|---|---|---|---|
| 1 | 2 | 4 | 5 | 6 | 7 |
| k = −9.0000E+01 | 9.0000E+01 | −4.6732E−01 | 9.0000E+01 | −5.7075E+01 | −1.6991E+01 |
| A4 = −3.2849E−03 | 6.3324E−03 | 2.1809E−02 | 5.9752E−02 | 7.9420E−02 | 1.9800E−01 |
| A6 = 4.5666E−02 | 1.7324E−02 | −2.3322E−02 | −1.6037E−01 | −2.4377E−01 | −3.3168E−01 |
| A8 = −6.8158E−02 | −5.3950E−02 | −4.6622E−03 | 2.0417E−01 | 3.3241E−01 | 4.0518E−01 |
| A10 = 4.9757E−02 | 5.2141E−02 | 1.8594E−02 | −1.4029E−01 | −2.2017E−01 | −2.4236E−01 |
| A12 = −1.9294E−02 | −2.3622E−02 | −1.1429E−02 | 5.0517E−02 | 7.0819E−02 | 5.8996E−02 |
| A14 = 3.8505E−03 | 5.2321E−03 | 2.9497E−03 | −8.9057E−03 | −8.6767E−03 | — |
| A16 = −3.0995E−04 | −4.5253E−04 | −3.4419E−04 | 5.6203E−04 | — | — |

| Surface # | | | | | |
|---|---|---|---|---|---|
| 9 | 10 | 12 | 13 | 14 | 15 |
| k = −1.7975E+01 | −3.8562E+00 | −1.1384E+01 | −1.8876E+00 | −9.1607E+00 | 2.6066E+01 |
| A4 = −2.5088E−01 | −2.5410E−01 | −1.8974E−01 | −5.3723E−02 | −1.2995E−01 | −1.1937E−01 |
| A6 = −3.7616E−02 | 9.8782E−02 | 3.3808E−02 | 7.4614E−02 | 2.6360E−01 | 2.1848E−01 |
| A8 = 8.2980E−02 | −3.2605E−02 | −7.5657E−02 | −9.2704E−02 | −2.9186E−01 | −2.4378E−01 |
| A10 = −1.0139E−01 | −2.2290E−03 | 1.3974E−01 | 1.0928E−01 | 1.9401E−01 | 1.6081E−01 |
| A12 = 4.4312E−02 | 6.7098E−03 | −1.4897E−01 | −9.1382E−02 | −8.2897E−02 | −6.4927E−02 |
| A14 = −1.5258E−03 | −1.0183E−03 | 9.0479E−02 | 4.7108E−02 | 2.3054E−02 | 1.5981E−02 |
| A16 = — | — | −3.1421E−02 | −1.4185E−02 | −3.9874E−03 | −2.2895E−03 |
| A18 = — | — | 5.8095E−03 | 2.2822E−03 | 3.8484E−04 | 1.7046E−04 |
| A20 = — | — | −4.4215E−04 | −1.5097E−04 | −1.5724E−05 | −4.8766E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.90 | f/(f − TL) | 15.21 |
| Fno | 2.30 | f/f1 | −0.14 |
| HFOV [deg.] | 16.5 | f/f2 | 2.16 |
| Nmax | 1.67 | f/f3 | −1.12 |
| V5 | 19.4 | f/f4 | −0.92 |
| V5 + V6 | 75.4 | f/f5 | 0.88 |
| Vmin | 19.4 | f/f6 | −0.82 |
| ATmax/TD | 0.38 | f/|f|min | 2.16 |
| ΣAT/ΣCT | 1.08 | CRA [deg.] | 17.1 |
| TL [mm] | 6.45 | Y11/Y62 | 0.93 |
| TL/EPD | 2.15 | Ymax/Ymin | 1.66 |
| TL/ImgH | 3.16 | Ymax/Ystop | 1.24 |
| TL/R1 | −0.06 | — | — |

5th Embodiment

Figure 9:
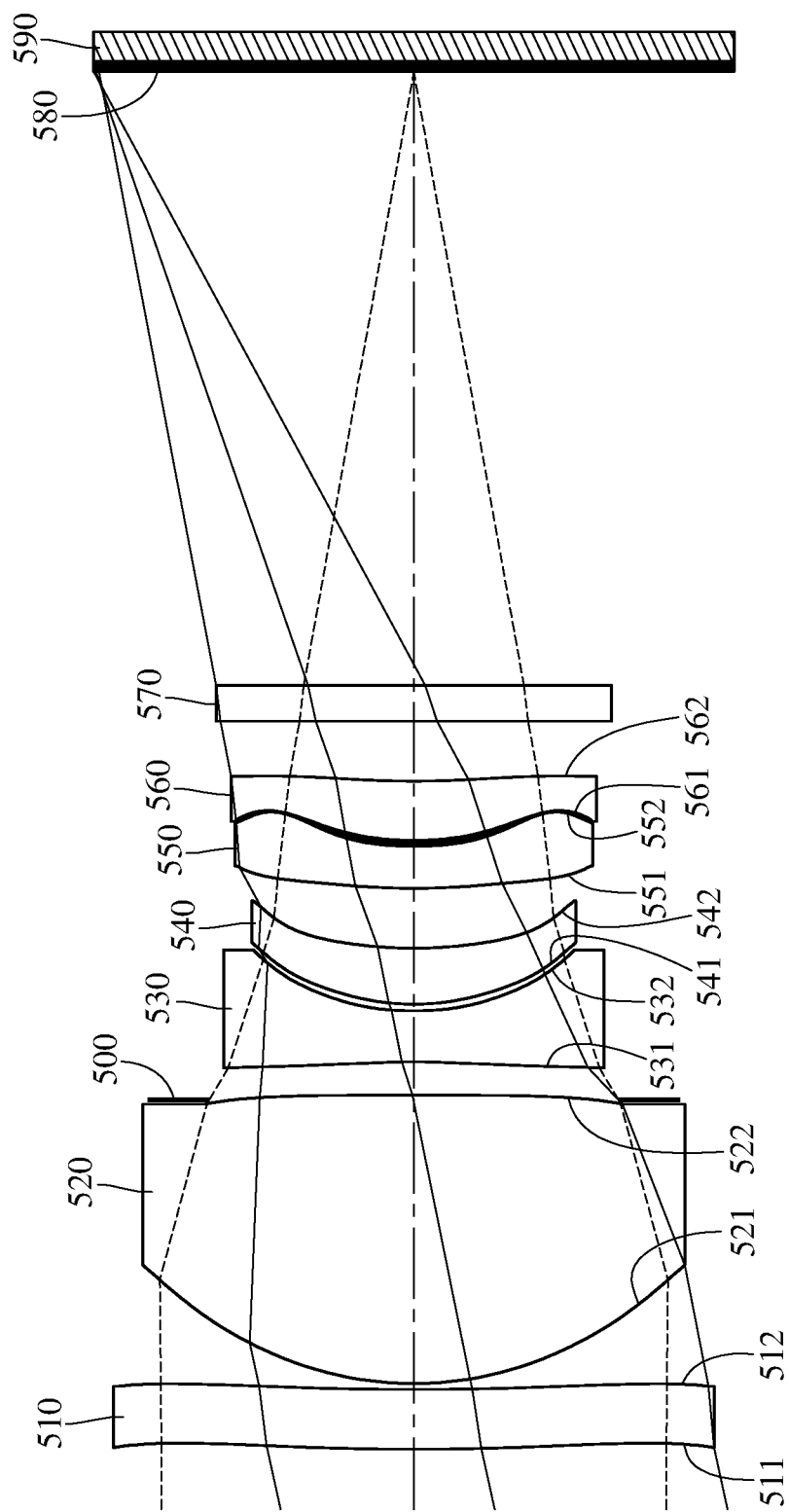
FIG. 9 is a schematic view of an image capturing unit according to the 5th embodiment of the present disclosure.
Figure 10:
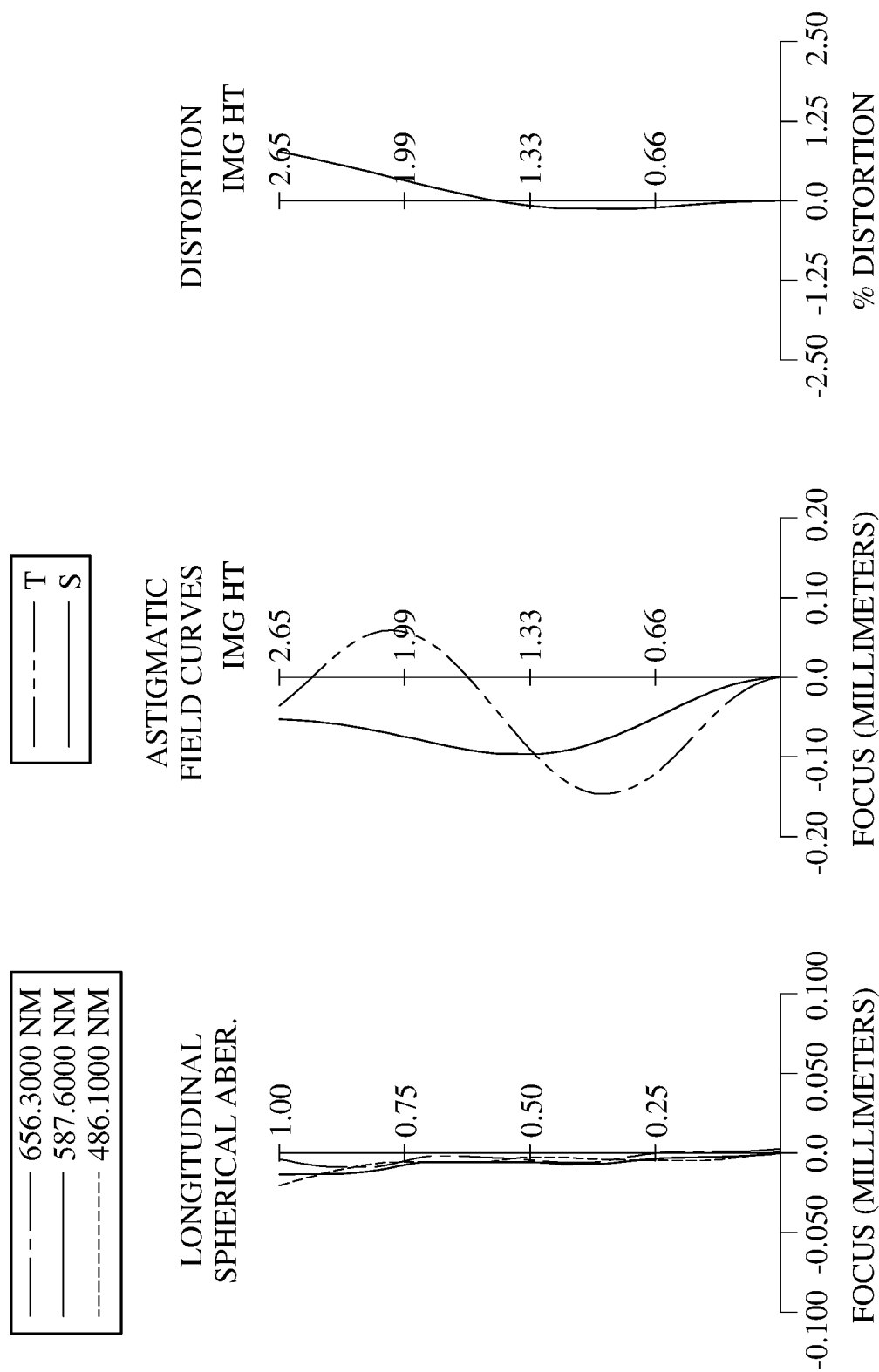
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging optical lens assembly (its reference numeral is omitted) of the present disclosure and an image sensor 590. The imaging optical lens assembly includes, in order from an object side to an image side, a first lens element 510, a second lens element 520, an aperture stop 500, a third lens element 530, a fourth lens element 540, a fifth lens element 550, a sixth lens element 560, a filter 570 and an image surface 580. The imaging optical lens assembly includes six lens elements (510, 520, 530, 540, 550 and 560) with no additional lens element disposed between each of the adjacent six lens elements.

The first lens element 510 with positive refractive power has an object-side surface 511 being convex in a paraxial region thereof and an image-side surface 512 being concave in a paraxial region thereof. The first lens element 510 is made of glass material and has the object-side surface 511 and the image-side surface 512 being both aspheric. The object-side surface 511 of the first lens element 510 has one inflection point. The image-side surface 512 of the first lens element 510 has one inflection point.

The second lens element 520 with positive refractive power has an object-side surface 521 being convex in a paraxial region thereof and an image-side surface 522 being convex in a paraxial region thereof. The second lens element 520 is made of glass material and has the object-side surface 521 and the image-side surface 522 being both aspheric. The object-side surface 521 of the second lens element 520 has one inflection point. The image-side surface 522 of the second lens element 520 has two inflection points.

The third lens element 530 with negative refractive power has an object-side surface 531 being concave in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has five inflection points.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has one inflection point. The image-side surface 542 of the fourth lens element 540 has one inflection point.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has three inflection points.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has one inflection point. The image-side surface 562 of the sixth lens element 560 has three inflection points. The object-side surface 561 of the sixth lens element 560 is cemented to the image-side surface 552 of the fifth lens element 550.

The filter 570 is made of glass material and located between the sixth lens element 560 and the image surface 580, and will not affect the focal length of the imaging optical lens assembly. The image sensor 590 is disposed on or near the image surface 580 of the imaging optical lens assembly.

The detailed optical data of the 5th embodiment are shown in Table 9 and the aspheric surface data are shown in Table 10 below.

TABLE 9

5th Embodiment
f = 12.00 mm, Fno = 2.85, HFOV = 12.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 24.578 | (ASP) | 0.500 | Glass | 1.518 | 63.5 | 111.10 |
| 2 | | 42.628 | (ASP) | 0.049 | | | | |
| 3 | Lens 2 | 2.951 | (ASP) | 2.407 | Glass | 1.507 | 70.5 | 5.61 |
| 4 | | −56.995 | (ASP) | −0.039 | | | | |
| 5 | Ape. Stop | Plano | | 0.317 | | | | |
| 6 | Lens 3 | −5.286 | (ASP) | 0.426 | Plastic | 1.582 | 30.2 | −3.08 |
| 7 | | 2.791 | (ASP) | 0.055 | | | | |
| 8 | Lens 4 | 2.002 | (ASP) | 0.467 | Plastic | 1.530 | 58.0 | 8.76 |
| 9 | | 3.234 | (ASP) | 0.500 | | | | |
| 10 | Lens 5 | 5.239 | (ASP) | 0.350 | Plastic | 1.614 | 26.0 | −7.26 |
| 11 | | 2.347 | (ASP) | 0.050 | Cemented | 1.485 | 53.2 | |
| 12 | Lens 6 | 2.525 | (ASP) | 0.495 | Plastic | 1.669 | 19.4 | 5.54 |
| 13 | | 7.290 | (ASP) | 0.500 | | | | |
| 14 | Filter | Plano | | 0.300 | Glass | 1.517 | 64.2 | — |
| 15 | | Plano | | 5.126 | | | | |
| 16 | Image | Plano | | — | | | | |

Note:
Reference wavelength is 587.6 nm (d-line).
An effective radius of the object-side surface 541 (Surface 8) is 1.350 mm.
An effective radius of the image-side surface 562 (Surface 13) is 1.525 mm.

TABLE 10

Aspheric Coefficients

| | Surface # | | | | | |
|---|---|---|---|---|---|---|
| | 1 | 2 | 3 | 4 | 6 | 7 |
| k = | −8.9008E+01 | −9.9000E+01 | 5.3136E−02 | 9.7165E+01 | −3.4274E+01 | 2.9279E+00 |
| A4 = | −8.1368E−04 | 8.7446E−03 | 7.0194E−03 | 2.8192E−02 | 1.7248E−01 | 1.8541E−01 |
| A6 = | 3.9752E−03 | −3.1557E−03 | −6.2136E−03 | −6.1882E−02 | −3.2534E−01 | −8.5633E−02 |

TABLE 10-continued

| Aspheric Coefficients | | | | | |
|---|---|---|---|---|---|
| A8 = | −3.6850E−03 | −1.4207E−03 | 1.4920E−03 | 5.6118E−02 | 3.4635E−01 | −6.8147E−01 |
| A10 = | 1.3694E−03 | 1.1270E−03 | 3.6991E−05 | −2.8462E−02 | −2.1576E−01 | 1.3678E+00 |
| A12 = | −2.5973E−04 | −2.8061E−04 | −7.8798E−05 | 8.1852E−03 | 7.8069E−02 | −1.1097E+00 |
| A14 = | 2.4587E−05 | 3.0943E−05 | 1.3151E−05 | −1.2632E−03 | −1.5265E−02 | 4.2349E−01 |
| A16 = | −9.2155E−07 | −1.2885E−06 | −8.0988E−07 | 8.1749E−05 | 1.2517E−03 | −6.3140E−02 |

| | Surface # | | | | |
|---|---|---|---|---|---|
| | 8 | 9 | 10 | 11 | 12 | 13 |
| k = | 8.2739E−01 | 4.3597E+00 | 1.8126E+00 | −5.1819E+01 | −6.0310E+00 | 4.1007E+00 |
| A4 = | −8.6469E−02 | −1.4792E−01 | −7.9172E−02 | 1.9249E−01 | −2.4010E−02 | −3.9273E−02 |
| A6 = | 4.3286E−01 | 3.3475E−01 | 1.2425E−01 | 4.4755E−01 | 5.5226E−01 | 3.6174E−02 |
| A8 = | −1.3106E+00 | −4.9193E−01 | −1.5119E−01 | −1.2099E+00 | −1.1885E+00 | −7.4491E−02 |
| A10 = | 1.8117E+00 | 4.7991E−01 | 1.0723E−01 | 1.2081E+00 | 1.2049E+00 | 8.2845E−02 |
| A12 = | −1.2711E+00 | −2.8047E−01 | −4.0762E−02 | −6.6123E−01 | −6.8389E−01 | −4.8117E−02 |
| A14 = | 4.4711E−01 | 9.5655E−02 | 8.3805E−03 | 1.9163E−01 | 2.0458E−01 | 1.4089E−02 |
| A16 = | −6.3384E−02 | −1.5705E−02 | −7.7674E−04 | −2.2624E−02 | −2.4917E−02 | −1.6369E−03 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 12.00 | f/(f − TL) | 24.01 |
| Fno | 2.85 | f/f1 | 0.11 |
| HFOV [deg.] | 12.4 | f/f2 | 2.14 |
| Nmax | 1.67 | f/f3 | −3.90 |
| V5 | 26.0 | f/f4 | 1.37 |
| V5 + V6 | 45.4 | f/f5 | −1.65 |
| Vmin | 19.4 | f/f6 | 2.17 |
| ATmax/TD | 0.09 | f/|f|min | 3.90 |
| ΣAT/ΣCT | 0.20 | CRA [deg.] | 19.0 |
| TL [mm] | 11.50 | Y11/Y62 | 1.64 |
| TL/EPD | 2.73 | Ymax/Ymin | 1.87 |
| TL/ImgH | 4.34 | Ymax/Ystop | 1.47 |
| TL/R1 | 0.47 | — | — |

6th Embodiment

Figure 11:
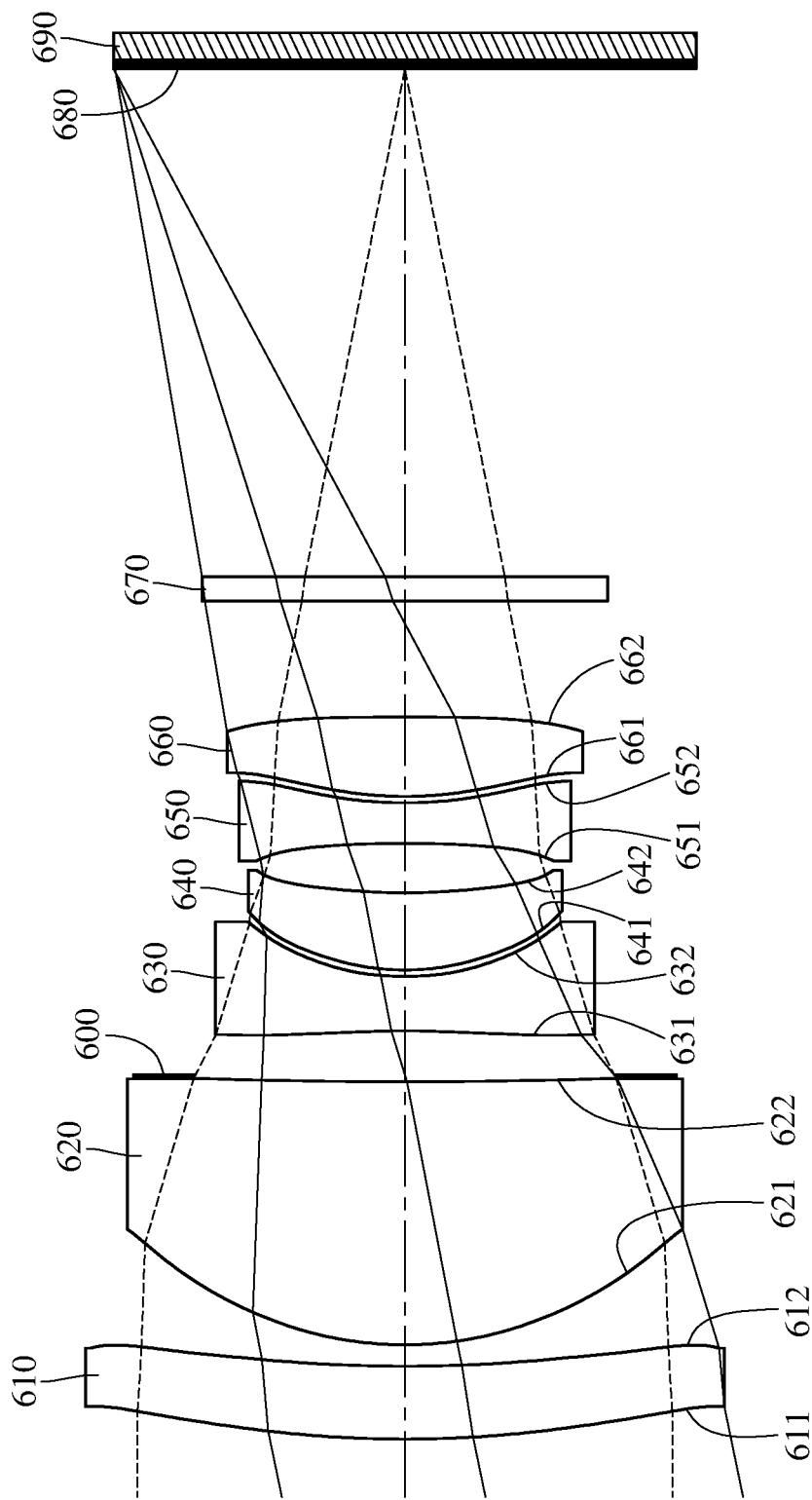
FIG. 11 is a schematic view of an image capturing unit according to the 6th embodiment of the present disclosure.
Figure 12:
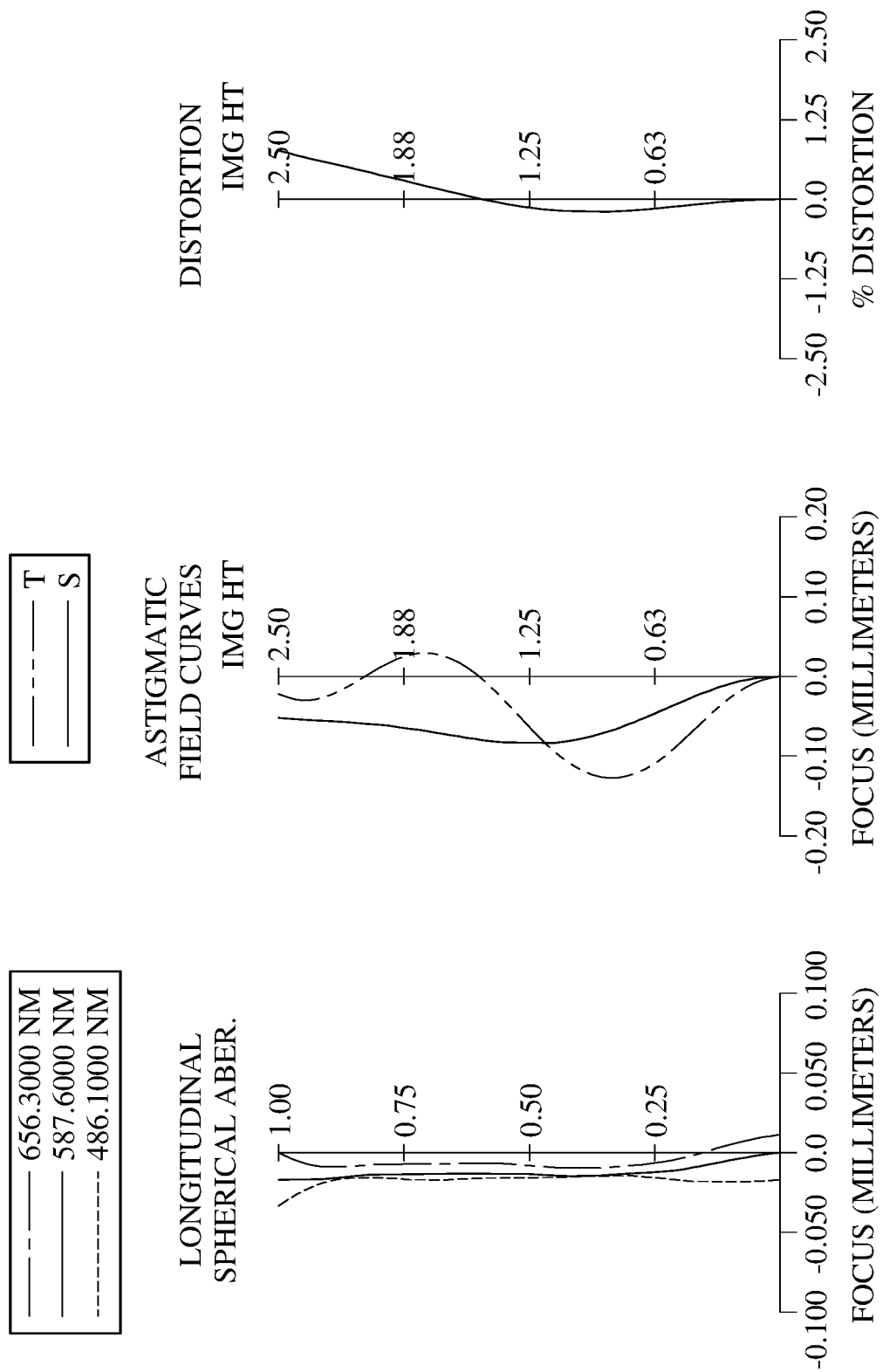
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging optical lens assembly (its reference numeral is omitted) of the present disclosure and an image sensor 690. The imaging optical lens assembly includes, in order from an object side to an image side, a first lens element 610, a second lens element 620, an aperture stop 600, a third lens element 630, a fourth lens element 640, a fifth lens element 650, a sixth lens element 660, a filter 670 and an image surface 680. The imaging optical lens assembly includes six lens elements (610, 620, 630, 640, 650 and 660) with no additional lens element disposed between each of the adjacent six lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has one inflection point. The image-side surface 612 of the first lens element 610 has one inflection point.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has one inflection point. The image-side surface 622 of the second lens element 620 has three inflection points.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has four inflection points. The image-side surface 632 of the third lens element 630 has two inflection points.

The fourth lens element 640 with positive refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has one inflection point.

The sixth lens element 660 with positive refractive power has an object-side surface 661 being convex in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 has one inflection point.

The filter 670 is made of glass material and located between the sixth lens element 660 and the image surface 680, and will not affect the focal length of the imaging optical lens assembly. The image sensor 690 is disposed on or near the image surface 680 of the imaging optical lens assembly.

The detailed optical data of the 6th embodiment are shown in Table 11 and the aspheric surface data are shown in Table 12 below.

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

TABLE 11

6th Embodiment
f = 12.01 mm, Fno = 2.61, HFOV = 11.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.000 | (ASP) | 0.628 | Plastic | 1.545 | 56.1 | 63.92 |
| 2 | | 13.716 | (ASP) | 0.184 | | | | |
| 3 | Lens 2 | 3.180 | (ASP) | 2.265 | Plastic | 1.544 | 56.0 | 6.07 |
| 4 | | 64.001 | (ASP) | 0.056 | | | | |
| 5 | Ape. Stop | Plano | | 0.383 | | | | |
| 6 | Lens 3 | −6.374 | (ASP) | 0.469 | Plastic | 1.614 | 26.0 | −3.26 |
| 7 | | 2.997 | (ASP) | 0.055 | | | | |
| 8 | Lens 4 | 2.233 | (ASP) | 0.664 | Plastic | 1.544 | 56.0 | 7.15 |
| 9 | | 4.693 | (ASP) | 0.426 | | | | |
| 10 | Lens 5 | −13.786 | (ASP) | 0.350 | Plastic | 1.582 | 30.2 | −5.29 |
| 11 | | 4.006 | (ASP) | 0.055 | | | | |
| 12 | Lens 6 | 3.414 | (ASP) | 0.683 | Plastic | 1.660 | 20.4 | 4.96 |
| 13 | | −73.818 | (ASP) | 1.000 | | | | |
| 14 | Filter | Plano | | 0.210 | Glass | 1.517 | 64.2 | — |
| 15 | | Plano | | 4.373 | | | | |
| 16 | Image | Plano | | — | | | | |

Note:
Reference wavelength is 587.6 nm (d-line).
An effective radius of the object-side surface 641 (Surface 8) is 1.350 mm.
An effective radius of the image-side surface 662 (Surface 13) is 1.530 mm.

TABLE 12

Aspheric Coefficients

| | Surface # | | | | | |
|---|---|---|---|---|---|---|
| | 1 | 2 | 3 | 4 | 6 | 7 |
| k = | −4.0520E+00 | −6.1280E+00 | 4.2987E−02 | −9.9000E+01 | −3.3178E+01 | 3.3649E+00 |
| A4 = | −1.3881E−03 | 8.2259E−04 | −7.7639E−05 | 9.2419E−03 | 1.1189E−01 | 2.3904E−01 |
| A6 = | 3.0109E−03 | 3.1808E−03 | 1.6940E−03 | −8.9891E−03 | −1.6062E−01 | −4.5622E−01 |
| A8 = | −2.0246E−03 | −3.4196E−03 | −2.3969E−03 | 6.0583E−04 | 1.2846E−01 | 3.9655E−01 |
| A10 = | 5.8520E−04 | 1.2262E−03 | 9.6187E−04 | 2.3046E−03 | −5.8813E−02 | −1.6986E−01 |
| A12 = | −8.4507E−05 | −2.0454E−04 | −1.8244E−04 | −9.7044E−04 | 1.5904E−02 | 2.4344E−02 |
| A14 = | 6.0072E−06 | 1.6159E−05 | 1.7861E−05 | 1.3610E−04 | −2.4497E−03 | 7.3738E−03 |
| A16 = | −1.7267E−07 | −4.9441E−07 | −8.0840E−07 | −5.4835E−06 | 1.7027E−04 | −2.9829E−03 |

| | Surface # | | | | | |
|---|---|---|---|---|---|---|
| | 8 | 9 | 10 | 11 | 12 | 13 |
| k = | 1.2966E+00 | 6.6973E+00 | 9.9000E+01 | −9.1796E+01 | −8.7596E+00 | −9.9000E+01 |
| A4 = | 7.7407E−02 | −1.0326E−01 | −3.3465E−02 | 2.0618E−01 | 4.6125E−02 | −2.7153E−02 |
| A6 = | −2.5759E−01 | 1.3452E−01 | −1.4020E−02 | −2.8604E−01 | 7.8007E−02 | 4.7392E−02 |
| A8 = | 2.4742E−01 | −1.3739E−01 | 1.3049E−01 | 1.2792E−01 | −2.7152E−01 | −1.0879E−01 |
| A10 = | −9.2435E−02 | 1.8599E−01 | −1.8136E−01 | 1.3263E−01 | 4.6307E−01 | 1.1983E−01 |
| A12 = | −1.0941E−02 | −1.8498E−01 | 1.0319E−01 | −1.9465E−01 | −3.4210E−01 | −6.8380E−02 |
| A14 = | 2.0241E−02 | 9.1456E−02 | −2.7486E−02 | 8.7264E−02 | 1.1878E−01 | 1.9541E−02 |
| A16 = | −4.8935E−03 | −1.6453E−02 | 3.1750E−03 | −1.3526E−02 | −1.5858E−02 | −2.2191E−03 |

| 6th Embodiment | | | |
|---|---|---|---|
| f [mm] | 12.01 | f/(f − TL) | 58.16 |
| Fno | 2.61 | f/f1 | 0.19 |
| HFOV [deg.] | 11.7 | f/f2 | 1.98 |
| Nmax | 1.66 | f/f3 | −3.68 |
| V5 | 30.2 | f/f4 | 1.68 |
| V5 + V6 | 50.6 | f/f5 | −2.27 |
| Vmin | 20.4 | f/f6 | 2.42 |
| ATmax/TD | 0.07 | f/|f|min | 3.68 |
| ΣAT/ΣCT | 0.23 | CRA [deg.] | 17.6 |
| TL [mm] | 11.80 | Y11/Y62 | 1.80 |
| TL/EPD | 2.57 | Ymax/Ymin | 2.15 |
| TL/ImgH | 4.72 | Ymax/Ystop | 1.52 |
| TL/R1 | 1.18 | — | — |

7th Embodiment

Figure 13:
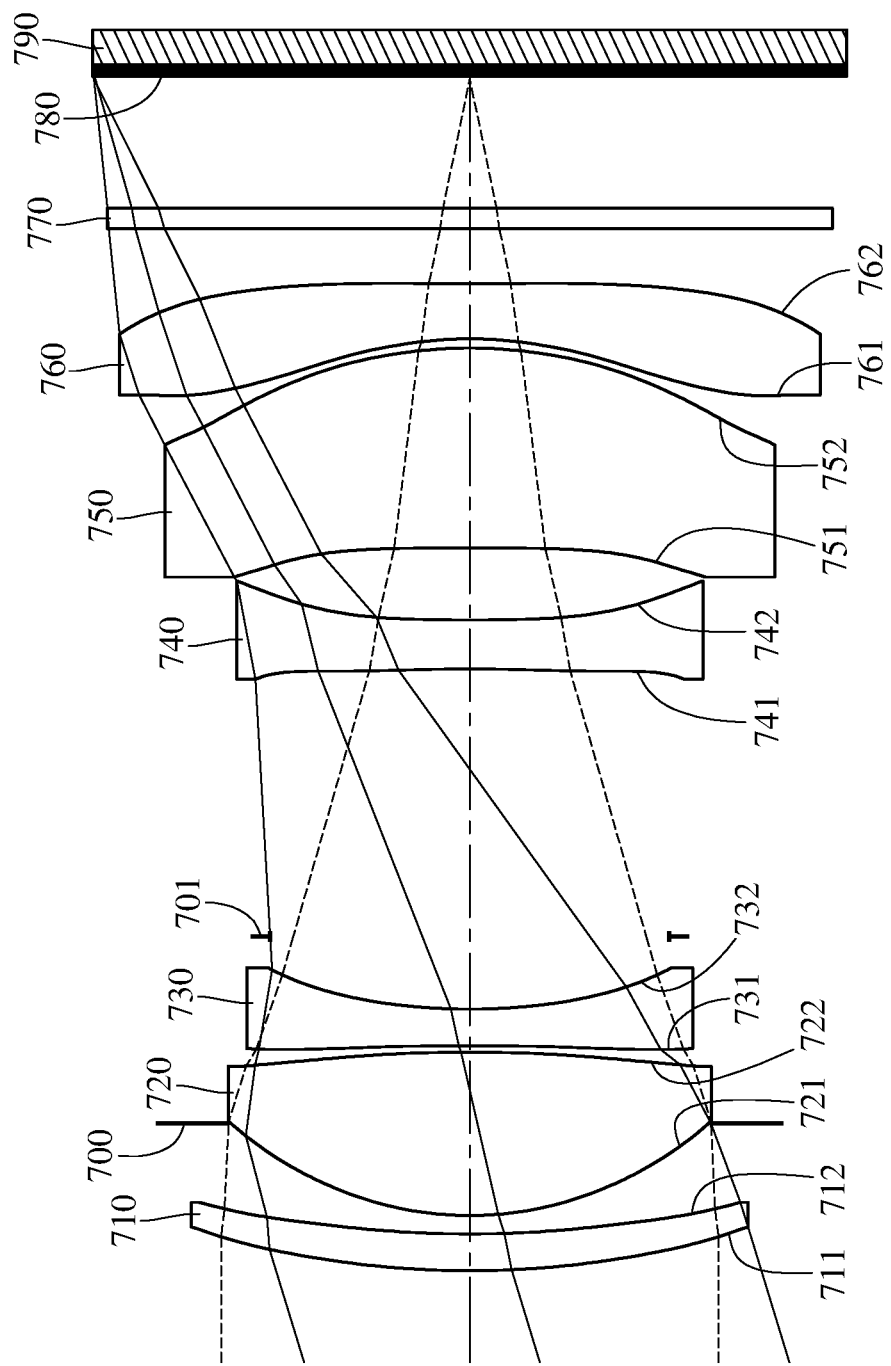
FIG. 13 is a schematic view of an image capturing unit according to the 7th embodiment of the present disclosure.
Figure 14:
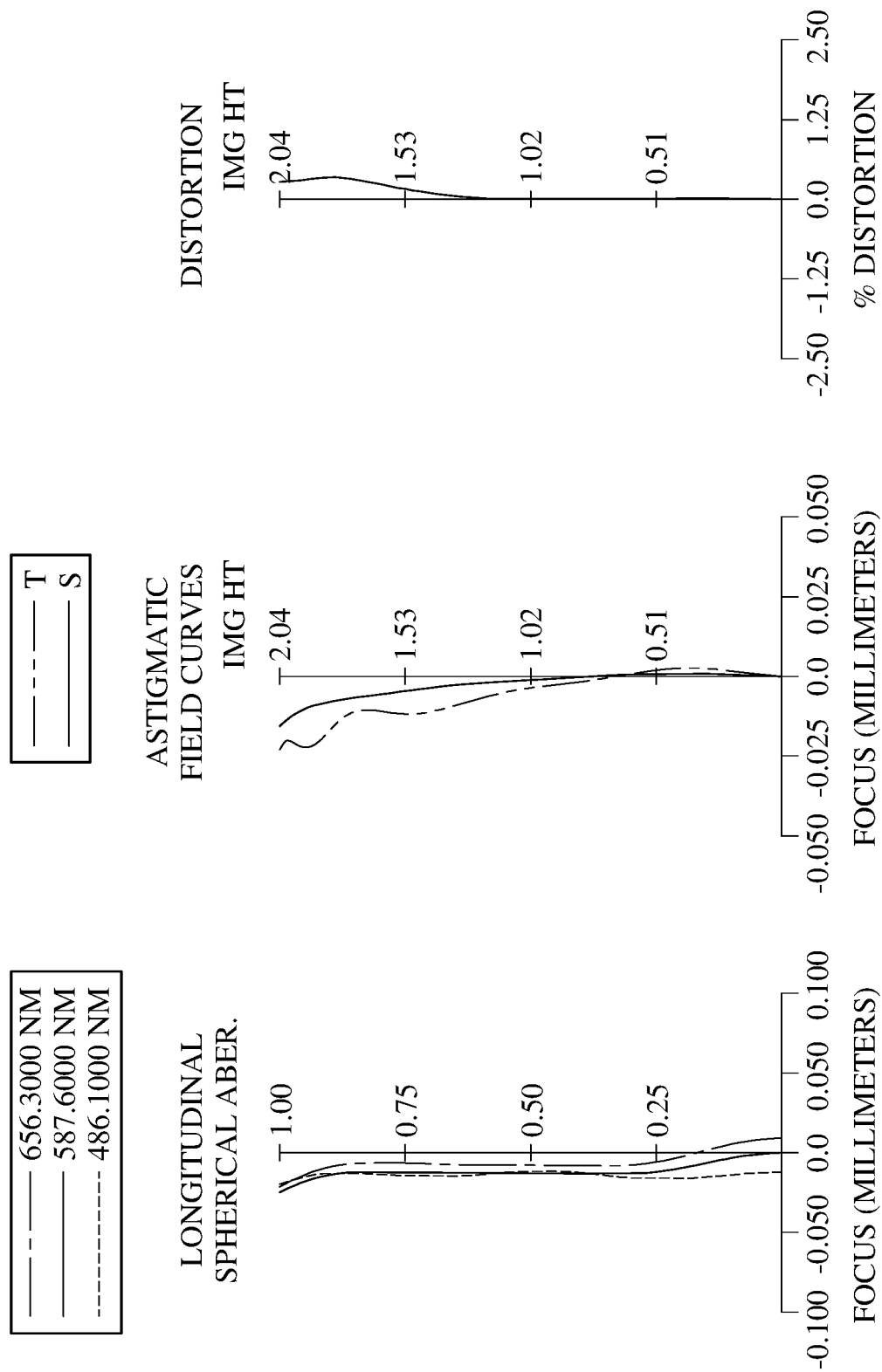
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging optical lens assembly (its reference numeral is omitted) of the present disclosure and an image sensor 790. The imaging optical lens assembly includes, in order from an object side to an image side, a first lens element 710, an aperture stop 700, a second lens element 720, a third lens element 730, a stop 701, a fourth lens element 740, a fifth lens element 750, a sixth lens element 760, a filter 770 and an image surface 780. The imaging optical lens assembly includes six lens elements (710, 720, 730, 740, 750 and 760) with no additional lens element disposed between each of the adjacent six lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has one inflection point. The image-side surface 712 of the first lens element 710 has one inflection point.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric. The image-side surface 722 of the second lens element 720 has one inflection point.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has one inflection point.

The fourth lens element 740 with negative refractive power has an object-side surface 741 being concave in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has two inflection points. The image-side surface 742 of the fourth lens element 740 has one inflection point.

The fifth lens element 750 with positive refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The object-side surface 751 of the fifth lens element 750 has two inflection points. The image-side surface 752 of the fifth lens element 750 has two inflection points.

The sixth lens element 760 with negative refractive power has an object-side surface 761 being concave in a paraxial region thereof and an image-side surface 762 being concave in a paraxial region thereof. The sixth lens element 760 is made of plastic material and has the object-side surface 761 and the image-side surface 762 being both aspheric. The object-side surface 761 of the sixth lens element 760 has two inflection points. The image-side surface 762 of the sixth lens element 760 has one inflection point.

The filter 770 is made of glass material and located between the sixth lens element 760 and the image surface 780, and will not affect the focal length of the imaging optical lens assembly. The image sensor 790 is disposed on or near the image surface 780 of the imaging optical lens assembly.

The detailed optical data of the 7th embodiment are shown in Table 13 and the aspheric surface data are shown in Table 14 below.

TABLE 13

7th Embodiment
f = 6.71 mm, Fno = 2.48, HFOV = 16.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.198 | (ASP) | 0.200 | Plastic | 1.660 | 20.4 | 48.37 |
| 2 | | 6.113 | (ASP) | 0.602 | | | | |
| 3 | Ape. Stop | Plano | | −0.502 | | | | |
| 4 | Lens 2 | 1.844 | (ASP) | 0.889 | Plastic | 1.544 | 56.0 | 3.01 |
| 5 | | −12.021 | (ASP) | 0.035 | | | | |
| 6 | Lens 3 | −44.955 | (ASP) | 0.200 | Plastic | 1.639 | 23.3 | −4.91 |
| 7 | | 3.376 | (ASP) | 0.396 | | | | |
| 8 | Stop | Plano | | 1.456 | | | | |
| 9 | Lens 4 | −8.722 | (ASP) | 0.267 | Plastic | 1.566 | 37.4 | −9.89 |
| 10 | | 15.785 | (ASP) | 0.392 | | | | |
| 11 | Lens 5 | −57.023 | (ASP) | 1.088 | Plastic | 1.660 | 20.4 | 3.69 |

TABLE 13-continued

7th Embodiment
f = 6.71 mm, Fno = 2.48, HFOV = 16.9 deg.

| Surface # | | Curvature Radius | | Thickness | Material | Index | Abbe # | Focal Length |
|---|---|---|---|---|---|---|---|---|
| 12 | | −2.355 | (ASP) | 0.051 | | | | |
| 13 | Lens 6 | −1.916 | (ASP) | 0.300 | Plastic | 1.582 | 30.2 | −3.22 |
| 14 | | 100.000 | (ASP) | 0.300 | | | | |
| 15 | Filter | Plano | | 0.110 | Glass | 1.517 | 64.2 | — |
| 16 | | Plano | | 0.718 | | | | |
| 17 | Image | Plano | | — | | | | |

Note:
Reference wavelength is 587.6 nm (d-line).
An effective radius of the stop 701 (Surface 8) is 1.085 mm.

TABLE 14

Aspheric Coefficients

| | Surface # | | | | | |
|---|---|---|---|---|---|---|
| | 1 | 2 | 4 | 5 | 6 | 7 |
| k = | 2.1593E+00 | −5.8624E+00 | −4.0175E−01 | −8.8454E+01 | 9.0000E+01 | −3.0009E+01 |
| A4 = | 9.5386E−03 | 1.5246E−02 | 8.8646E−03 | −1.1166E−01 | −1.1135E−01 | 9.4349E−02 |
| A6 = | −1.5498E−02 | −3.5337E−02 | −2.5168E−02 | 2.5298E−01 | 2.7708E−01 | −3.1709E−02 |
| A8 = | 2.0999E−03 | 1.8713E−02 | 2.5174E−02 | −3.1788E−01 | −3.3504E−01 | 2.4892E−02 |
| A10 = | 4.1227E−03 | −2.4223E−04 | −1.5083E−02 | 2.4383E−01 | 2.4059E−01 | −2.3157E−02 |
| A12 = | −1.2533E−03 | −1.0470E−03 | 7.3138E−03 | −1.0913E−01 | −9.7347E−02 | 1.0126E−02 |
| A14 = | — | — | −1.7202E−03 | 2.5124E−02 | 1.7421E−02 | 4.6248E−04 |
| A16 = | — | — | — | −2.0945E−03 | — | — |

| | Surface # | | | | | |
|---|---|---|---|---|---|---|
| | 9 | 10 | 11 | 12 | 13 | 14 |
| k = | −9.0000E+01 | 3.6871E+01 | −9.0000E+01 | −3.6247E−01 | −2.4587E+00 | −9.0000E+01 |
| A4 = | 5.6770E−02 | 7.6006E−02 | −7.3861E−02 | 1.8017E−01 | 2.7362E−01 | 1.3236E−02 |
| A6 = | 5.6817E−02 | 1.1303E−01 | 5.3921E−02 | −5.4311E−01 | −7.9764E−01 | −1.2807E−01 |
| A8 = | −2.0685E−01 | −2.5607E−01 | −1.0090E−01 | 7.9471E−01 | 1.1841E+00 | 1.9190E−01 |
| A10 = | 2.1538E−01 | 2.3239E−01 | 7.3177E−02 | −6.7987E−01 | −9.9030E−01 | −1.6242E−01 |
| A12 = | −1.1808E−01 | −1.0371E−01 | 2.7404E−02 | 3.7501E−01 | 5.0722E−01 | 8.7378E−02 |
| A14 = | 2.4197E−02 | 1.7911E−02 | −1.3898E−01 | −1.4283E−01 | −1.6291E−01 | −3.0426E−02 |
| A16 = | — | — | 1.5193E−01 | 3.8285E−02 | 3.2099E−02 | 6.5713E−03 |
| A18 = | — | — | −6.9939E−02 | −6.5158E−03 | −3.5525E−03 | −7.9136E−04 |
| A20 = | — | — | 1.1593E−02 | 5.0930E−04 | 1.6895E−04 | 4.0219E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.71 | f/(f − TL) | 32.59 |
| Fno | 2.48 | f/f1 | 0.14 |
| HFOV [deg.] | 16.9 | f/f2 | 2.23 |
| Nmax | 1.66 | f/f3 | −1.37 |
| V5 | 20.4 | f/f4 | −0.68 |
| V5 + V6 | 50.6 | f/f5 | 1.82 |
| Vmin | 20.4 | f/f6 | −2.08 |
| ATmax/TD | 0.34 | f/|f|min | 2.23 |
| ΣAT/ΣCT | 0.83 | CRA [deg.] | 15.7 |

-continued

| 7th Embodiment | | | |
|---|---|---|---|
| TL [mm] | 6.50 | Y11/Y62 | 0.79 |
| TL/EPD | 2.40 | Ymax/Ymin | 1.74 |
| TL/ImgH | 3.19 | Ymax/Ystop | 1.45 |
| TL/R1 | 1.25 | — | — |

8th Embodiment

Figure 15:
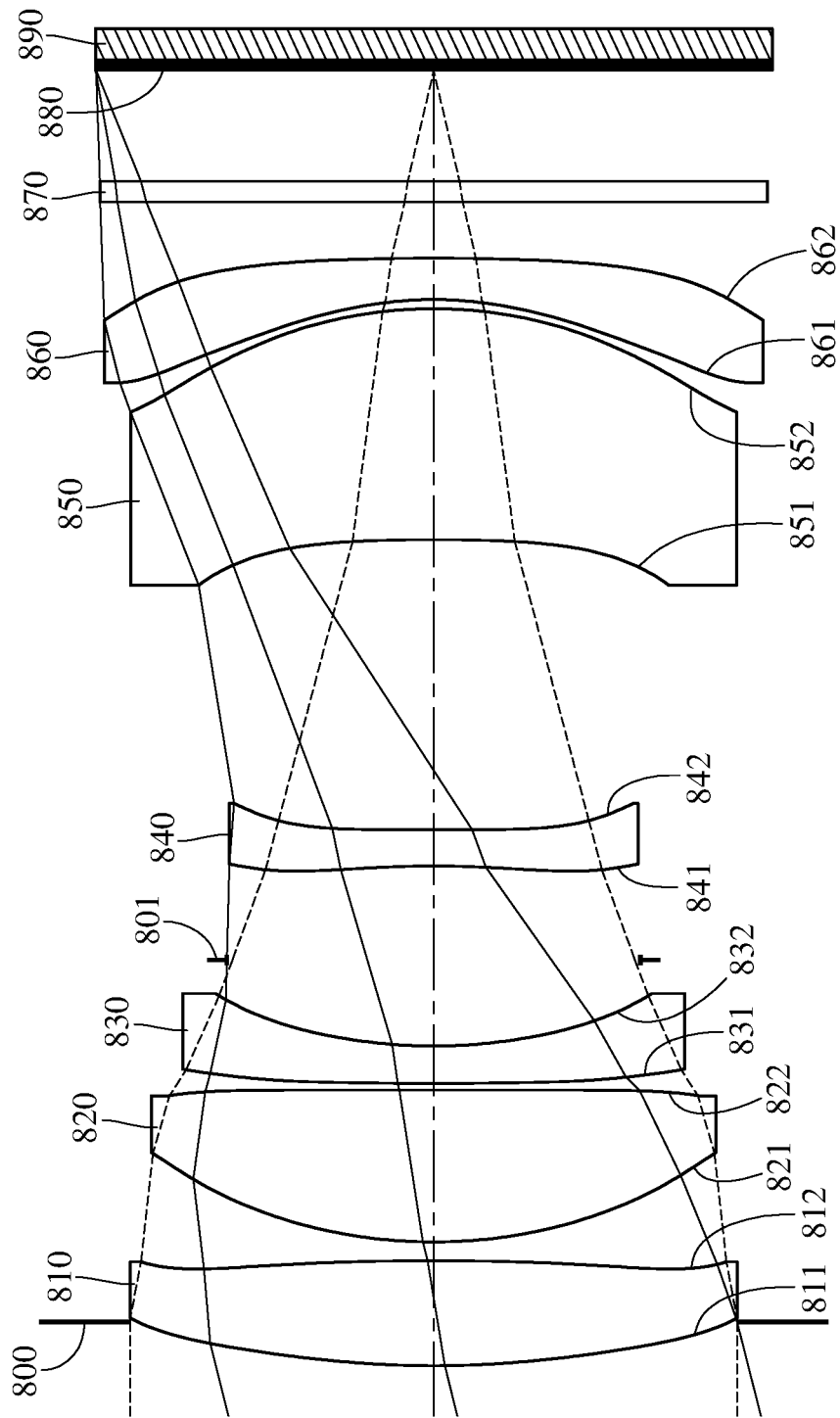
FIG. 15 is a schematic view of an image capturing unit according to the 8th embodiment of the present disclosure.
Figure 16:
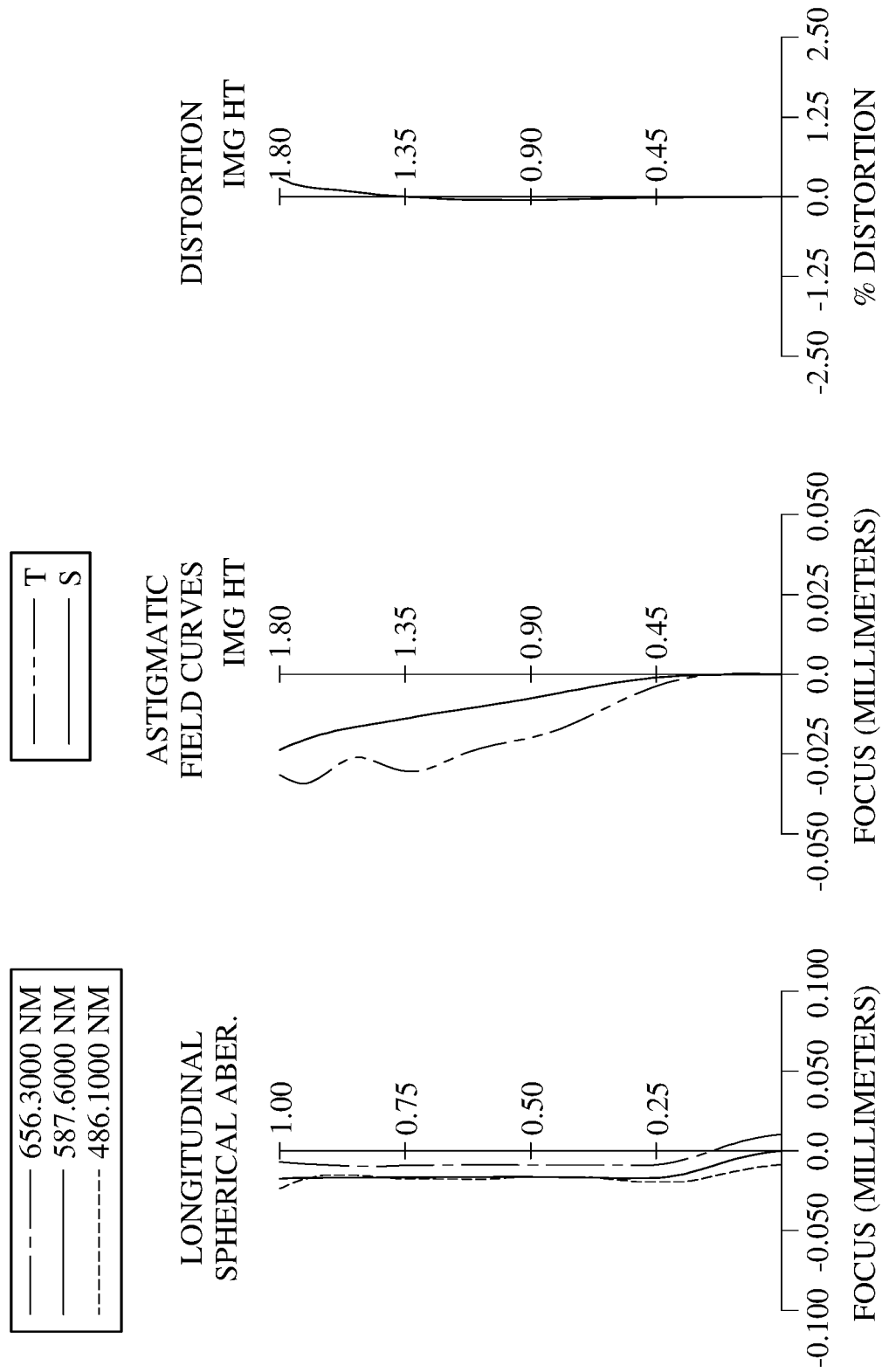
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging optical lens assembly (its reference numeral is omitted) of the present disclosure and an image sensor 890. The imaging optical lens assembly includes, in order from an object side to an image side, an aperture stop 800, a first lens element 810, a second lens element 820, a third lens element 830, a stop 801, a fourth lens element 840, a fifth lens element 850, a sixth lens element 860, a filter 870 and an image surface 880. The imaging optical lens assembly includes six lens elements (810, 820, 830, 840, 850 and 860) with no additional lens element disposed between each of the adjacent six lens elements.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric. The image-side surface 812 of the first lens element 810 has one inflection point.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has one inflection point. The image-side surface 822 of the second lens element 820 has three inflection points.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has two inflection points.

The fourth lens element 840 with negative refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. The object-side surface 841 of the fourth lens element 840 has two inflection points. The image-side surface 842 of the fourth lens element 840 has two inflection points.

The fifth lens element 850 with positive refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. The image-side surface 852 of the fifth lens element 850 has one inflection point.

The sixth lens element 860 with negative refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has one inflection point. The image-side surface 862 of the sixth lens element 860 has one inflection point.

The filter 870 is made of glass material and located between the sixth lens element 860 and the image surface 880, and will not affect the focal length of the imaging optical lens assembly. The image sensor 890 is disposed on or near the image surface 880 of the imaging optical lens assembly.

The detailed optical data of the 8th embodiment are shown in Table 15 and the aspheric surface data are shown in Table 16 below.

TABLE 15

8th Embodiment
f = 7.10 mm, Fno = 2.20, HFOV = 14.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.233 | | | | |
| 2 | Lens 1 | 5.319 | (ASP) | 0.559 | Plastic | 1.570 | 59.0 | 7.31 |
| 3 | | −18.520 | (ASP) | 0.100 | | | | |
| 4 | Lens 2 | 2.654 | (ASP) | 0.809 | Plastic | 1.570 | 59.0 | 5.03 |
| 5 | | 31.693 | (ASP) | 0.035 | | | | |
| 6 | Lens 3 | 12.541 | (ASP) | 0.200 | Plastic | 1.584 | 28.2 | −5.98 |
| 7 | | 2.715 | (ASP) | 0.459 | | | | |
| 8 | Stop | Plano | | 0.500 | | | | |
| 9 | Lens 4 | −5.154 | (ASP) | 0.193 | Plastic | 1.584 | 28.2 | −9.06 |
| 10 | | −197.997 | (ASP) | 1.545 | | | | |
| 11 | Lens 5 | −12.049 | (ASP) | 1.231 | Plastic | 1.680 | 18.4 | 3.87 |
| 12 | | −2.247 | (ASP) | 0.049 | | | | |
| 13 | Lens 6 | −1.848 | (ASP) | 0.220 | Plastic | 1.614 | 26.0 | −3.55 |
| 14 | | −12.752 | (ASP) | 0.300 | | | | |
| 15 | Filter | Plano | | 0.110 | Glass | 1.517 | 64.2 | — |
| 16 | | Plano | | 0.591 | | | | |
| 17 | Image | Plano | | — | | | | |

Note:
Reference wavelength is 587.6 nm (d-line).
An effective radius of the stop 801 (Surface 8) is 1.100 mm.

TABLE 16

Aspheric Coefficients

| Surface # | | | | | |
|---|---|---|---|---|---|
| 2 | 3 | 4 | 5 | 6 | 7 |
| k = −1.0859E+01 | 5.0550E+01 | −3.6950E−01 | 9.0000E+01 | −9.0000E+01 | −2.8516E+01 |
| A4 = 1.2267E−03 | −1.0014E−02 | −5.3019E−03 | −9.3171E−02 | −1.1213E−01 | 1.2435E−01 |
| A6 = −6.4359E−03 | 1.6219E−03 | 1.1300E−02 | 2.0503E−01 | 2.4816E−01 | −1.8347E−01 |
| A8 = 3.9047E−03 | 3.9234E−03 | −7.6465E−03 | −2.2329E−01 | −2.0661E−01 | 3.3139E−01 |
| A10 = −1.8081E−04 | −5.0319E−04 | 4.7816E−03 | 1.2836E−01 | 7.5764E−02 | −3.3071E−01 |
| A12 = −1.6811E−05 | 4.5493E−05 | −1.1185E−03 | −4.0867E−02 | −8.0305E−03 | 1.7052E−01 |
| A14 = — | — | −3.0479E−05 | 6.8293E−03 | −8.8160E−04 | −3.5397E−02 |
| A16 = — | — | — | −4.8655E−04 | — | — |

| Surface # | | | | | |
|---|---|---|---|---|---|
| 9 | 10 | 11 | 12 | 13 | 14 |
| k = −8.9623E+01 | −9.0000E+01 | 8.7422E+01 | −5.3481E−01 | −1.4833E+00 | 4.0241E+01 |
| A4 = −3.2980E−02 | 9.1130E−02 | −5.5646E−02 | 6.9092E−02 | 1.6868E−01 | 3.4255E−02 |
| A6 = 9.5480E−02 | −1.1693E−02 | 2.2124E−02 | −1.1883E−01 | −2.8303E−01 | −1.0378E−01 |
| A8 = 1.1362E−03 | 1.4646E−01 | −6.0377E−02 | −3.5742E−02 | 1.6218E−01 | 1.2250E−01 |
| A10 = −9.0395E−02 | −2.2830E−01 | 4.1574E−03 | 2.7223E−01 | 1.3501E−01 | −9.2247E−02 |
| A12 = 8.3581E−02 | 1.7611E−01 | 1.9400E−01 | −3.0003E−01 | −2.4628E−01 | 4.6489E−02 |
| A14 = −2.9014E−02 | −5.9476E−02 | −3.6034E−01 | 1.5837E−01 | 1.4821E−01 | −1.6007E−02 |
| A16 = — | — | 3.0545E−01 | −4.4634E−02 | −4.4941E−02 | 3.5431E−03 |
| A18 = — | — | −1.2807E−01 | 6.4215E−03 | 6.9205E−03 | −4.3755E−04 |
| A20 = — | — | 2.1500E−02 | −3.6845E−04 | −4.3165E−04 | 2.2207E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 7.10 | f/(f − TL) | 35.19 |
| Fno | 2.20 | f/f1 | 0.97 |
| HFOV [deg.] | 14.2 | f/f2 | 1.41 |
| Nmax | 1.68 | f/f3 | −1.19 |
| V5 | 18.4 | f/f4 | −0.78 |
| V5 + V6 | 44.4 | f/f5 | 1.84 |
| Vmin | 18.4 | f/f6 | −2.00 |
| ATmax/TD | 0.26 | f/|f|min | 2.00 |
| ΣAT/ΣCT | 0.84 | CRA [deg.] | 10.1 |
| TL [mm] | 6.90 | Y11/Y62 | 0.92 |
| TL/EPD | 2.14 | Ymax/Ymin | 1.65 |
| TL/ImgH | 3.83 | Ymax/Ystop | 1.09 |
| TL/R1 | 1.30 | — | — |

9th Embodiment

Figure 17:
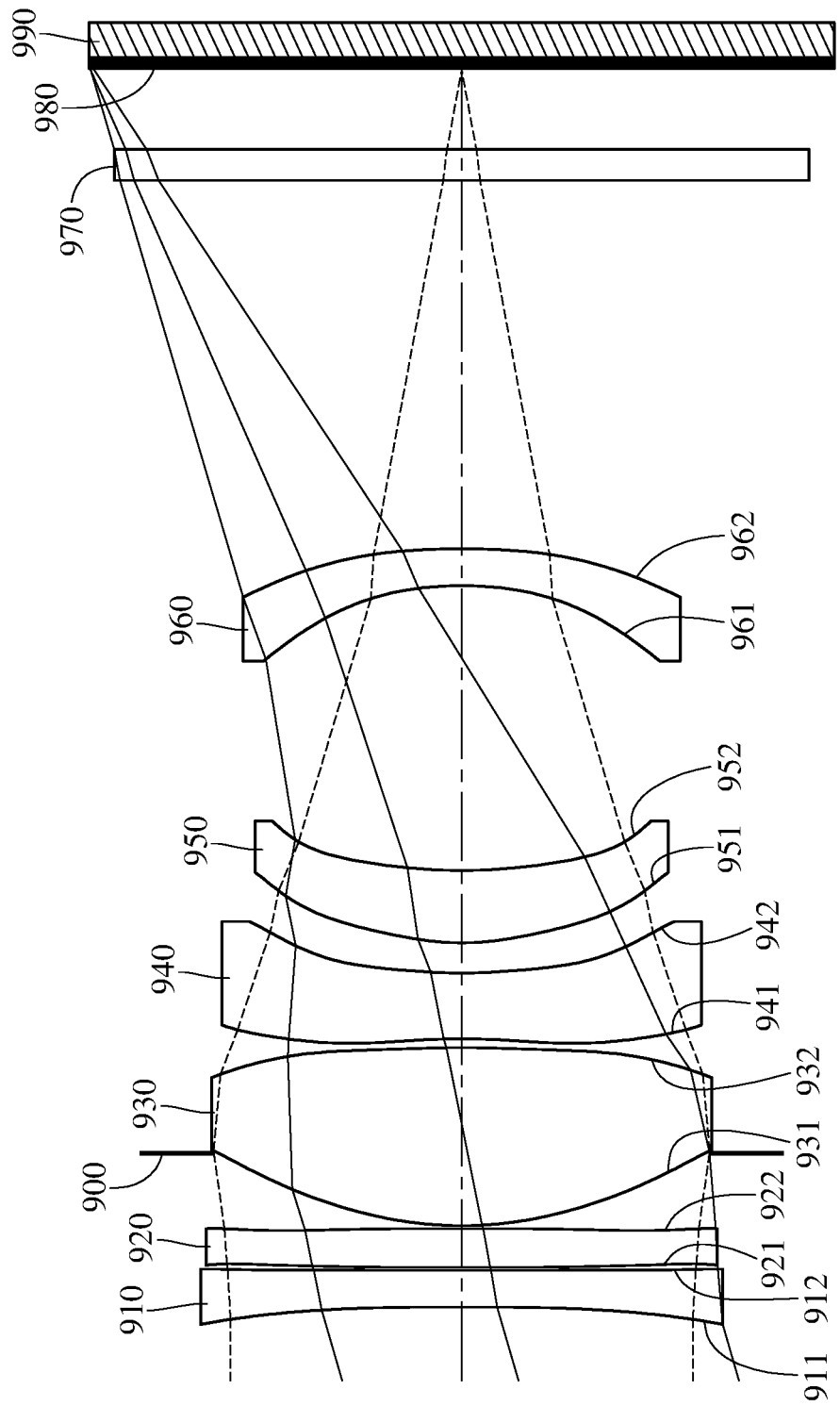
FIG. 17 is a schematic view of an image capturing unit according to the 9th embodiment of the present disclosure.
Figure 18:
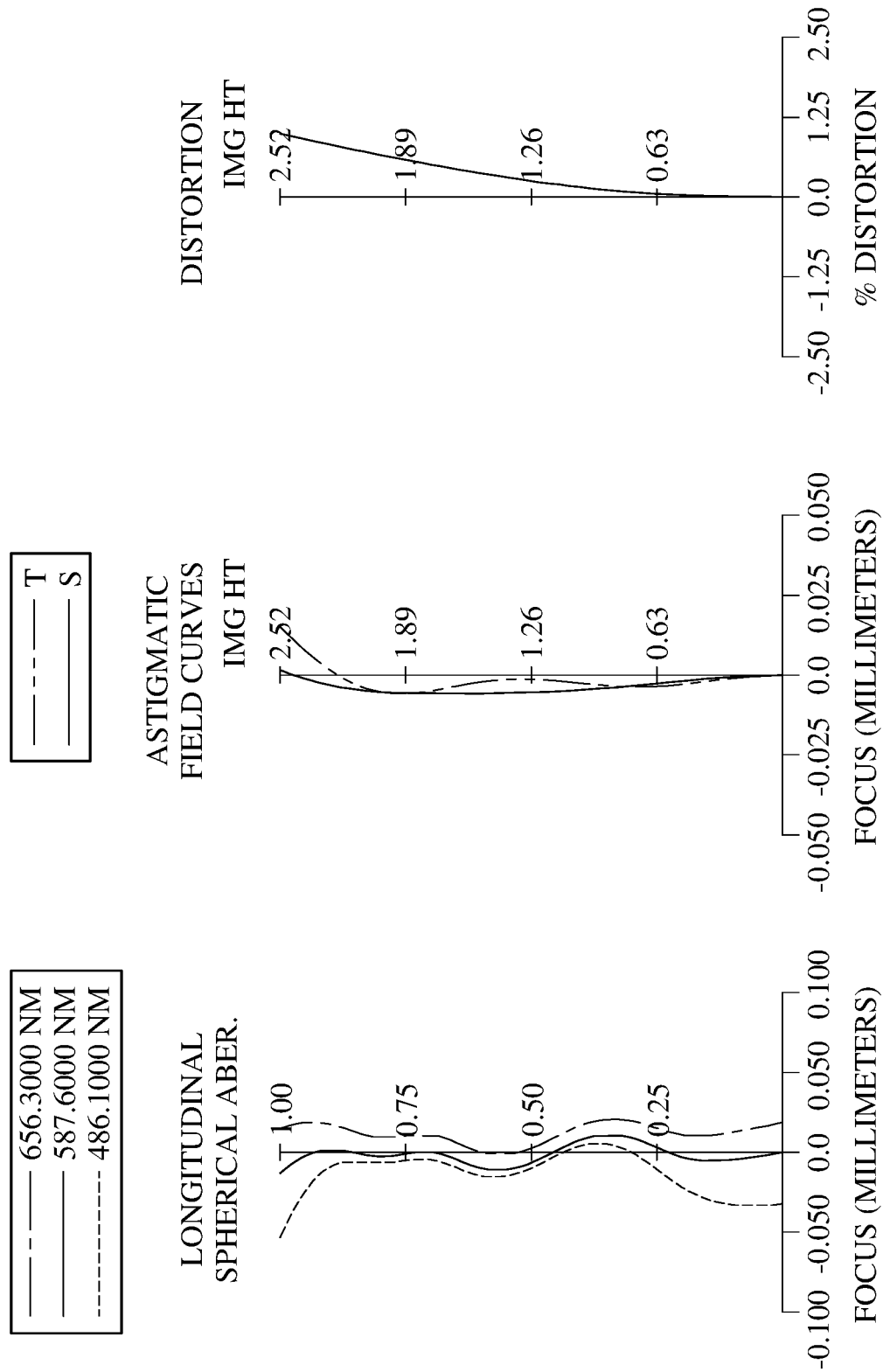
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging optical lens assembly (its reference numeral is omitted) of the present disclosure and an image sensor 990. The imaging optical lens assembly includes, in order from an object side to an image side, a first lens element 910, a second lens element 920, an aperture stop 900, a third lens element 930, a fourth lens element 940, a fifth lens element 950, a sixth lens element 960, a filter 970 and an image surface 980. The imaging optical lens assembly includes six lens elements (910, 920, 930, 940, 950 and 960) with no additional lens element disposed between each of the adjacent six lens elements.

The first lens element 910 with negative refractive power has an object-side surface 911 being concave in a paraxial region thereof and an image-side surface 912 being convex in a paraxial region thereof. The first lens element 910 is made of plastic material and has the object-side surface 911 and the image-side surface 912 being both aspheric. The image-side surface 912 of the first lens element 910 has four inflection points.

The second lens element 920 with negative refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric. The object-side surface 921 of the second lens element 920 has two inflection points. The image-side surface 922 of the second lens element 920 has two inflection points.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric. The object-side surface 931 of the third lens element 930 has one inflection point. The image-side surface 932 of the third lens element 930 has two inflection points.

The fourth lens element 940 with negative refractive power has an object-side surface 941 being concave in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has one inflection point. The image-side surface 942 of the fourth lens element 940 has one inflection point.

The fifth lens element 950 with positive refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The object-side surface 951 of the fifth lens element 950 has one inflection point. The image-side surface 952 of the fifth lens element 950 has one inflection point.

The sixth lens element 960 with negative refractive power has an object-side surface 961 being concave in a paraxial region thereof and an image-side surface 962 being convex in a paraxial region thereof. The sixth lens element 960 is made of plastic material and has the object-side surface 961 and the image-side surface 962 being both aspheric.

The filter 970 is made of glass material and located between the sixth lens element 960 and the image surface 980, and will not affect the focal length of the imaging optical lens assembly. The image sensor 990 is disposed on or near the image surface 980 of the imaging optical lens assembly.

The detailed optical data of the 9th embodiment are shown in Table 17 and the aspheric surface data are shown in Table 18 below.

TABLE 17

9th Embodiment
f = 8.61 mm, Fno = 2.75, HFOV = 16.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −46.989 | (ASP) | 0.250 | Plastic | 1.669 | 19.4 | −109.44 |
| 2 | | −131.427 | (ASP) | 0.020 | | | | |
| 3 | Lens 2 | −86.006 | (ASP) | 0.262 | Plastic | 1.544 | 56.0 | −277.59 |
| 4 | | −200.000 | (ASP) | 0.511 | | | | |
| 5 | Ape. Stop | Plano | | −0.491 | | | | |
| 6 | Lens 3 | 2.507 | (ASP) | 1.208 | Plastic | 1.544 | 56.0 | 3.61 |
| 7 | | −7.499 | (ASP) | 0.060 | | | | |
| 8 | Lens 4 | −4.152 | (ASP) | 0.446 | Plastic | 1.650 | 21.8 | −2.80 |
| 9 | | 3.381 | (ASP) | 0.205 | | | | |
| 10 | Lens 5 | 1.673 | (ASP) | 0.491 | Plastic | 1.669 | 19.4 | 4.35 |
| 11 | | 3.474 | (ASP) | 1.932 | | | | |
| 12 | Lens 6 | −2.454 | (ASP) | 0.250 | Plastic | 1.544 | 56.0 | −7.96 |
| 13 | | −5.864 | (ASP) | 2.500 | | | | |
| 14 | Filter | Plano | | 0.210 | Glass | 1.517 | 64.2 | — |
| 15 | | Plano | | 0.547 | | | | |
| 16 | Image | Plano | | — | | | | |

Note:
Reference wavelength is 587.6 nm (d-line).
An effective radius of the image-side surface 962 (Surface 13) is 1.480 mm.

TABLE 18

Aspheric Coefficients

| | Surface # | | | | | |
|---|---|---|---|---|---|---|
| | 1 | 2 | 3 | 4 | 6 | 7 |
| k = | 9.0000E+01 | 9.0000E+01 | 3.6695E+01 | 9.0000E+01 | −7.0050E−01 | 4.8760E+00 |
| A4 = | −1.3529E−02 | 1.6136E−02 | 3.2603E−02 | −1.5564E−02 | −1.5823E−02 | 1.0609E−01 |
| A6 = | 3.3758E−04 | −1.7753E−02 | −2.7916E−02 | 6.9253E−03 | 2.3231E−03 | −1.1474E−01 |
| A8 = | 1.0609E−03 | 7.7218E−03 | 1.1251E−02 | 1.4802E−03 | 1.0803E−03 | 5.0363E−02 |
| A10 = | −2.0772E−04 | −1.1237E−03 | −1.7293E−03 | −6.5683E−04 | −2.9949E−04 | −1.0579E−02 |
| A12 = | — | — | — | — | −3.1142E−05 | 8.6964E−04 |

| | Surface # | | | | | |
|---|---|---|---|---|---|---|
| | 8 | 9 | 10 | 11 | 12 | 13 |
| k = | −9.3065E−01 | −4.7182E+01 | −1.0779E+00 | 5.3579E+00 | 6.4811E−01 | 7.9529E+00 |
| A4 = | 1.4164E−01 | −8.0134E−02 | −2.6075E−01 | −6.1100E−02 | −7.6884E−02 | −6.7987E−02 |
| A6 = | −4.1677E−02 | 2.2582E−01 | 2.6886E−01 | −3.2009E−02 | 4.0535E−02 | 4.5038E−02 |
| A8 = | −3.4910E−03 | −1.3710E−01 | −1.1293E−01 | 1.9175E−01 | −1.2454E−02 | −2.5937E−02 |
| A10 = | 4.2723E−03 | 3.5335E−02 | 5.8830E−03 | −2.3197E−01 | 5.0464E−03 | 1.4873E−02 |
| A12 = | −5.5062E−04 | −3.6446E−03 | 1.7324E−02 | 1.3856E−01 | −1.5633E−03 | −6.2181E−03 |
| A14 = | — | — | −5.4874E−03 | −3.2553E−02 | 3.1379E−04 | 1.4976E−03 |
| A16 = | — | — | — | — | −1.5523E−06 | −1.4837E−04 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 8.61 | f/(f − TL) | 40.51 |
| Fno | 2.75 | f/f1 | −0.08 |
| HFOV [deg.] | 16.2 | f/f2 | −0.03 |
| Nmax | 1.67 | f/f3 | 2.39 |
| V5 | 19.4 | f/f4 | −3.07 |
| V5 + V6 | 75.4 | f/f5 | 1.98 |
| Vmin | 19.4 | f/f6 | −1.08 |
| ATmax/TD | 0.38 | f/|f|min | 3.07 |
| ΣAT/ΣCT | 0.77 | CRA [deg.] | 23.7 |
| TL [mm] | 8.40 | Y11/Y62 | 1.20 |
| TL/EPD | 2.68 | Ymax/Ymin | 1.38 |
| TL/ImgH | 3.34 | Ymax/Ystop | 1.05 |
| TL/R1 | −0.18 | — | — |

10th Embodiment

Figure 19:
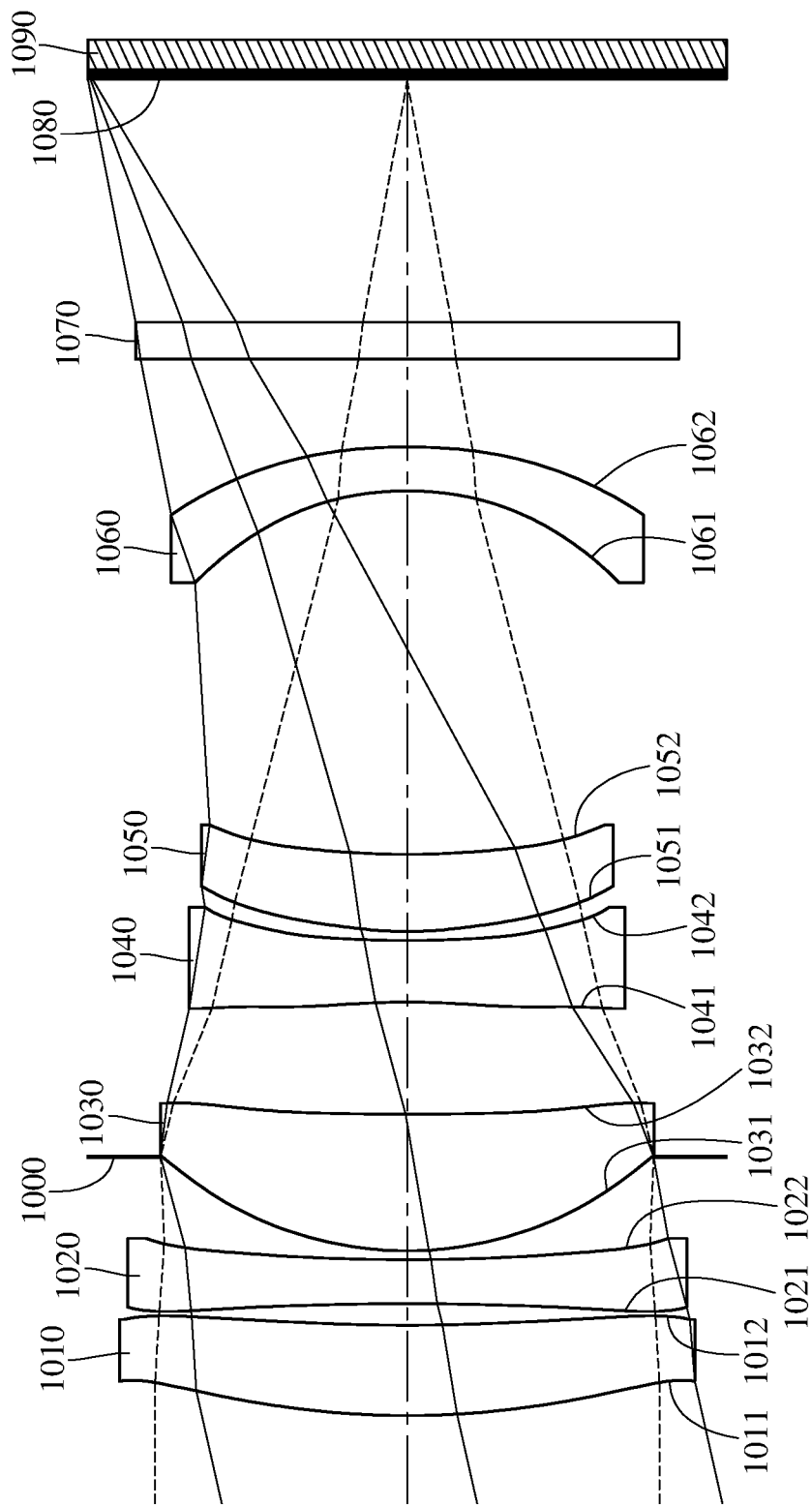
FIG. 19 is a schematic view of an image capturing unit according to the 10th embodiment of the present disclosure.
Figure 20:
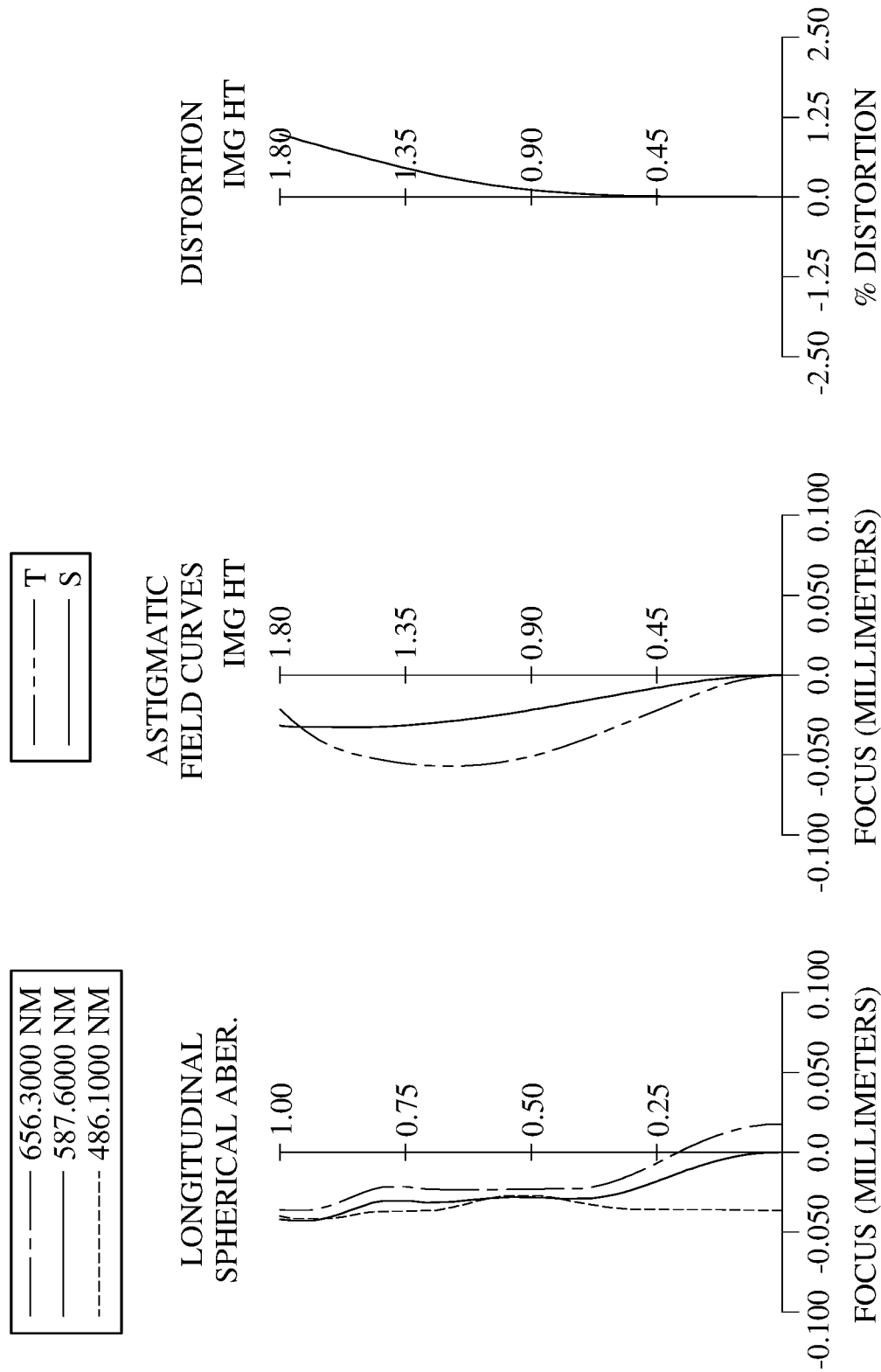
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging optical lens assembly (its reference numeral is omitted) of the present disclosure and an image sensor 1090. The imaging optical lens assembly includes, in order from an object side to an image side, a first lens element 1010, a second lens element 1020, an aperture stop 1000, a third lens element 1030, a fourth lens element 1040, a fifth lens element 1050, a sixth lens element 1060, a filter 1070 and an image surface 1080. The imaging optical lens assembly includes six lens elements (1010, 1020, 1030, 1040, 1050 and 1060) with no additional lens element disposed between each of the adjacent six lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The object-side surface 1011 of the first lens element 1010 has one inflection point. The image-side surface 1012 of the first lens element 1010 has one inflection point.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric. The object-side surface 1021 of the second lens element 1020 has one inflection point.

The third lens element 1030 with positive refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 of the third lens element 1030 has one inflection point. The image-side surface 1032 of the third lens element 1030 has one inflection point.

The fourth lens element 1040 with negative refractive power has an object-side surface 1041 being concave in a paraxial region thereof and an image-side surface 1042 being concave in a paraxial region thereof. The fourth lens element 1040 is made of plastic material and has the object-side surface 1041 and the image-side surface 1042 being both aspheric. The object-side surface 1041 of the fourth lens element 1040 has three inflection points.

The fifth lens element 1050 with positive refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The object-side surface 1051 of the fifth lens element 1050 has one inflection point. The image-side surface 1052 of the fifth lens element 1050 has one inflection point.

The sixth lens element 1060 with negative refractive power has an object-side surface 1061 being concave in a paraxial region thereof and an image-side surface 1062 being convex in a paraxial region thereof. The sixth lens element 1060 is made of plastic material and has the object-side surface 1061 and the image-side surface 1062 being both aspheric.

The filter 1070 is made of glass material and located between the sixth lens element 1060 and the image surface 1080, and will not affect the focal length of the imaging optical lens assembly. The image sensor 1090 is disposed on or near the image surface 1080 of the imaging optical lens assembly.

The detailed optical data of the 10th embodiment are shown in Table 19 and the aspheric surface data are shown in Table 20 below.

TABLE 19

10th Embodiment
f = 8.02 mm, Fno = 2.80, HFOV = 12.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.752 | (ASP) | 0.514 | Plastic | 1.545 | 56.1 | 16.27 |
| 2 | | 9.849 | (ASP) | 0.123 | | | | |
| 3 | Lens 2 | −14.310 | (ASP) | 0.250 | Plastic | 1.669 | 19.4 | −10.20 |
| 4 | | 13.137 | (ASP) | 0.585 | | | | |

TABLE 19-continued

10th Embodiment
f = 8.02 mm, Fno = 2.80, HFOV = 12.6 deg.

| Surface # | | Curvature Radius | | Thickness | Material | Index | Abbe # | Focal Length |
|---|---|---|---|---|---|---|---|---|
| 5 | Ape. Stop | Plano | | −0.535 | | | | |
| 6 | Lens 3 | 1.949 | (ASP) | 0.777 | Plastic | 1.544 | 56.0 | 3.96 |
| 7 | | 17.711 | (ASP) | 0.638 | | | | |
| 8 | Lens 4 | −4.054 | (ASP) | 0.350 | Plastic | 1.582 | 30.2 | −3.77 |
| 9 | | 4.942 | (ASP) | 0.051 | | | | |
| 10 | Lens 5 | 2.001 | (ASP) | 0.439 | Plastic | 1.669 | 19.4 | 4.98 |
| 11 | | 4.561 | (ASP) | 2.067 | | | | |
| 12 | Lens 6 | −1.780 | (ASP) | 0.250 | Plastic | 1.544 | 56.0 | −7.51 |
| 13 | | −3.311 | (ASP) | 0.500 | | | | |
| 14 | Filter | Plano | | 0.210 | Glass | 1.517 | 64.2 | — |
| 15 | | Plano | | 1.382 | | | | |
| 16 | Image | Plano | | | | | | |

Note:
Reference wavelength is 587.6 nm (d-line).

TABLE 20

Aspheric Coefficients

| | Surface # | | | | | |
|---|---|---|---|---|---|---|
| | 1 | 2 | 3 | 4 | 6 | 7 |
| k = | −2.3707E+00 | −5.6004E+01 | −7.3040E+01 | 6.7841E+01 | −4.5668E−01 | −8.8908E+01 |
| A4 = | −1.9871E−03 | −1.5232E−02 | 2.2823E−02 | 1.4159E−02 | −4.4817E−02 | −2.8436E−02 |
| A6 = | −5.8849E−03 | 8.8350E−03 | −2.9243E−02 | −2.5729E−02 | 6.0834E−02 | 1.0828E−01 |
| A8 = | 5.7676E−03 | −1.5429E−03 | 1.2193E−02 | 1.1329E−02 | −3.2998E−02 | −9.1638E−02 |
| A10 = | −1.7781E−03 | −4.4313E−04 | −1.1327E−03 | −1.2038E−03 | 1.0583E−02 | 3.0116E−02 |
| A12 = | — | — | — | — | −1.8919E−03 | −3.7817E−03 |

| | Surface # | | | | | |
|---|---|---|---|---|---|---|
| | 8 | 9 | 10 | 11 | 12 | 13 |
| k = | 1.2385E+00 | −5.0079E+01 | −8.3632E−01 | 1.2212E+01 | 2.8130E−01 | 2.4834E+00 |
| A4 = | 1.2412E−01 | −2.6667E−01 | −4.1489E−01 | −6.5299E−02 | −3.9636E−02 | −4.5088E−02 |
| A6 = | 1.7237E−01 | 1.1622E+00 | 8.1463E−01 | −2.6221E−02 | −9.9926E−02 | −4.2732E−02 |
| A8 = | −3.8425E−01 | −1.6015E+00 | −7.9189E−01 | 2.2201E−01 | 3.9452E−01 | 1.7967E−01 |
| A10 = | 2.3238E−01 | 9.5291E−01 | 3.5011E−01 | −2.4322E−01 | −6.0131E−01 | −2.3387E−01 |
| A12 = | −4.5781E−02 | −2.0176E−01 | −1.3604E−02 | 1.2532E−01 | 5.1126E−01 | 1.6134E−01 |
| A14 = | — | — | −2.3688E−02 | −3.0972E−02 | −2.3185E−01 | −5.8165E−02 |
| A16 = | — | — | — | — | 4.3280E−02 | 8.5595E−03 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 8.02 | f/(f − TL) | 19.03 |
| Fno | 2.80 | f/f1 | 0.49 |
| HFOV [deg.] | 12.6 | f/f2 | −0.79 |
| Nmax | 1.67 | f/f3 | 2.03 |
| V5 | 19.4 | f/f4 | −2.13 |
| V5 + V6 | 75.4 | f/f5 | 1.61 |
| Vmin | 19.4 | f/f6 | −1.07 |
| ATmax/TD | 0.38 | f/|f|min | 2.13 |

-continued

| 10th Embodiment | | | |
|---|---|---|---|
| ΣAT/ΣCT | 1.14 | CRA [deg.] | 20.7 |
| TL [mm] | 7.60 | Y11/Y62 | 1.22 |
| TL/EPD | 2.65 | Ymax/Ymin | 1.46 |
| TL/ImgH | 4.22 | Ymax/Ystop | 1.17 |
| TL/R1 | 1.60 | — | — |

11th Embodiment

Figure 21:
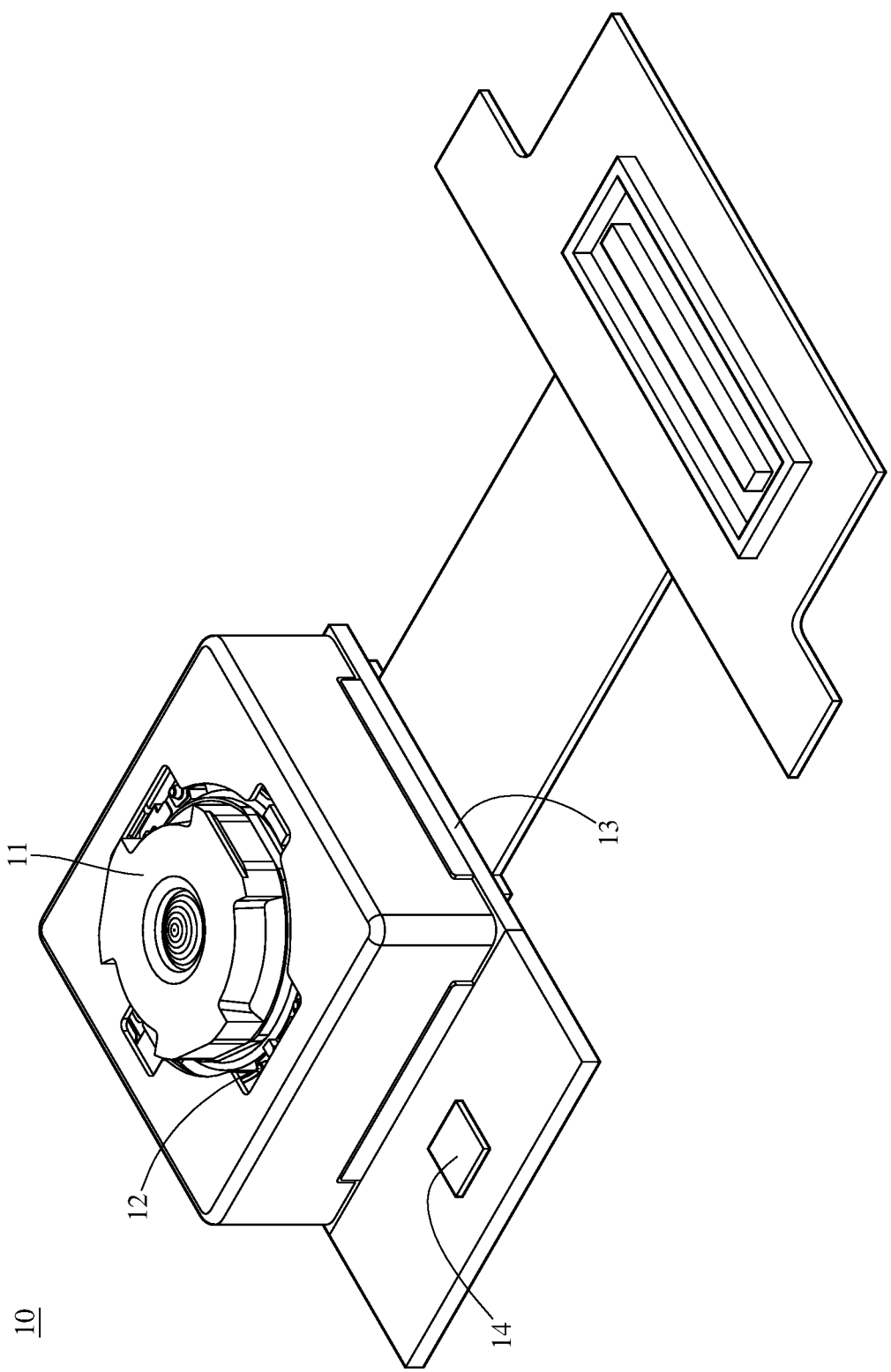
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the imaging optical lens assembly disclosed in the 3rd embodiment, a barrel and a holder member (their reference numerals are omitted) for holding the imaging optical lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
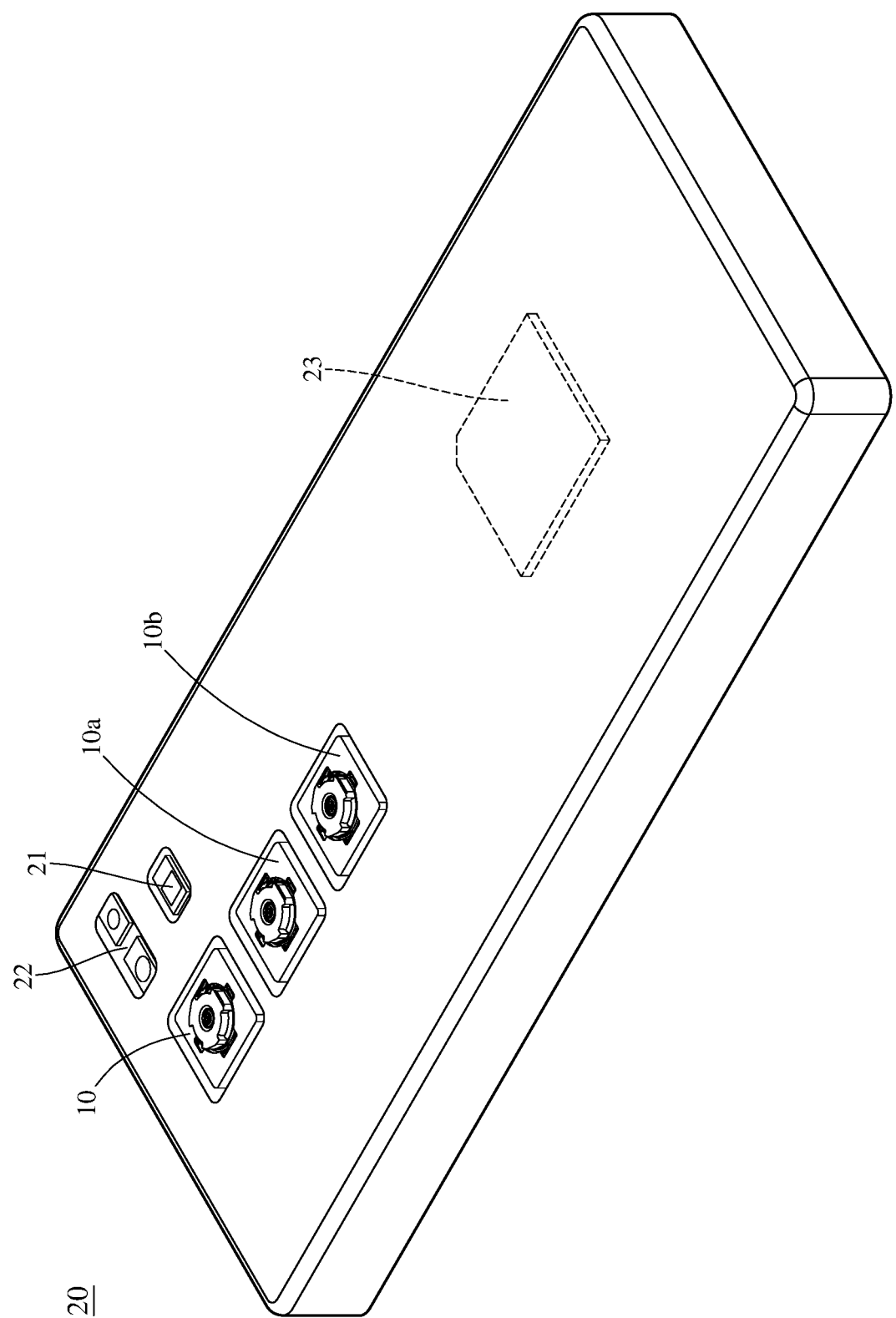
FIG. 22 is one perspective view of an electronic device according to the 12th embodiment of the present disclosure.
Figure 23:
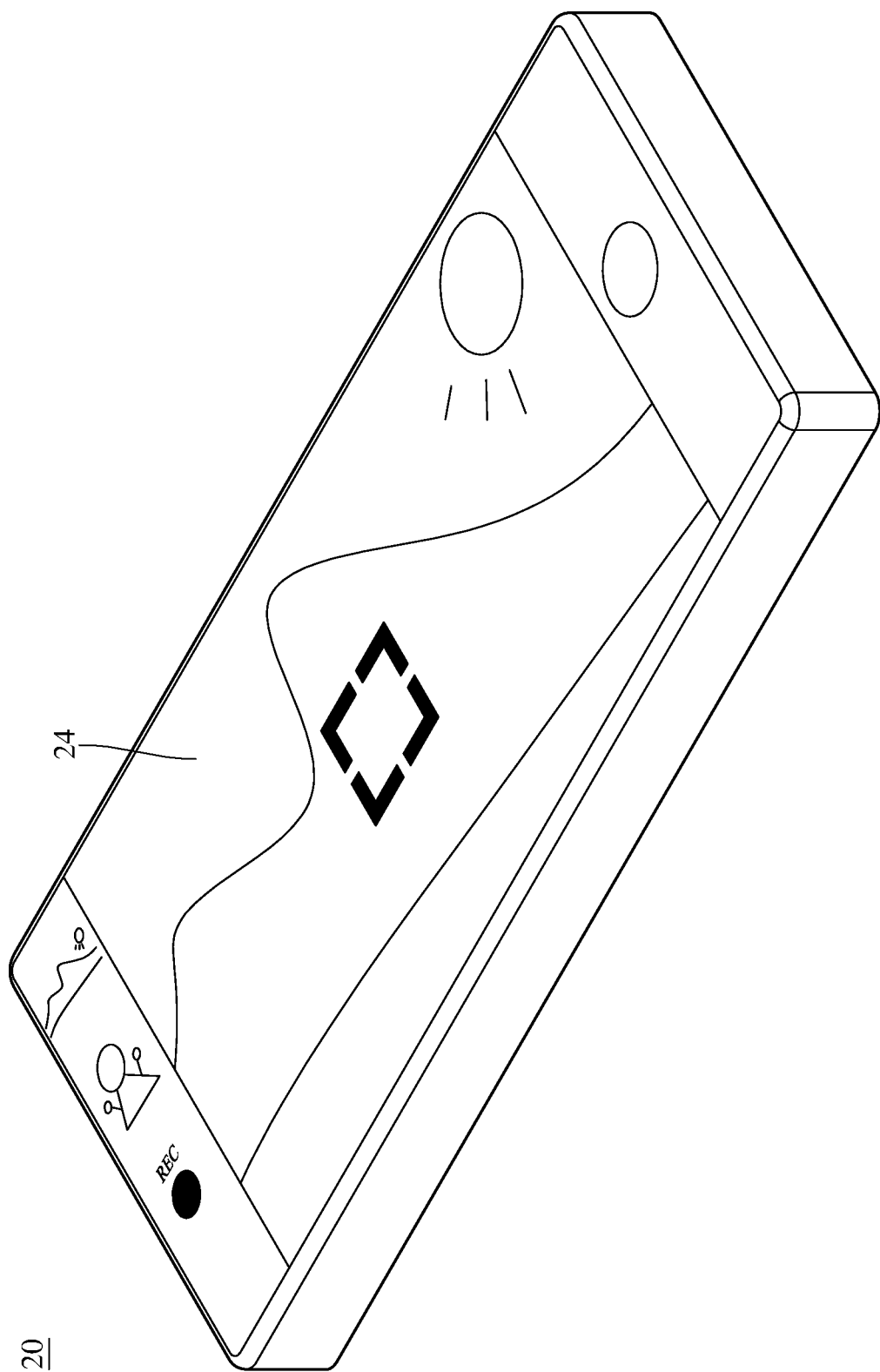
FIG. 23 is another perspective view of the electronic device in FIG. 22.
Figure 24:
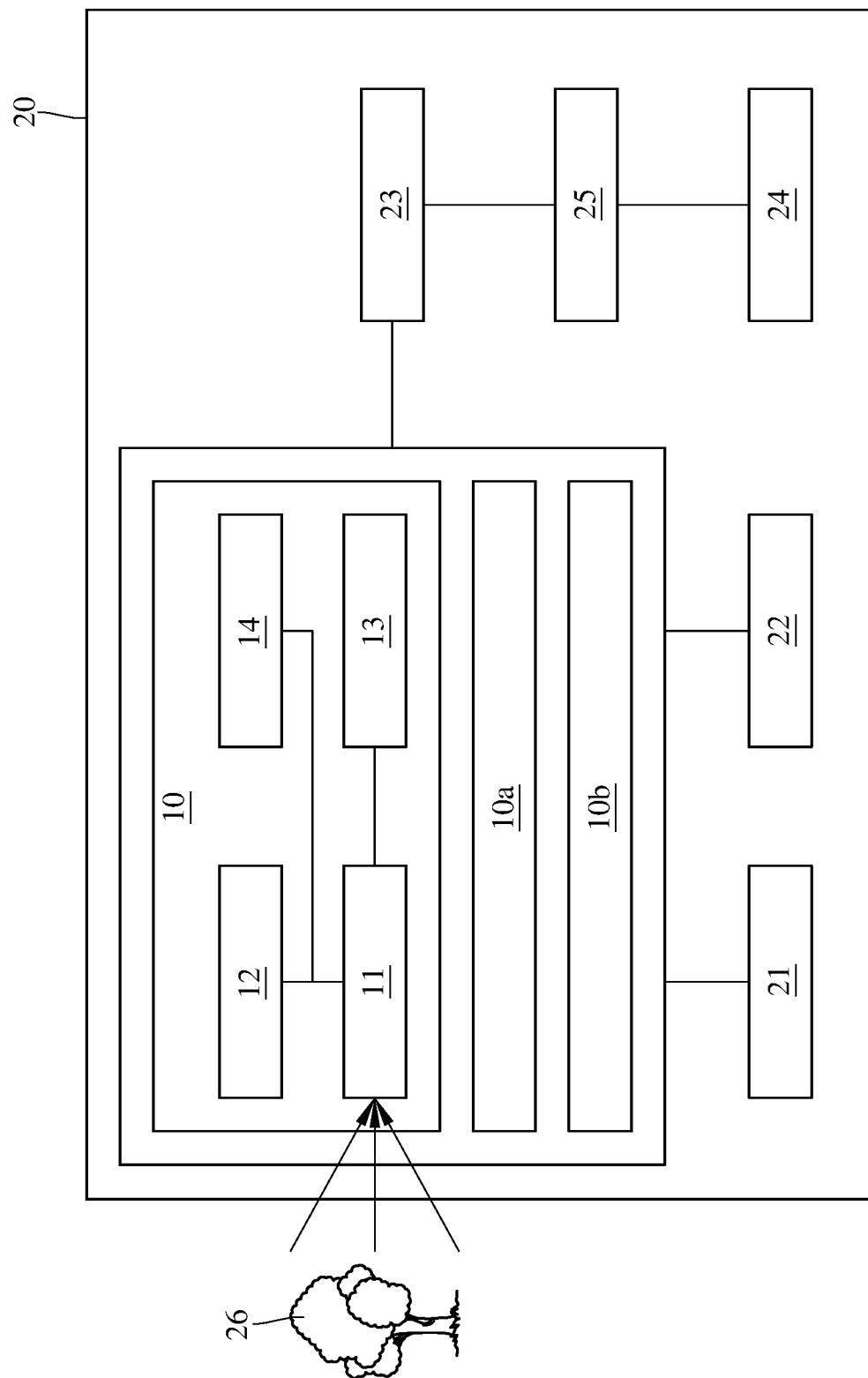
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22.

In this embodiment, an electronic device 20 is a smartphone including the image capturing unit 10 disclosed in the 11th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b all face the same direction, and each of the image capturing units 10, 10a and 10b has a single focal point. Furthermore, the image capturing unit 10a and the image capturing unit 10b both have a configuration similar to that of the image capturing unit 10. In detail, each of the image capturing unit 10a and the image capturing unit 10b includes a lens unit, a driving device, an image sensor and an image stabilizer, and the lens unit includes a lens system, a barrel and a holder member for holding the lens system.

In this embodiment, the image capturing units 10, 10a, 10b have different fields of view (e.g., the image capturing unit 10 is a telephoto image capturing unit, the image capturing unit 10b is a wide-angle image capturing unit and the image capturing unit 10a has a field of view ranging between that of the image capturing unit 10 and the image capturing unit 10b), such that the electronic device 20 has various magnification ratios so as to meet the requirement of optical zoom functionality. In this embodiment, the electronic device 20 includes multiple image capturing units 10, 10a and 10b, but the present disclosure is not limited to the number of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging optical lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising six lens elements, the six lens elements being, in order from an object side to an image side, a first lens element, a second lens element, a third lens element, a fourth lens element, a fifth lens element and a sixth lens element; each of the six lens elements having an object-side surface facing toward the object side and an image-side surface facing toward the image side;

wherein at least one of the six lens elements has at least one aspheric surface having at least one inflection point, a focal length of the imaging optical lens assembly is f, an axial distance between the object-side surface of the first lens element and an image surface is TL, a curvature radius of the object-side surface of the first lens element is R1, an entrance pupil diameter of the imaging optical lens assembly is EPD, a maximum effective radius of the object-side surface of the first lens element is Y11, a maximum effective radius of the image-side surface of the sixth lens element is Y62, a minimum value among all Abbe numbers of the six lens elements of the imaging optical lens assembly is Vmin, an Abbe number of the fifth lens element is V5, an Abbe number of the sixth lens element is V6, and the following conditions are satisfied:

2.0<f/(f−TL);
−10.0<TL/R1<1.8;
1.0<TL/EPD<5.0;
0.55<Y11/Y62≤1.8;
10.0<Vmin<21.3;
20.0<V5+V6<105.0;
1.0 [mm]<TL<17.0 [mm] and 10.0<V5<45.0.

2. The imaging optical lens assembly of claim 1, wherein the focal length of the imaging optical lens assembly is f, the axial distance between the object-side surface of the first lens element and the image surface is TL, a maximum value among all refractive indices of the six lens elements of the imaging optical lens assembly is Nmax, a chief ray angle at a maximum image height of the imaging optical lens assembly is CRA, and the following conditions are satisfied:
2.5<f/(f−TL)<100.0;
1.65<Nmax<1.75; and
CRA<25.0 [deg.].

3. The imaging optical lens assembly of claim 1, wherein the axial distance between the object-side surface of the first lens element and the image surface is TL, the curvature radius of the object-side surface of the first lens element is R1, and the following condition is satisfied:
−5.0<TL/R1<1.4.

4. The imaging optical lens assembly of claim 1, wherein the Abbe number of the fifth lens element is V5, the Abbe number of the sixth lens element is V6, and the following condition is satisfied:
25.0<V5+V6<90.0.

5. The imaging optical lens assembly of claim 1, wherein the axial distance between the object-side surface of the first lens element and the image surface is TL, the entrance pupil diameter of the imaging optical lens assembly is EPD, and the following condition is satisfied:
1.2<TL/EPD<4.0.

6. The imaging optical lens assembly of claim 1, wherein the axial distance between the object-side surface of the first lens element and the image surface is TL, a maximum image height of the imaging optical lens assembly is ImgH, a maximum value among maximum effective radii of all lens surfaces of the six lens elements of the imaging optical lens assembly is Ymax, a minimum value among maximum effective radii of all lens surfaces of the six lens elements of the imaging optical lens assembly is Ymin, and the following conditions are satisfied:
2.0 [mm]<TL<15.0 [mm];
1.5<TL/ImgH<7.0; and
1.0<Ymax/Ymin<2.0.

7. The imaging optical lens assembly of claim 1, wherein the maximum effective radius of the object-side surface of the first lens element is Y11, the maximum effective radius of the image-side surface of the sixth lens element is Y62, and the following condition is satisfied:
0.65<Y11/Y62≤1.54.

8. The imaging optical lens assembly of claim 1, wherein each of at least three of the six lens elements has at least one aspheric surface having at least one inflection point, half of a maximum field of view of the imaging optical lens assembly is HFOV, and the following condition is satisfied:
5.0 [deg.]<HFOV<32.0 [deg.].

9. The imaging optical lens assembly of claim 1, wherein a maximum value among all axial distances between every adjacent lens element of the six lens elements is ATmax, an axial distance between the object-side surface of the first lens element and the image-side surface of the sixth lens element is TD, and the following condition is satisfied:
0<ATmax/TD<0.40.

10. The imaging optical lens assembly of claim 1, wherein the focal length of the imaging optical lens assembly is f, a focal length of the first lens element is f1, and the following condition is satisfied:
−0.50<f/f1<1.0.

11. The imaging optical lens assembly of claim 1, wherein the focal length of the imaging optical lens assembly is f, a minimum value among all absolute values of focal lengths of each of the six lens elements of the imaging optical lens assembly is |f|min, and the following condition is satisfied:
1.40<f/|f|min.

12. The imaging optical lens assembly of claim 1, wherein the second lens element has positive refractive power, and the third lens element has negative refractive power.

13. An image capturing unit, comprising:
the imaging optical lens assembly of claim 1; and
an image sensor disposed on the image surface of the imaging optical lens assembly.

14. An electronic device, comprising:
the image capturing unit of claim 13.

15. An imaging optical lens assembly comprising six lens elements, the six lens elements being, in order from an object side to an image side, a first lens element, a second lens element, a third lens element, a fourth lens element, a fifth lens element and a sixth lens element; each of the six lens elements having an object-side surface facing toward the object side and an image-side surface facing toward the image side;
wherein at least one of the six lens elements has at least one aspheric surface having at least one inflection point, a focal length of the imaging optical lens assembly is f, an axial distance between the object-side surface of the first lens element and an image surface is TL, a curvature radius of the object-side surface of the first lens element is R1, an entrance pupil diameter of the imaging optical lens assembly is EPD, a maximum effective radius of the object-side surface of the first lens element is Y11, a maximum effective radius of the image-side surface of the sixth lens element is Y62, a sum of axial distances between every adjacent lens element of the six lens elements is ΣAT, a sum of central thicknesses of the six lens elements of the imaging optical lens assembly is ΣCT, an Abbe number of the fifth lens element is V5, a minimum value among all absolute values of focal lengths of each of the six lens elements of the imaging optical lens assembly is |f|min, half of a maximum field of view of the imaging optical lens assembly is HFOV, and the following conditions are satisfied:
2.0<f/(f−TL);
−10.0<TL/R1<1.8;
1.2<TL/EPD<4.0;
0.55<Y11/Y62≤1.8;
0<ΣAT/ΣCT<1.6;
10.0<V5<45.0;
1.40<f/|f|min; and
5.0 [deg.]<HFOV<32.0 [deg.].

16. The imaging optical lens assembly of claim 15, wherein the focal length of the imaging optical lens assembly is f, the axial distance between the object-side surface of the first lens element and the image surface is TL, and the following conditions are satisfied:
2.5<f/(f−TL)<100.0; and
2.0 [mm]<TL<15.0 [mm].

17. The imaging optical lens assembly of claim 16, wherein a maximum value among all axial distances between every adjacent lens element of the six lens elements is ATmax, an axial distance between the object-side surface of the first lens element and the image-side surface of the sixth lens element is TD, and the following condition is satisfied:

0<ATmax/TD<0.40.

18. The imaging optical lens assembly of claim 16, wherein the focal length of the imaging optical lens assembly is f, a focal length of the first lens element is f1, and the following condition is satisfied:

−0.50<f/f1<1.0.

19. The imaging optical lens assembly of claim 16, wherein an f-number of the imaging optical lens assembly is Fno, a chief ray angle at a maximum image height of the imaging optical lens assembly is CRA, a maximum value among maximum effective radii of all lens surfaces of the six lens elements of the imaging optical lens assembly is Ymax, a minimum value among maximum effective radii of all lens surfaces of the six lens elements of the imaging optical lens assembly is Ymin, and the following conditions are satisfied:

1.9<Fno<5.0;
CRA<25.0 [deg.]; and
1.0<Ymax/Ymin<2.0.

20. The imaging optical lens assembly of claim 16, further comprising an aperture stop, wherein a maximum value among maximum effective radii of all lens surfaces of the six lens elements of the imaging optical lens assembly is Ymax, an aperture radius of the aperture stop is Ystop, and the following condition is satisfied:

0<Ymax/Ystop<2.40.

21. The imaging optical lens assembly of claim 16, wherein at least three of the six lens elements of the imaging optical lens assembly are made of plastic material, the focal length of the imaging optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, the minimum value among all absolute values of focal lengths of each of the six lens elements of the imaging optical lens assembly is |f|min, and the following conditions are satisfied:

−2.0<f/f1<5.0;
−5.0<f/f2<5.0;
−5.0<f/f3<5.0;
−5.0<f/f4<5.0;
−5.0<f/f5<5.0;
−5.0<f/f6<5.0; and
1.70<f/|f|min<5.0.

22. The imaging optical lens assembly of claim 15, wherein the axial distance between the object-side surface of the first lens element and the image surface is TL, the curvature radius of the object-side surface of the first lens element is R1, and the following condition is satisfied:

−5.0<TL/R1<1.4.

23. The imaging optical lens assembly of claim 15, wherein the Abbe number of the fifth lens element is V5, and the following condition is satisfied:

12.0<V5<38.0.

24. The imaging optical lens assembly of claim 15, wherein a maximum effective radius of the object-side surface of the first lens element is Y11, a maximum effective radius of the image-side surface of the sixth lens element is Y62, and the following condition is satisfied:

0.65<Y11/Y62≤1.54.

25. The imaging optical lens assembly of claim 15, wherein half of the maximum field of view of the imaging optical lens assembly is HFOV, and the following condition is satisfied:

6.0 [deg.]<HFOV<25.0 [deg.].

26. The imaging optical lens assembly of claim 15, wherein each of at least three of the six lens elements has at least one aspheric surface having at least one inflection point.

27. An image capturing unit, comprising:
the imaging optical lens assembly of claim 15; and
an image sensor disposed on the image surface of the imaging optical lens assembly.

28. An electronic device, comprising:
the image capturing unit of claim 27.

* * * * *